(12) United States Patent
Santoso et al.

(10) Patent No.: US 12,687,826 B2
(45) Date of Patent: Jul. 21, 2026

(54) SYSTEMS, METHODS, AND DEVICES FOR ASSET SIMULATION AND ANALYTICS

(71) Applicant: Yokogawa Electric Corporation, Tokyo (JP)

(72) Inventors: Jati Santoso, Bedok (SG); Hua Zhang, Bedok (SG); Thanh Trung Bui, Bedok (SG)

(73) Assignee: Yokogawa Electric Corporation, Tokyo (JP)

( * ) Notice: Subject to any disclaimer, the term of this patent is extended or adjusted under 35 U.S.C. 154(b) by 729 days.

(21) Appl. No.: 18/113,405

(22) Filed: Feb. 23, 2023

(65) Prior Publication Data

US 2024/0288839 A1 Aug. 29, 2024

(51) Int. Cl.
*G05B 13/04* (2006.01)
*G05B 13/02* (2006.01)

(52) U.S. Cl.
CPC ....... *G05B 13/042* (2013.01); *G05B 13/0265* (2013.01)

(58) Field of Classification Search
None
See application file for complete search history.

(56) References Cited

U.S. PATENT DOCUMENTS

| | | | | |
|---|---|---|---|---|
| 2021/0240147 A1* | 8/2021 | Papadopoulos .... | G06Q 10/0639 |
| 2021/0263483 A1* | 8/2021 | Masuzaki .......... | G05B 13/0265 |
| 2021/0286329 A1* | 9/2021 | Givot .................... | G06Q 10/04 |
| 2022/0128620 A1 | 4/2022 | Nair | |
| 2022/0282839 A1* | 9/2022 | Wilson ................ | G05B 13/042 |
| 2022/0316741 A1* | 10/2022 | Nishimura .............. | H04Q 9/00 |
| 2022/0365525 A1 | 11/2022 | Minisankar et al. | |
| 2023/0151727 A1* | 5/2023 | Neal, III .............. | F04B 49/065 |
| | | | 166/250.01 |
| 2023/0275454 A1* | 8/2023 | Taheri ................... | G06Q 50/06 |
| | | | 700/291 |
| 2023/0408985 A1* | 12/2023 | Nordh .................... | G05B 17/02 |
| 2024/0009025 A1* | 1/2024 | Constant .............. | A61F 7/0085 |

FOREIGN PATENT DOCUMENTS

CN          114875196          8/2022

* cited by examiner

*Primary Examiner* — Howard Cortes
(74) *Attorney, Agent, or Firm* — SHERIDAN ROSS P.C.

(57) ABSTRACT

A system identifies a target value of one or more first operational parameters associated with an asset. The system provides the target value of the one or more first operational parameters to a machine learning model. The system receives a second target value of one or more second operational parameters associated with the asset. The system simulates one or more operations of the asset using the second target value of the one or more second operational parameters. The system provides, via a user interface, one or more recommended actions in response to a result associated with simulating the one or more operations.

20 Claims, 31 Drawing Sheets

520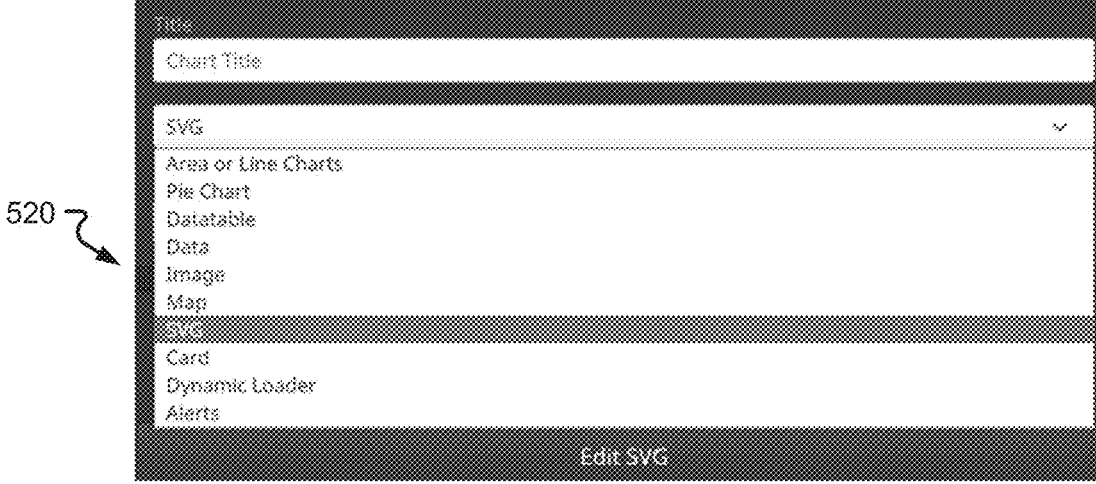
525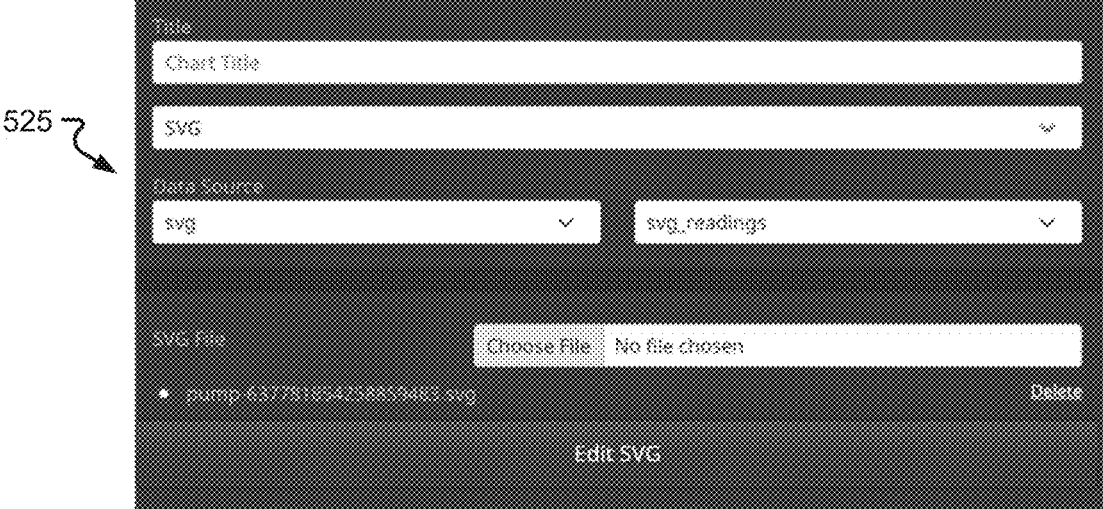
530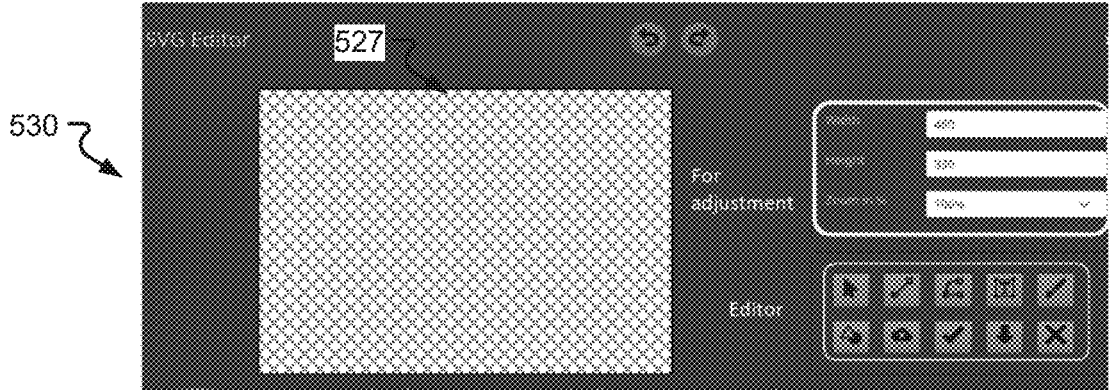
*Fig. 5D*

801

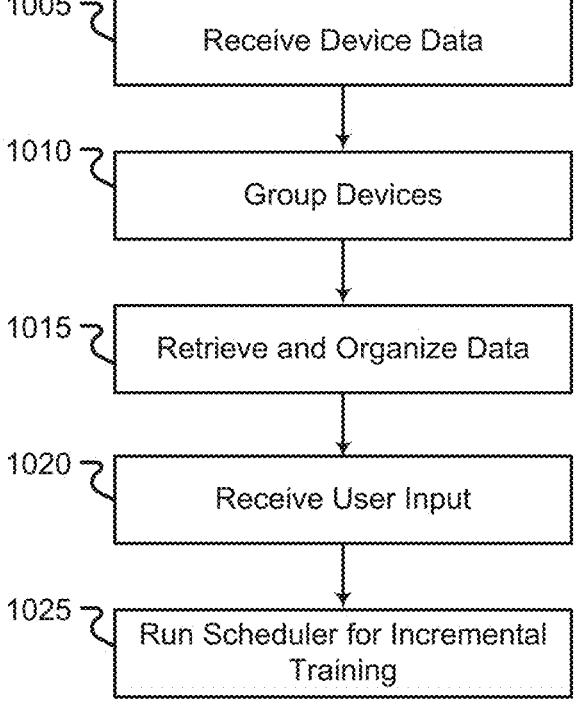
1005 — Receive Device Data
1010 — Group Devices
1015 — Retrieve and Organize Data
1020 — Receive User Input
1025 — Run Scheduler for Incremental Training
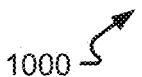
1000
*Fig. 10*

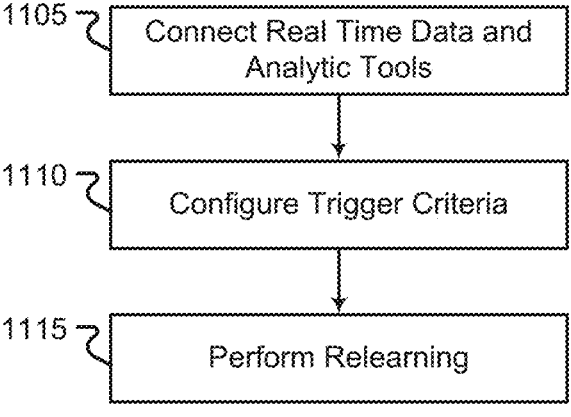
1105 ⟶ Connect Real Time Data and Analytic Tools
1110 ⟶ Configure Trigger Criteria
1115 ⟶ Perform Relearning
1100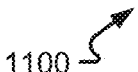
*Fig. 11*

1201

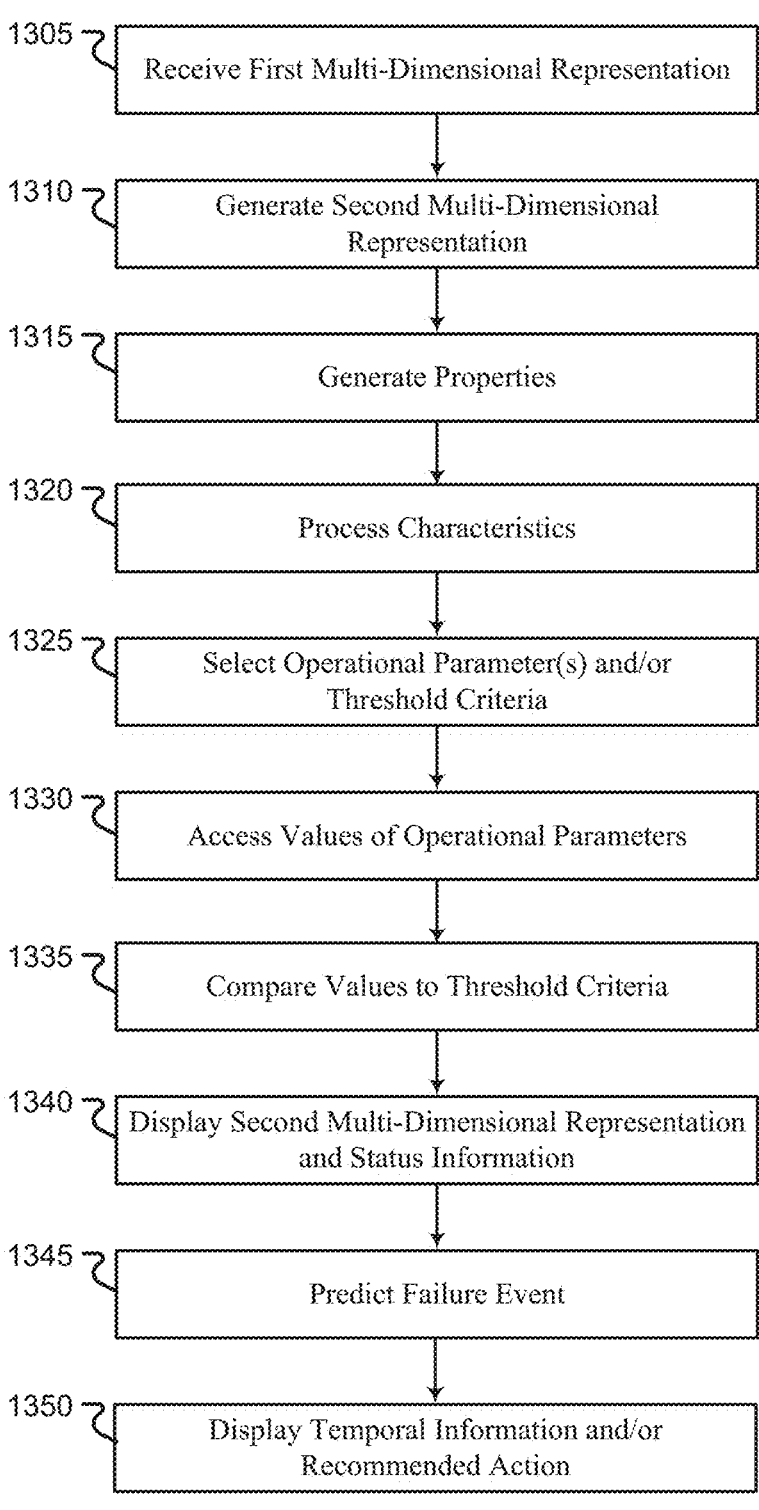

1305 — Receive First Multi-Dimensional Representation

1310 — Generate Second Multi-Dimensional Representation

1315 — Generate Properties

1320 — Process Characteristics

1325 — Select Operational Parameter(s) and/or Threshold Criteria

1330 — Access Values of Operational Parameters

1335 — Compare Values to Threshold Criteria

1340 — Display Second Multi-Dimensional Representation and Status Information

1345 — Predict Failure Event

1350 — Display Temporal Information and/or Recommended Action

1405 — Receive First Training Dataset

1410 — Determine Relationship

1415 — Obtain Second Training Dataset

1420 — Update Relationship

1425 — Provide Target Parameter

1430 — Provide Simulated Asset Operation

1435 — Display Recommended Action

1400

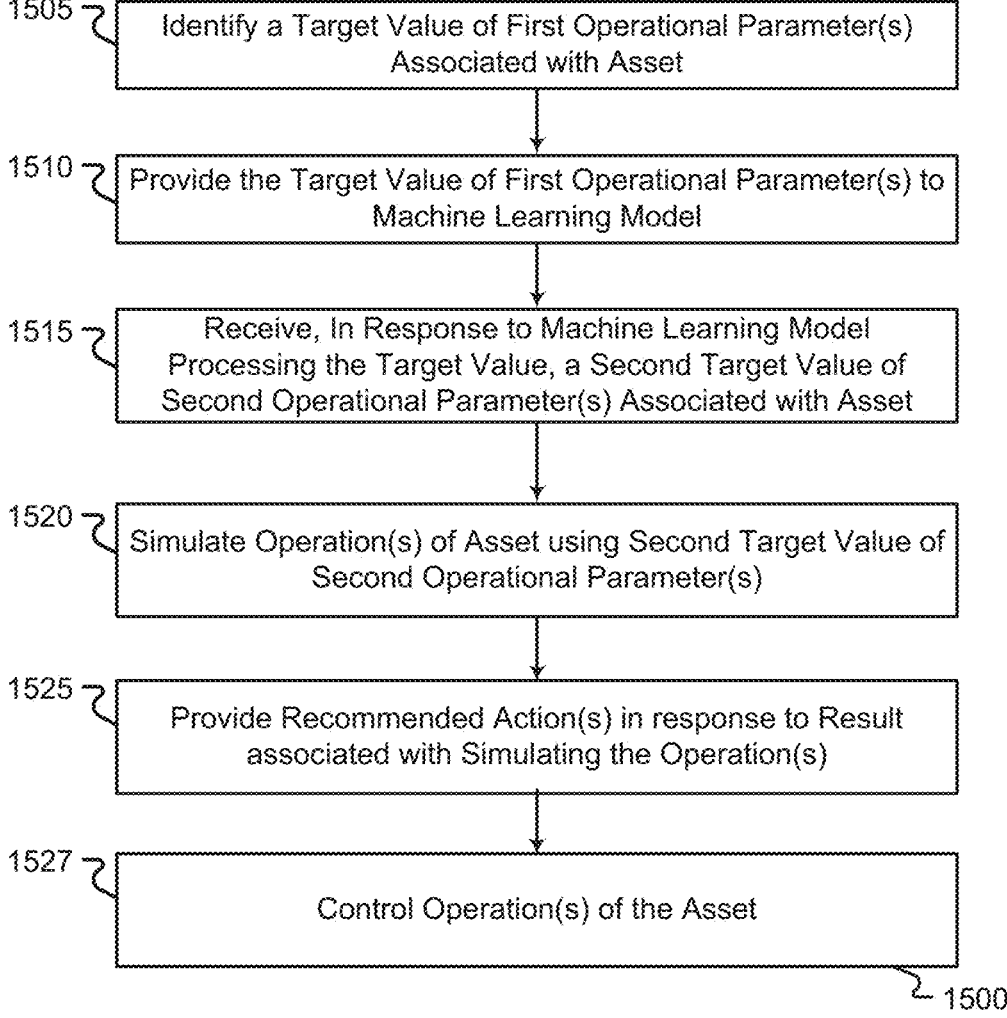

1505 — Identify a Target Value of First Operational Parameter(s) Associated with Asset 1510 — Provide the Target Value of First Operational Parameter(s) to Machine Learning Model 1515 — Receive, In Response to Machine Learning Model Processing the Target Value, a Second Target Value of Second Operational Parameter(s) Associated with Asset 1520 — Simulate Operation(s) of Asset using Second Target Value of Second Operational Parameter(s)

1525 — Provide Recommended Action(s) in response to Result associated with Simulating the Operation(s)

1527 — Control Operation(s) of the Asset

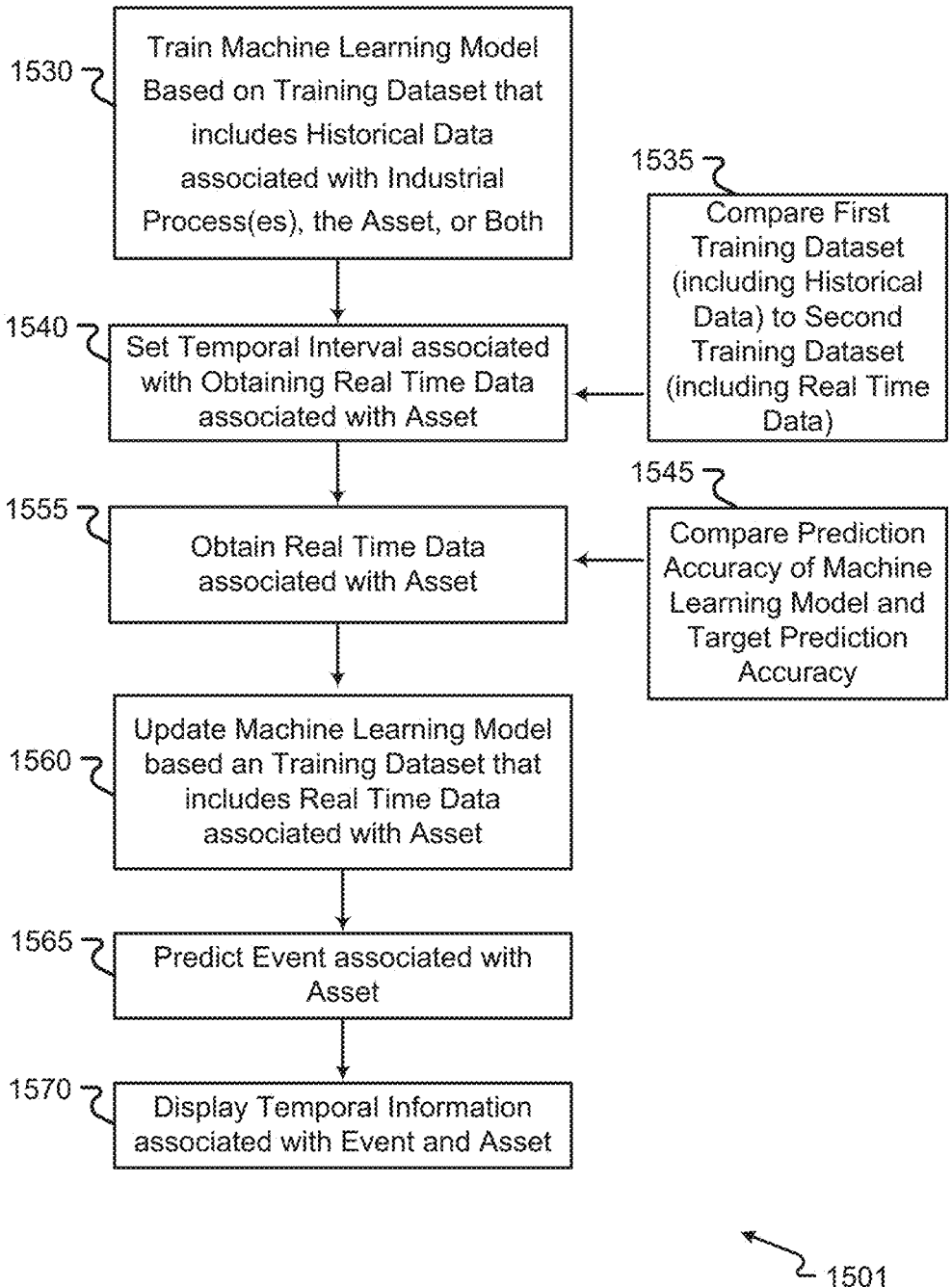

1530 — Train Machine Learning Model Based on Training Dataset that includes Historical Data associated with Industrial Process(es), the Asset, or Both 1535 — Compare First Training Dataset (including Historical Data) to Second Training Dataset (including Real Time Data)

1540 — Set Temporal Interval associated with Obtaining Real Time Data associated with Asset 1545 — Compare Prediction Accuracy of Machine Learning Model and Target Prediction Accuracy 1555 — Obtain Real Time Data associated with Asset 1560 — Update Machine Learning Model based an Training Dataset that includes Real Time Data associated with Asset 1565 — Predict Event associated with Asset 1570 — Display Temporal Information associated with Event and Asset

1605 — Identify a Target Value of First Operational Parameter(s) Associated with Asset 1610 — Update Machine Learning Model based an Training Dataset that includes Real Time Data 1615 — Provide the Target Value of First Operational Parameter(s) to Machine Learning Model 1620 — Simulate Operation(s) of Asset using Second Target Value of Second Operational Parameter(s)

1600

SYSTEMS, METHODS, AND DEVICES FOR ASSET SIMULATION AND ANALYTICS

FIELD OF TECHNOLOGY

The following relates to processing facilities including devices such as processing equipment, and more specifically, simulation and analytics techniques associated with the devices.

BACKGROUND

Some processing plants or manufacturing plants may incorporate equipment and sensors which provide measurements associated with the equipment. Techniques for ensuring efficient monitoring of the equipment are desired. For example, efficient configuration and display of graphical information and measurement data associated with the equipment is desired. In some other cases, techniques for ensuring accurate simulation of the equipment and providing recommended operations based on simulation results are desired.

SUMMARY

Example aspects of the present disclosure include:

A method including: identifying a target value of one or more first operational parameters associated with an asset, wherein the asset is associated with at least one industrial process; providing the target value of the one or more first operational parameters to a machine learning model; receiving, in response to the machine learning model processing the target value of the one or more first operational parameters, a second target value of one or more second operational parameters associated with the asset; simulating one or more operations of the asset using the second target value of the one or more second operational parameters; and providing, via a user interface, one or more recommended actions in response to a result associated with simulating the one or more operations.

In some aspects, the machine learning model provides the second target value of the one or more second operational parameters based on a correlation between a plurality of operational parameters of the asset, wherein the plurality of operational parameters include the one or more first operational parameters and the one or more second operational parameters.

In some aspects, the correlation between the plurality of operational parameters of the asset includes: a first correlation between the one or more first operational parameters and the one or more second operational parameters; and a second correlation between one or more third operational parameters associated with the asset and the one or more second operational parameters.

In some aspects, the correlation is based on: a first weighted impact of the one or more first operational parameters with respect to the correlation; and a second weighted impact of the one or more second operational parameters with respect to the correlation, wherein the first weighted impact is different from the second weighted impact.

In some aspects, the method further includes: training the machine learning model based on a training dataset that includes historical data associated with the at least one industrial process, the asset, or both, wherein training the machine learning model includes determining a correlation between the one or more first operational parameters and the one or more second operational parameters.

In some aspects: the asset includes a chiller; and the historical data is associated with at least one of: power consumption, water supply temperature, water return temperature, and water flow associated with the chiller.

In some aspects: the asset includes a pump; and the historical data is associated with at least one of: power consumption, discharge pressure, discharge flow, and wet well level associated with the pump.

In some aspects, the method further includes: updating the machine learning model based on a training dataset that includes real time data associated with the asset, wherein updating the machine learning model includes updating a correlation between the one or more first operational parameters and the one or more second operational parameters.

In some aspects, the method further includes: predicting an event associated with the asset based on the real time data and based on updating the correlation; and displaying temporal information associated with the event and the asset via the user interface.

In some aspects, the one or more first operational parameters are associated with energy consumption of the asset.

In some aspects, the one or more first operational parameters include at least one of: a cooling load associated with the asset; and a discharge flow rate associated with the asset.

In some aspects, the method further includes: setting a temporal interval associated with obtaining real time data associated with the asset, wherein setting the temporal interval is in response to comparing a first training dataset including historical data associated with the asset and a second training dataset including the real time data associated with the asset; and obtaining the real time data based on the temporal interval.

In some aspects, the method further includes: obtaining real time data associated with the asset in response to comparing a prediction accuracy of the machine learning model with respect to detecting one or more anomalies associated with the asset and a target prediction accuracy.

In some aspects, providing the one or more recommended actions includes providing, via the user interface, the target value of the one or more second operational parameters.

In some aspects, providing the one or more recommended actions includes displaying, via the user interface, a graph indicating one or more predictions associated with the asset.

In some aspects, the method further includes: automatically or semi-automatically controlling the one or more operations of the asset in response to receiving the one or more recommended actions, wherein automatically or semi-automatically controlling the one or more operations of the asset includes using the second target value of the one or more second operational parameters.

In some aspects, the asset includes a chiller, a pump, a boiler, a blower, or a compressor.

A system including: a graphical user interface; a processor; and a memory storing data thereon. In some aspects, the memory, when processed by the processor, cause the processor to: identify a target value of one or more first operational parameters associated with an asset, wherein the asset is associated with at least one industrial process; provide the target value of the one or more first operational parameters to a machine learning model; receive, in response to the machine learning model processing the target value of the one or more first operational parameters, a second target value of one or more second operational parameters associated with the asset; simulate one or more operations of the asset using the second target value of the one or more second operational parameters; and provide, via a user interface, one or more recommended actions in response to a result associated with simulating the one or more operations.

An asset health management system including: asset management circuitry that is to aggregate real time data associated with an asset, wherein the asset is associated with at least one industrial process; and analytics circuitry. In some aspects, the analytics circuitry is to: identify a target value of one or more first operational parameters associated with the asset; update a machine learning model based on a training dataset that includes at least a portion of the real time data, wherein updating the machine learning model includes updating a correlation between the one or more first operational parameters associated with the asset and one or more second operational parameters associated with the asset; provide the target value of the one or more first operational parameters to the machine learning model, wherein the machine learning model provides a second target value of the one or more second operational parameters in response to processing the target value of the one or more first operational parameters; and simulate one or more operations of the asset using the second target value of the one or more second operational parameters. In some aspects, the asset management circuitry provides, via dashboard management circuitry, one or more recommended actions in response to a result associated with simulating the one or more operations.

In some aspects, the dashboard management circuitry establishes a connection with the asset management circuitry in response to receiving a request for the real time data associated with the asset; and the asset management circuitry retrieves the real time data in response to the establishment of the connection, wherein retrieving the real time data is based on a mapping between a representation of the asset at a dashboard interface and a representation of the asset at the asset management circuitry.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/implementations in combination with any one or more other aspects/features/implementations.

Use of any one or more of the aspects or features as disclosed herein.

It is to be appreciated that any feature described herein can be claimed in combination with any other feature(s) as described herein, regardless of whether the features come from the same described implementation.

The details of one or more aspects of the disclosure are set forth in the accompanying drawings and the description below. Other features, objects, and advantages of the techniques described in this disclosure will be apparent from the description and drawings, and from the claims.

The preceding is a simplified summary of the disclosure to provide an understanding of some aspects of the disclosure. This summary is neither an extensive nor exhaustive overview of the disclosure and its various aspects, implementations, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, implementations, and configurations of the disclosure are possible utilizing, alone or in combination, one or more of the features set forth above or described in detail below.

Numerous additional features and advantages of the present disclosure will become apparent to those skilled in the art upon consideration of the implementation descriptions provided hereinbelow.

BRIEF DESCRIPTION OF THE DRAWINGS

FIGS. 5B through 5D illustrate aspects of the present disclosure supportive of editing a multi-dimensional representation and configuring an asset.

FIG. 10 illustrates an example process flow that supports asset analytics and simulation in accordance with aspects of the present disclosure.

FIG. 11 illustrates an example process flow that supports relearning and incremental training in accordance with aspects of the present disclosure.

FIG. 13 illustrates an example of a process flow that supports asset monitoring in accordance with aspects of the present disclosure.

FIGS. 15A and 15B illustrates an example process flows that support simulation and analytics of assets in accordance with aspects of the present disclosure.

DETAILED DESCRIPTION

Figure 1:
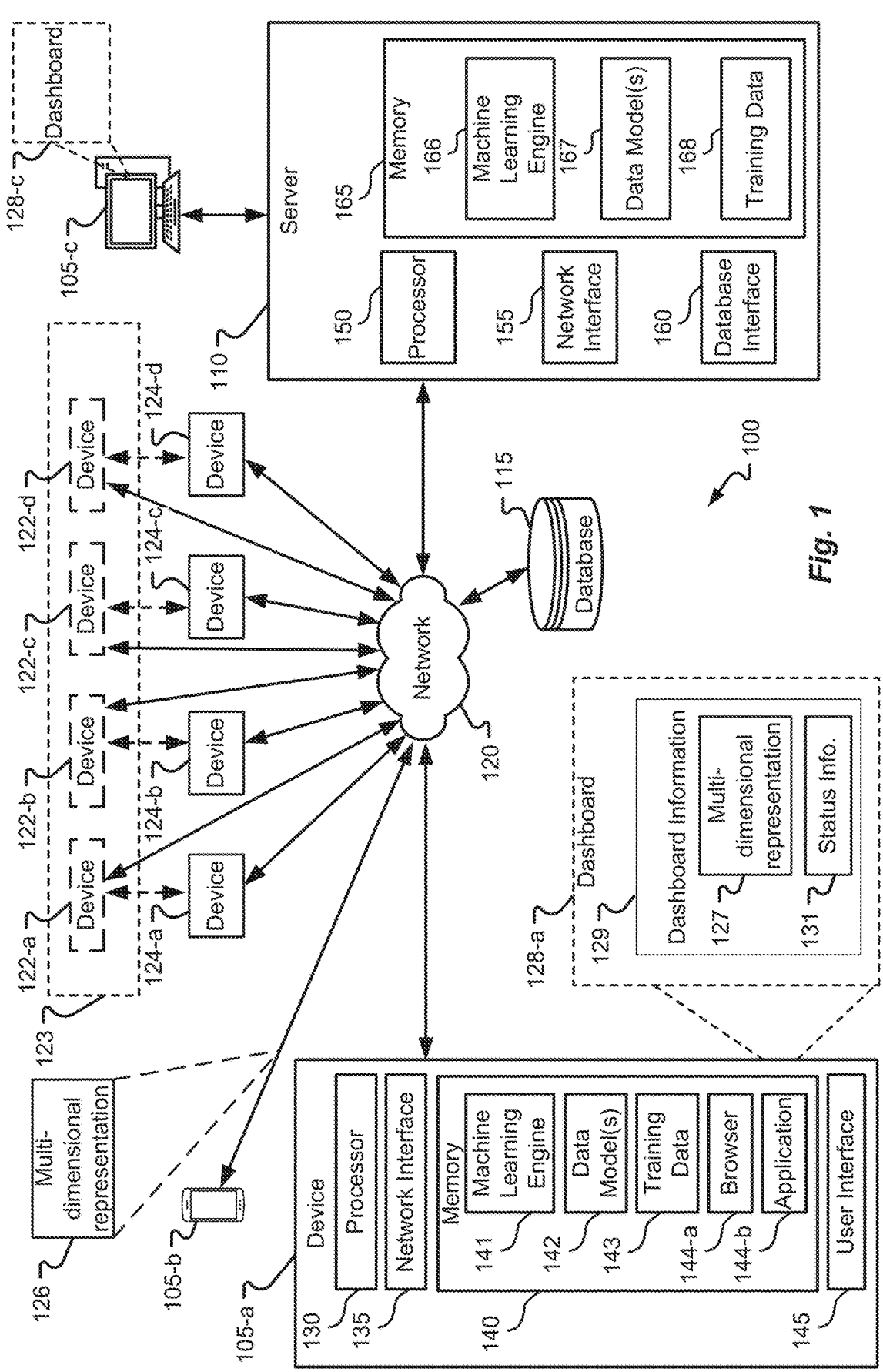
FIG. 1 illustrates an example of a system in accordance with aspects of the present disclosure.

Some systems may support graphical user interfaces for displaying data or information associated with equipment at a processing facility (e.g., petrochemical, refineries, power plants, water treatment plants, etc.). For example, some systems may implement a cloud-based human interface (e.g., an asset health application, a widget, etc.) via which the systems may graphically display information (e.g., measurement data, status information, etc.) associated with the equipment.

According to example aspects of the present disclosure, an asset monitoring system is described that may provide a graphical user interface including information associated with the equipment. The graphical user interface may include graphical representations (e.g., multi-dimensional representations) of the equipment.

In some aspects, the system may bind information (e.g., measurement data, status information, performance data, etc.) of the equipment to the graphical representations. For example, the system may display the information of the equipment via the graphical user interface, which may enhance overall user experience. In some aspects, the system may display the graphical user interface via an asset health application or a browser application (e.g., a web browser). The graphical user interface may be cloud-based or web-based. In an example, the graphical user interface may support importing, selection, conversion, and manipulation of the graphical representations (e.g., two-dimensional representations, three-dimensional representations) of the equipment.

The system may support an integrated user interface whereby a customized device can be input to the system by way of a technical drawing of a device (e.g., processing equipment). For example, the system may electronically receive a first multi-dimensional representation of a device from a first user (e.g., a customer). The first multi-dimensional representation may be, for example, a technical drawing such as an electronic computer aided design (CAD) drawing. Based on the first multi-dimensional representation, the system may generate a second multi-dimensional representation of the device. The system may display, via a graphical user interface, the second multi-dimensional representation and real-time data (e.g., one or more parameters of the device). The graphical user interface may be viewable by a second user.

In an example, the first multi-dimensional representation may be a 3D representation of the device, and the second multi-dimensional representation may be a 2D representation of the device. The second multi-dimensional representation may be in a display format compatible with the system and the graphical user interface. In some aspects, the system may generate the second multi-dimensional representation using a conversion process. In an example, the conversion process may include transforming data of the first multi-dimensional representation into data according to the display format. The system may display real-time and/or historical data associated with the device based on the display format.

The system may support creation and manipulation of an asset inclusive of any quantity of devices (e.g., a single instance of processing equipment, multiple instances of processing equipment, a sensor providing measurement data associated with the equipment, multiple sensors providing measurement data associated with the equipment, etc.). For example, the system may provide drag and drop features supportive of creating, configuring, and managing the asset. In an example, the drag and drop features may support grouping a number of devices (e.g., processing equipment) and/or sensor devices as an asset.

The system may display real-time data (e.g., real-time measurements, readings, etc.) and target ranges (e.g., safe zones, threshold values) of the real-time data. In an example, the system may display the real-time data and/or target ranges via an asset health application, a browser application, or a widget. The system may support graphical indicators supportive of monitoring the asset. For example, the system may display any combination of graphical icons, text, and/or color combinations in association with indicating status information (or changes thereto) of the equipment. In some aspects, the system may generate and display color coded warnings indicating whether the real-time data is included in a target range or outside the target range.

Aspects of the integrated user interface may provide improved user experience in association with asset monitoring. For example, converting device data of a technical drawing into a multi-dimensional representation (e.g., a 2D/3D display format) may support improved asset monitoring when displaying the multi-dimensional representation via a display of a mobile device (e.g., circumventing cases of relatively limited screen space at the mobile device). In some aspects, aspects of the present disclosure support grouping and displaying target parameters (e.g., key parameters in association with asset performance) of an asset, which may support improved monitoring and visibility of the performance or status information of the asset. The system supports self-service functionality via which a user may configure preferences (e.g., color preferences, asset names, etc.) associated with the displayed information.

Aspects of the dashboard functionality described herein provide an improved user experience, which may support improved user actions and responses to the information provided in the dashboard. For example, with the improved monitoring and visibility of the information in the dashboard, a user may provide improved decisions for addressing any faults associated with a monitored asset.

In other cases, some systems may support asset analytics of equipment/devices at a processing facility (e.g. power plants, water treatment plants, etc.). For example, some systems may support asset simulation and analytics based on training data regarding the equipment/devices, in which the training data includes a fixed period of historical data (e.g. a fixed period of measurement readings associated with the equipment/devices, maintenance data). Accordingly, for example, such implementations are disadvantageous because the training data is static (e.g., not updated, not up to date, etc.) and lacks any real-time data (e.g. live measurement readings) regarding the equipment, and this imposes difficulties to know the true or latest status of the equipment/devices, which could be an obstacle for optimizing plant operation (e.g., fail to detect/predict process or equipment anomalies, no optimization of energy consumption, etc.).

Aspects of the present disclosure support techniques for improving the accuracy of simulation and analytics using trained machine learning models. For example, the machine learning models may be trained using historical data, in which the historical data is associated with a processing facility and equipment of the processing facility. In some examples, the historical data may comprise historical plant operation data, historical maintenance logs, and the like. The techniques include obtaining real-time data associated with the equipment and the processing facility, further training the machine learning models using the real-time data (e.g. live measurement readings), and providing recommended actions (e.g., recommended operations, recommended operation parameters, etc.) based on the simulation results. Example aspects of training the machine learning models, further training (also referred to herein as "retraining" or "relearning") the machine learning models, and performing simulations based on the machine learning models are later described herein. As described herein, the further training of the machine learning models may include incremental retraining of the machine learning models, incremental updating of the machine learning models, or the like.

The techniques described herein may provide improved user experience in association with asset simulation and analytics. For example, systems described herein may use machine learning models that are updated based on real-time data, and using the machine learning models, the system may provide analytics (e.g., simulation, prediction, diagnosis, etc.) for securing improved performance (e.g., operational efficiency, etc.) of equipment in a processing facility and reduced operational and other costs (e.g., reduced power consumption, etc.) associated with the equipment. In some examples, aspects of the present disclosure provide a technical effect in which a simulation may trigger automatic data collection, aspects of which are later described herein.

Aspects of the disclosure are initially described in the context of a processing facility. Examples of processes that support asset monitoring are then described. Aspects of the disclosure are further illustrated by and described with reference to apparatus diagrams, system diagrams, and flowcharts that relate to asset monitoring.

FIG. 1 illustrates an example of a system 100 that supports asset monitoring in accordance with aspects of the present disclosure. In some examples, the system 100 may be a process control system applicable for process monitoring and process control within an industrial environment such as a processing facility.

In some aspects, the system 100 may be a distributed process control system capable of executing and controlling processes associated with manufacturing, conversion, production, other processing (e.g., petrochemical, refineries, power plants, water treatment, etc.), or the like. In some examples, the system 100 may be a distributed process control system including controllers (e.g., implemented by a communication device 105 and/or a server 110) connected to devices 122 included in the system 100.

The system 100 may include a communication device 105 (or multiple communication devices 105, for example, communication device 105-a through communication device 105-c), a server 110, a database 115, a communication network 120, devices 122, and devices 124. The communication device 105 may be a wireless communication device. Non-limiting examples of the communication device 105 may include, for example, personal computing devices or mobile computing devices (e.g., laptop computers, mobile phones, smart phones, smart devices, wearable devices, tablets, etc.). In some examples, the communication device 105 may be operable by or carried by a human user. In some aspects, the communication device 105 may perform one or more operations autonomously or in combination with an input by the user, the communication device 105, and/or the server 110.

The server 110 may be, for example, a cloud-based server. In some aspects, the server 110 may be a local server connected to the same network (e.g., LAN, WAN) associated with the communication device 105. The database 115 may be, for example, a cloud-based database. In some aspects, the database 115 may be a local database connected to the same network (e.g., LAN, WAN) associated with the communication device 105 and/or the server 110. The database 115 may be supportive of data analytics, machine learning, and AI processing.

The communication network 120 may facilitate machine-to-machine communications between any of the communication device 105 (or multiple communication device 105), the server 110, or one or more databases (e.g., database 115). The communication network 120 may include any type of known communication medium or collection of communication media and may use any type of protocols to transport messages between endpoints. The communication network 120 may include wired communications technologies, wireless communications technologies, or any combination thereof.

The Internet is an example of the communication network 120 that constitutes an Internet Protocol (IP) network consisting of multiple computers, computing networks, and other communication devices located in multiple locations, and components in the communication network 120 (e.g., computers, computing networks, communication devices) may be connected through one or more telephone systems and other means. Other examples of the communication network 120 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VOIP) network, a cellular network, and any other type of packet-switched or circuit-switched network known in the art. In some cases, the communication network 120 may include of any combination of networks or network types. In some aspects, the communication network 120 may include any combination of communication mediums such as coaxial cable, copper cable/wire, fiber-optic cable, or antennas for communicating data (e.g., transmitting/receiving data).

The devices 122 (e.g., device 122-a through device 122-d) may include any equipment associated with a processing facility. In some aspects, the devices 122 may include equipment of different types (e.g., centrifugal pumps, positive displacement pumps, valves, impellers, motors, etc.). In an example, device 122-a and device 122-b may each be a valve, device 122-c may be a pump (e.g., a centrifugal pump), and device 122-d may be a motor capable of electrically driving the device 122-c. In some aspects, the devices 122 may operate in groups based on equipment type and/or function (e.g., rotating equipment such as centrifugal pumps may operate in groups, in association with an industrial process). For example, the devices 122 may operate in a group in association with providing a target flow rate at a processing facility. Additionally, or alternatively, the devices 122 may operate independently.

The devices 122 may be controlled by the system 100 (e.g., by a communication device 105 or the server 110). In some cases, device 122-a through device 122-d may operate in the same group, and two or more of device 122-a through device 122-d may be in operation at a time based on operational tasks, performance demand and/or scheduling (e.g., shift).

The devices 124 (e.g., device 124-a through device 124-d) may include field devices capable of monitoring or measuring the performance (e.g., measuring performance data) associated with the devices 122. In an example, the devices 124 may include flow rate sensors, pressure sensors, level sensors, temperature sensors, humidity sensors, vibration sensors, accelerometers, or the like. In some examples, the devices 124 may include voltage sensors, impedance analyzers, voltage meters, ammeters, or the like associated with determining a full load current rating of a device 122.

In some examples, a device 122 (e.g., device 122-a) may be physically separate but communicatively coupled from a corresponding device 124 (e.g., device 124-a). In some other examples, a device 122 (e.g., device 122-b) may be mechanically integrated with a corresponding device 124 (e.g., device 124-b). For example, the device 122 (e.g., device 122-b) and the corresponding device 124 (e.g., device 124-b) may be integrated within a shared housing.

The devices 124 may be, for example, communication devices capable of transmitting and receiving signals (e.g., via wired or wireless communications). For example, each device 124 may be capable of transmitting any measured performance data (i.e., measurement data) to a communication device 105, the database 115, and/or the server 110, for example, via the communications network 120. In some cases, a device 124 may transmit measurement data directly to a communication device 105 (e.g., via a radio frequency (RF) communications link established between the device 124 and the communication device 105, via a wired communication link between the device 124 and the communication device 105, etc.), and the communication device 105 may store the measurement data to the database 115 and/or transmit the measurement data to the server 110.

In some cases, the devices 124 may be mechanically coupled to the devices 122. Additionally, or alternatively, the devices 124 may be wirelessly coupled to the devices 122. In some aspects, the devices 124 may be internet of things (IoT) devices capable of communicating and/or receiving data over the network 120.

Various sensor device configurations may be implemented in accordance with aspects of the present disclosure. For example, some devices 124 (e.g., flow rate sensors, pressure sensors, level sensors, temperature sensors, humidity sensors, vibration sensors, etc.) may measure parameters corresponding to individual devices 122 (e.g., device 122-a), a group of devices 122 (e.g., device 122-a through device 122-d), or an environment (e.g., processing facility) in which the devices 122 are implemented.

In another example, the devices 124 may measure operational parameters corresponding to individual devices 122. For example, device 124-a may measure suction pressure and/or flow rate in association with device 122-a (e.g., a valve) and device 122-c (e.g., centrifugal pump). In another example, device 124-b may measure discharge pressure in association with device 122-b and device 122-c (e.g., centrifugal pump, positive displacement pumps). In another example, device 124-c may measure impeller temperature and/or vibration at device 122-c (e.g., centrifugal pump). In some other examples, device 124-d may measure current, full load current rating, and/or motor temperature associated with the device 122-d (e.g., a motor).

According to example aspects of the present disclosure, the system 100 may support predictive modeling of equipment operation (e.g., performance, equipment failure, etc.) based on data measured and recorded by the devices 124. Example aspects of the predictive modeling are later described with reference to machine learning engine 141. In some aspects, the machine learning engine 141 may support pre-processing, training, modeling, and auto-deployment.

In various aspects, settings of the any of the communication devices 105, the server 110, database 115, the communication network 120, the devices 122, and the devices 124 may be configured and modified by any user and/or administrator of the system 100. Settings may include thresholds or parameters described herein, as well as settings related to how data is managed. Settings may be configured to be personalized for one or more communication devices 105, users of the communication devices 105, and/or other groups of entities, and may be referred to herein as profile settings, user settings, or organization settings. In some aspects, rules and settings may be used in addition to, or instead of, parameters or thresholds described herein. In some examples, the rules and/or settings may be personalized by a user and/or administrator for any variable, threshold, user (user profile), communication device 105, entity, or groups thereof.

Aspects of the communication devices 105 and the server 110 are further described herein. A communication device 105 (e.g., communication device 105-a) may include a processor 130, a network interface 135, a memory 140, and a user interface 145. In some examples, components of the communication device 105 (e.g., processor 130, network interface 135, memory 140, user interface 145) may communicate over a system bus (e.g., control busses, address busses, data busses) included in the communication device 105. In some cases, the communication device 105 may be referred to as a computing resource.

In some cases, the communication device 105 may transmit to or receive packets from one or more other devices (e.g., another communication device 105, the server 110, the database 115, devices 122, devices 124) via the communication network 120, using the network interface 135. The network interface 135 may include, for example, any combination of network interface cards (NICs), network ports, associated drivers, or the like. Communications between components (e.g., processor 130, memory 140) of the communication device 105 and one or more other devices (e.g., another communication device 105, the database 115, devices 122, devices 124) connected to the communication network 120 may, for example, flow through the network interface 135.

In some aspects, the communication device 105 may transmit to or receive packets from another communication device 105 (e.g., communication device 105-b), one or more devices 124, the database 115, and/or the server 110 directly (e.g., via wired or wireless communications). Additionally, or alternatively, the communication device 105 may transmit to or receive packets from another communication device 105 (e.g., communication device 105-b), one or more devices 124, the database 115, and/or the server 110 indirectly (e.g., via a device management platform, via the communications network 120, via a cloud infrastructure, such as Azure, AWS etc.). Example implementations of communicating packets or data from one or more devices 124 to the communication device 105, for example, using the device management platform or the cloud infrastructure are later described with reference to the following figures.

The processor 130 may correspond to one or multiple computer processing devices. For example, the processor 130 may include a silicon chip, such as a FPGA, an ASIC, any other type of IC chip, a collection of IC chips, or the like. In some aspects, the processors may include a microprocessor, CPU, a GPU, or plurality of microprocessors configured to execute the instructions sets stored in a corresponding memory (e.g., memory 140 of the communication device 105). For example, upon executing the instruction sets stored in memory 140, the processor 130 may enable or perform one or more functions of the communication device 105. In some examples, the processor 130 may enable or perform one or more functions of modules of the communication device 105 later described with reference to the following figures.

The memory 140 may include one or multiple computer memory devices. The memory 140 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 140, in some examples, may correspond to a computer-readable storage media. In some aspects, the memory 140 may be internal or external to the communication device 105.

The processor 130 may utilize data stored in the memory 140 as a neural network (also referred to herein as a machine learning network). The neural network may include a machine learning architecture. In some aspects, the neural network may be or include an artificial neural network (ANN). In some other aspects, the neural network may be or include any machine learning network such as, for example, a deep learning network, a convolutional neural network, or the like. Some elements stored in memory 140 may be described as or referred to as instructions or instruction sets, and some functions of the communication device 105 may be implemented using machine learning techniques.

The memory 140 may be configured to store instruction sets, neural networks, and other data structures (e.g., depicted herein) in addition to temporarily storing data for the processor 130 to execute various types of routines or functions. For example, the memory 140 may be configured to store program instructions (instruction sets) that are executable by the processor 130 and provide functionality of machine learning engine 141 described herein. The memory 140 may also be configured to store data or information that is useable or capable of being called by the instructions stored in memory 140. One example of data that may be stored in memory 140 for use by components thereof is a data model(s) 142 (e.g., a neural network model or other model described herein) and/or training data 143 (also referred to herein as a training data and feedback).

The machine learning engine 141 may include a single or multiple engines. The communication device 105 (e.g., the machine learning engine 141) may utilize one or more data models 142 for recognizing and processing information obtained from other communication devices 105, the server 110, devices 122, devices 124, and the database 115. In some aspects, the communication device 105 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142.

The data model(s) 142 may be built and updated by the machine learning engine 141 based on the training data 143. The data model(s) 142 may be provided in any number of formats or forms. Non-limiting examples of the data model(s) 142 include Decision Trees, Support Vector Machines (SVMs), Nearest Neighbor, and/or Bayesian classifiers. In some aspects, the data model(s) 142 may include a predictive model such as an autoregressive model. Other example aspects of the data model(s) 142, such as generating (e.g., building, training) and applying the data model(s) 142, are described with reference to the figure descriptions herein.

Figure 2:
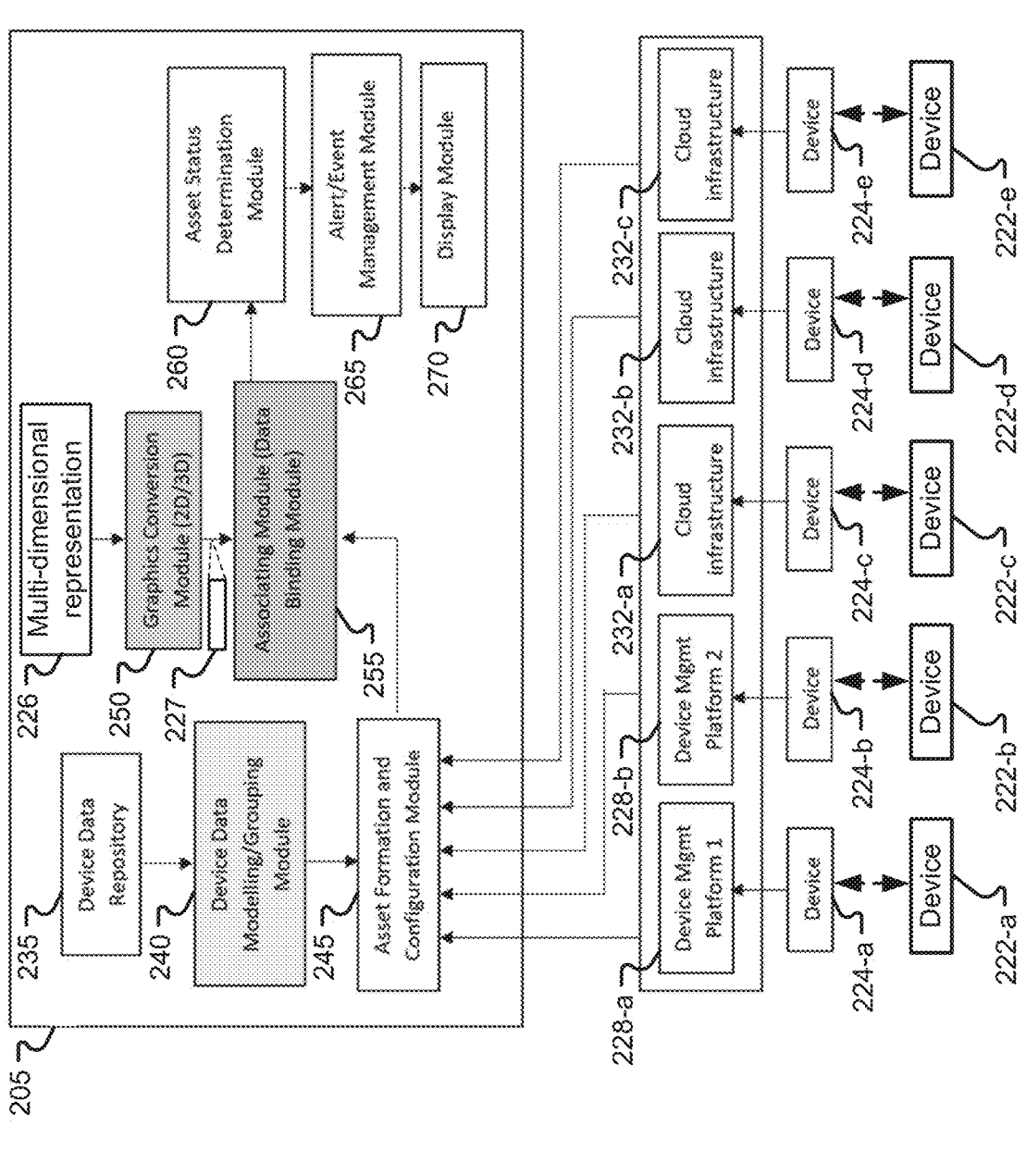
FIG. 2 illustrates an example of system in accordance with aspects of the present disclosure.

According to aspects of the present disclosure, the data model(s) 142 may include a first type of data model 142 (e.g., a baseline model or a stable period model) and a second type of data model 142 (e.g., an autoregressive model), examples of which are at least described herein with reference to FIGS. 2 and 3.

In some examples, the training data 143 may include aggregated measurement data (e.g., current measurement values, previous measurement values) recorded by the devices 124. In some aspects, the aggregated measurement data may include measurement data recorded with respect to one or more temporal periods and/or one or more parameters (e.g., performance parameters, status indicators, etc.) associated with the devices 122.

In some cases, the training data 143 may include performance data predicted by the machine learning engine 141 (i.e., supportive of forward learning). The predicted performance data may include, for example, predicted faults associated with the devices 122, temporal information (e.g., predicted temporal instances, predicted temporal durations, etc.) associated with the predicted faults, causal information associated with the predicted faults, or the like.

In some cases, the predicted performance data may include predicted values corresponding to the operational parameters (e.g. suction pressure, flow rate, discharge pressure, impeller temperature, vibration levels, current, full load current rating, motor temperature, etc.) associated with the devices 122. In some examples, the predicted performance data may include deviation values (also referred to herein as a deviation magnitude) between the predicted values and a threshold value.

In some other examples, the predicted performance data may include, for a parameter(s) associated with the devices 122, a quantity of predicted values exceeding the threshold value, and the machine learning engine 141 may determine a predicted status (e.g., predicted fault) of the devices 122 based on whether the quantity of predicted values exceeding the threshold value exceeds a threshold quantity.

In some other examples, the training data 143 may include operational parameters and/or configurations of devices 122 (e.g., location, configuration, flow rate, rotational speed, etc.).

The machine learning engine 141 may be configured to analyze aggregated measurement information (e.g., measurement values) associated with the devices 122. In some examples, the devices 122 may include centrifugal pumps, valves, impellers, and/or motors, and the measurement information may include measured values corresponding to parameters such as suction pressure, flow rate, discharge pressure, impeller temperature, vibration levels, current, full load current rating, motor temperature, or the like. In some cases, the measurement information may include measured values corresponding to at least two of the parameters (e.g., flow rate and rotational speed).

According to example aspects of the present disclosure, the machine learning engine 141 may calculate the predicted performance data (e.g., predicted faults, predicted performance values, etc.) of the devices 122 based on deviation values between current measurement values and a threshold value. In some cases, the machine learning engine 141 may calculate the predicted performance data based on deviation values between previous measurement values (e.g., historical information) and the threshold value.

In some other aspects, the machine learning engine 141 may be configured to analyze the performance data (e.g., suction pressure, flow rate, discharge pressure, impeller temperature, vibration levels, current, full load current rating, motor temperature, etc.) predicted by the machine learning engine 141 (i.e., supportive of forward learning).

The machine learning engine 141 may analyze any information (e.g., measured performance data, predicted performance data, parameters, and/or configurations) described herein that is historical or in real-time. The machine learning engine 141 may be configured to receive or access information from the communication device 105, the server 110, the database 115, the devices 122, and/or the devices 124. The machine learning engine 141 may build any number of profiles such as, for example, profiles associated with the system 100 (e.g., profiles associated with a processing facility), profiles associated with devices 122, profiles associated with a device 124, etc. using automatic processing, using artificial intelligence and/or using input from one or more users associated with the communication device 105. The profiles may be, for example, configuration profiles, performance profiles, etc. The machine learning engine 141 may use automatic processing, artificial intelligence, and/or inputs from one or more users of the communication devices 105 to determine, manage, and/or combine information relevant to a configuration profile.

The machine learning engine 141 may determine configuration profile information based on a user's interactions with information. The machine learning engine 141 may update (e.g., continuously, periodically) configuration profiles based on new information that is relevant. The machine learning engine 141 may receive new information from any communication device 105, the server 110, the database 115, the devices 122, the devices 124, etc. Profile information may be organized and classified in various manners. In some aspects, the organization and classification of configuration profile information may be determined by automatic processing, by artificial intelligence and/or by one or more users of the communication devices 105.

The machine learning engine 141 may create, select, and execute appropriate processing decisions. Example processing decisions may include analysis of measured performance data, predicted performance data, configuration of a communication device 105, configuration of devices 122, and/or configuration of devices 124. Processing decisions may be handled automatically by the machine learning engine 141, with or without human input.

The machine learning engine 141 may store, in the memory 140 (e.g., in a database included in the memory 140), historical information (e.g., measurement data, predicted performance data, deviation values, configurations, etc.). Data within the database of the memory 140 may be updated, revised, edited, or deleted by the machine learning engine 141. In some aspects, the machine learning engine 141 may support continuous, periodic, and/or batch fetching of data (e.g., from devices 122, devices 124, a central controller, communication devices 105, etc.) and data aggregation.

The communication device 105 may render a presentation (e.g., visually, audibly, using haptic feedback, etc.) of an application 144 (e.g., a browser application 144-*a*, an application 144-*b*). The application 144-*b* may be an application associated with executing, controlling, and/or monitoring devices 122 of the system 100 as described herein. For example, the application 144-*b* may enable control of the communication device 105, devices 122, and/or devices 124 described herein.

For example, the application 144-*b* may be an asset health application capable of displaying a dashboard 128-*a*. The dashboard 128-*a* may include dashboard information 129 associated with the devices 122 and/or the devices 124. Example aspects of the dashboard 128-*a* and dashboard information 129 are later illustrated at FIGS. 4 and 5B.

In some other examples, the application 144-*b* may be an application that supports asset simulation and analytics associated with the devices 122 and/or the devices 124, example aspects of which are later described herein.

In an example, the communication device 105 may render the presentation via the user interface 145. The user interface 145 may include, for example, a display (e.g., a touchscreen display), an audio output device (e.g., a speaker, a headphone connector), or any combination thereof. In some aspects, the applications 144 may be stored on the memory 140. In some cases, the applications 144 may include cloud-based applications or server-based applications (e.g., supported and/or hosted by the database 115 or the server 110). Settings of the user interface 145 may be partially or entirely customizable and may be managed by one or more users, by automatic processing, and/or by artificial intelligence.

In an example, any of the applications 144 (e.g., browser application 144-*a*, application 144-*b*) may be configured to receive data in an electronic format and present content of data via the user interface 145. For example, the applications 144 may receive data from another communication device 105, the server 110, the database 115, devices 122, and/or devices 124 via the communications network 120, and the communication device 105 may display the content via the user interface 145.

The database 115 may include a relational database, a centralized database, a distributed database, an operational database, a hierarchical database, a network database, an object-oriented database, a graph database, a NoSQL (non-relational) database, etc. In some aspects, the database 115 may store and provide access to, for example, any of the stored data described herein.

The server 110 may include a processor 150, a network interface 155, database interface instructions 160 (also referred to herein as database interface 160), and a memory 165. In some examples, components of the server 110 (e.g., processor 150, network interface 155, database interface 160, memory 165) may communicate over a system bus (e.g., control busses, address busses, data busses) included in the server 110. The processor 150, network interface 155, and memory 165 of the server 110 may include examples of aspects of the processor 130, network interface 135, and memory 140 of the communication device 105 described herein.

For example, the processor 150 may be configured to execute instruction sets stored in memory 165, upon which the processor 150 may enable or perform one or more functions of the server 110. In some examples, the server 110 may transmit to or receive packets from one or more other devices (e.g., a communication device 105, the database 115, another server 110) via the communication network 120, using the network interface 155. Communications between components (e.g., processor 150, memory 165) of the server 110 and one or more other devices (e.g., a communication device 105, the database 115, devices 122, a device 124, etc.) connected to the communication network 120 may, for example, flow through the network interface 155.

In some examples, the database interface instructions 160 (also referred to herein as database interface 160), when executed by the processor 150, may enable the server 110 to send data to and receive data from the database 115. For example, the database interface instructions 160, when executed by the processor 150, may enable the server 110 to generate database queries, provide one or more interfaces for system administrators to define database queries, transmit database queries to one or more databases (e.g., database 115), receive responses to database queries, access data associated with the database queries, and format responses received from the databases for processing by other components of the server 110.

The memory 165 may be configured to store instruction sets, neural networks, and other data structures (e.g., depicted herein) in addition to temporarily storing data for the processor 150 to execute various types of routines or functions. For example, the memory 165 may be configured to store program instructions (instruction sets) that are executable by the processor 150 and provide functionality of a machine learning engine 166. One example of data that may be stored in memory 165 for use by components thereof is a data model(s) 167 (e.g., any data model described herein, a neural network model, etc.) and/or training data 168.

The data model(s) 167 and the training data 168 may include examples of aspects of the data model(s) 142 and the training data 143 described with reference to the communication device 105. The machine learning engine 166 may include examples of aspects of the machine learning engine 141 described with reference to the communication device 105. For example, the server 110 (e.g., the machine learning engine 166) may utilize one or more data models 167 for recognizing and processing information obtained from communication devices 105, another server 110, the database 115, the devices 122, and/or the devices 124. In some aspects, the server 110 (e.g., the machine learning engine 166) may update one or more data models 167 based on learned information included in the training data 168.

In some aspects, components of the machine learning engine 166 may be provided in a separate machine learning engine in communication with the server 110.

Example aspects of the present disclosure may include applying advances in data storage technologies (e.g., implemented at the memory 140, database 115, and/or memory 165) with smart sensors (e.g., devices 124) to capture and store all the relevant data pertaining to any equipment/ process. For example, the techniques described herein may include applying one or more mechanisms to extract actionable insight (e.g., fault prediction, fault diagnosis and analysis, etc.) from the data and provide situational recommendations (e.g., recommended operator actions, recommended maintenance actions) based on the extracted insight.

The data model(s) 142 may include non-linear, self-learning and dynamic data based models for continuous monitoring of devices 122 for the early detection and diagnosis of failures. Aspects of the present disclosure may support building and/or training a data model(s) 142 using machine learning techniques that are able to capture operational variations contained in the dataset without human intervention. For example, Aspects of the present disclosure support building a data model(s) 142 using process data associated with operational variations (e.g., normal, faulty) associated with devices 122 and the system 100. In some cases, the operational variations may be identified based on information provided by domain experts (e.g., experienced operators of the system 100, the devices 122, and/or the devices 124).

In an example, the data model(s) 142 may be trained or may learn during a training phase about patterns in the dataset for identifying different fault types. In some aspects, the data model(s) 142 as trained may be deployed to predict equipment statuses based on available data. In an example, for devices 122 (e.g., rotating equipment) included in the system 100 (e.g., a processing facility), the system 100 and/or communication devices 105 may notify maintenance engineers of root causes associated with a predicted fault and/or and recommendations (e.g., operator actions, maintenance actions) for addressing the predicted fault, by monitoring the data using the data model(s) 142 and identified problematic "fingerprints."

Aspects of the present disclosure include a system 100 supportive of asset monitoring. An example implementation with reference to the system 100 of FIG. 1 is described herein. It is to be understood that while a communication device 105-*a*, a communication device 105-*b*, and a server 110 are described as performing a number of the operations described with reference to FIG. 1, any device (e.g., another server 110, another communication device 105) may perform the operations described herein.

The server 110 may receive a multi-dimensional representation 126 of an asset 123. The asset 123 may be associated with an industrial process (e.g. charging a teapot with water for making and dispensing tea within the process environment) associated with the system 100. In an example, the server 110 may receive the multi-dimensional representation 126 from the communication device 105-*b*. Additionally, or alternatively, the server 110 may receive the multi-dimensional representation 126 from the communication device 105-*a* or the database 115.

The server 110 may automatically generate a multi-dimensional representation 127 of the asset 123 based on the multi-dimensional representation 126. In an example, in generating the multi-dimensional representation 127, the server 110 may map one or more operational parameters associated with the asset 123 to the multi-dimensional representation 127. In another example of generating the multi-dimensional representation 127, the server 110 may associate any combination of devices 122 (e.g., device 122-*a* through device 122-*d*) to the asset 123.

The multi-dimensional representation 126 may be a three-dimensional graphical representation of the asset 123. In an example, the multi-dimensional representation 126 may be a technical drawing such as a CAD drawing. In some aspects, the multi-dimensional representation 126 may be in a data format unrelated to the system 100. For example, the multi-dimensional representation 126 may be in a data format different from multi-dimensional representations 127 displayable on the dashboard 128-*a*.

The server 110 may generate the multi-dimensional representation 127 according to a format of the system 100. In an example, the data format of the multi-dimensional representation 126 may be different from the data format of the multi-dimensional representation 127. For example, the data format of the multi-dimensional representation 126 may be incompatible with the system 100, the application 144-*a* (e.g., browser application), or the application 144-*b* (e.g., asset health application). The data format of the multi-dimensional representation 127 may be compatible with the system 100, the application 144-a (e.g., browser application), and the application 144-b (e.g., asset health application)

The multi-dimensional representation 127 may be a two-dimensional vector graphic representation of the asset 123. In some aspects, a data format of the multi-dimensional representation 127 may be different from a data format of the multi-dimensional representation 126. Aspects of the present disclosure support any quantity of dimensions for the multi-dimensional representation 126 or the multi-dimensional representation 127. For example, the multi-dimensional representation 127 may be a three-dimensional representation.

In some aspects, generating the multi-dimensional representation 127 may include converting the multi-dimensional representation 126 into the multi-dimensional representation 127. Example aspects of a transformation process associated with converting the multi-dimensional representation 126 to the multi-dimensional representation 127 are later described herein.

The operational parameters may include, for example, temperature, pressure, flow rate, humidity, vibration, full load current rating, power, and carbon dioxide level, but is not limited thereto. For example, the operational parameters may include any parameter associated with monitoring operational performance of the devices 122, the asset 123, and any industrial process associated with the devices 122 or the asset 123.

The server 110 may transmit the multi-dimensional representation 127 to the communication device 105-a. The communication device 105-a may display the multi-dimensional representation 127 via user interface 145. For example, the communication device 105-a may display the dashboard 128-a via user interface 145. The dashboard 128-a may be implemented, for example, using application 144-a (e.g., a browser application) or application 144-b (e.g., an asset health application).

The dashboard 128-a may include status information associated with the asset 123. The status information may include values of the operational parameters associated with the asset 123. The values may include real-time measurements provided by the devices 124. In some aspects, the server 110 may access the values from the devices 124, via a device platform application or a cloud infrastructure, such as Azure, AWS, aspects of which are later illustrated at the following figures. Additionally, or alternatively, the values may include historical measurements associated with the asset 123. In an example, the server 110 may access the historical measurements from a data repository (e.g., included in database 115).

Aspects of the system 100 support assigning or grouping one or more of the devices 122 as an asset (e.g., asset 123). In an example, the communication device 105-a may receive, via the user interface 145, a user input associated with assigning a device 122 (e.g., device 122-a, device 122-b, etc.) as asset 123. Based on the user input, the server 110 may assign the device 122 to the asset 123. In an example, for device 122 assigned as the asset 123, the server 110 may access device data of the device 122. The server 110 may convert the device data of the device 122 into at least one type of data structure representative of the asset 123. In some aspects, for multiple devices 122 assigned as the asset 123, the server 110 may unify respective data structures of the devices 122 into a single data structure.

The examples of asset monitoring described herein support implementations in which a single device 122 (e.g., device 122-a) or a group of devices 122 (e.g., devices 122-a through device 122-d) are assigned as an asset (e.g., asset 123). For example, aspects of the system 100 support grouping one or more of the devices 122 as asset 123. In an example, the communication device 105-a may receive, via the user interface 145, a user input associated with grouping a combination of the devices 122. In an example of the user input, a user may provide an input selecting device 122-a through device 122-d in association with an industrial process (e.g., controlling a flow rate). Based on the user input, the server 110 may assign the devices 122 to the asset 123.

The server 110 may group the devices 122 in response to the user input. In an example of grouping the devices 122 (e.g., devices 122-a through devices 122-d), the server 110 may access device data of the devices 122. The server 110 may convert the device data of the devices 122 into at least one type of data structure representative of the asset 123.

The system 100 may support user configuration of the asset 123. For example, the server 110 may configure the asset 123 based on a user input. The user input may include, for example, any input associated with creating, deleting, selecting, modifying, and/or configuring the asset 123. Configuring the asset 123 may include configuring a data structure of the asset 123.

In an example of configuring the asset 123, the system 100 may create or modify a hierarchy associated with the asset 123. Hierarchy (also referred to as plant hierarchy) refers to various equipment in a processing facility that are organized into layered architectures based on a particular physical model. For example, the system 100 may support creating or modifying a hierarchy associated with the devices 122 (e.g., device 122-a through device 122-d) included in the asset 123. Additionally, or alternatively, the system 100 may support creating or modifying a hierarchy associated with components of each device 122.

The system 100 may support an asset library. The asset library may be stored at a memory (e.g., memory 140, memory 165) or database 115 described herein. In an example, the server 110 may store or add the asset 123 and/or other assets 123 (not illustrated) to the asset library. In another example, the server 110 may delete any asset 123 from the asset library. In some aspects, the server 110 may create or configure an identifier associated with any asset 123 stored in the asset library. The identifier may be, for example, a numerical, alphanumerical, or graphical identifier but is not limited thereto.

The system 100 may support generating or creating a model associated with the asset 123. The model may include one or more algorithms associated with aggregating one or more operational parameters (e.g., temperature, pressure, etc.) described herein. For example, the server 110 may aggregate data including values of operational parameters (e.g., temperature, pressure, etc.) specified in the model. The server 110 may transmit the aggregated data to the communication device 105-a, and the communication device 105-a may display the aggregated data via the dashboard 128-a.

In some other aspects, the server 110 may calculate additional operational parameters associated with the asset 123 based on the aggregated data. The additional operational parameters may be different from the operational parameters as measured by the devices 124. For example, the server 110 may calculate an efficiency of the asset 123 based on the temperature, pressure, and/or any other operational parameters. The server 110 may further configure the model, reconfigure the model, or generate additional models therefrom in association with calculating operational parameters different from the operational parameters measured by the devices 124.

Aspects of the present disclosure support configuring the multi-dimensional representation 127 via the user interface 145 (e.g., via the dashboard 128-*a*). For example, the server 110 may generate a set of properties corresponding to the multi-dimensional representation 127, and the properties may be configurable via the user interface 145. Examples of the properties include a tag, range, shape, and unit measurement of the multi-dimensional representation 127, but are not limited thereto.

The tag may be an identifier associated with the multi-dimensional representation 127 of the asset 123. In an example, the tag may include any combination of numbers, letters, and graphics (e.g., icons, images, etc.) tied to the asset 123 (and/or devices 122 included therein). The communication device 105-*a* may display the tag via the user interface 145 (e.g., via the dashboard 128).

The range may be associated with an operational parameter described herein. The range is configurable by asset management module 310 later described with reference to FIGS. 3A and 3B. The range may be any range as per requirements of a device 122. Example ranges include: 0-20 mA, 0-100%, 0-5 bar, etc., but are not limited thereto.

The shape of the multi-dimensional representation 127 may be configurable via the user interface 145 (e.g., dashboard 128-*a*). For example, the system 100 may support user inputs associated with adjusting features (e.g., width, height, curvature, lines, etc.) representative of the multi-dimensional representation 127. Example aspects of the tag, range, and shape later described herein.

The server 110 may select operational parameters for monitoring the asset 123 based on characteristics of the asset 123. For example, based on the multi-dimensional representation 126 of the asset 123 (and/or from respective multi-dimensional representations 126 of devices 122 included in the asset 123), the server 110 may identify and process characteristics (e.g., dimensions, operational capabilities, etc.) of the asset 123. In the example of FIG. 1, the server 110 may identify from the multi-dimensional representation 126 of the asset 123 (and/or from respective multi-dimensional representations 126 of devices 122) that device 122-*a* is a valve, device 122-*b* is a valve, device 122-*c* is a centrifugal pump, and device 122-*d* is a motor.

In an example of the operational parameters, the server 110 may monitor suction pressure and/or flow rate in association with device 122-*a* (e.g., a valve) and device 122-*c* (e.g., centrifugal pump). In another example, the server 110 may monitor discharge pressure in association with device 122-*b* (e.g., a valve) and device 122-*c*. In another example, the server 110 may monitor impeller temperature and/or vibration of device 122-*c* (e.g., centrifugal pump). In some other examples, the server 110 may monitor current, full load current rating, and/or motor temperature associated with the device 122-*d* (e.g., a motor). As described herein, the values of the operational parameters may be measured by devices 124.

In some aspects, based on processing the characteristics (e.g., dimensions, operational capabilities, etc.) of the asset 123, the server 110 may calculate and/or select threshold criteria associated with the operational parameters. In an example, the threshold criteria may include a target operational range associated with the asset 123 or any of the devices 122 included therein. For example, the target operational ranges may correspond to operational parameters of the asset 123 or any of the devices 122.

Figure 4:
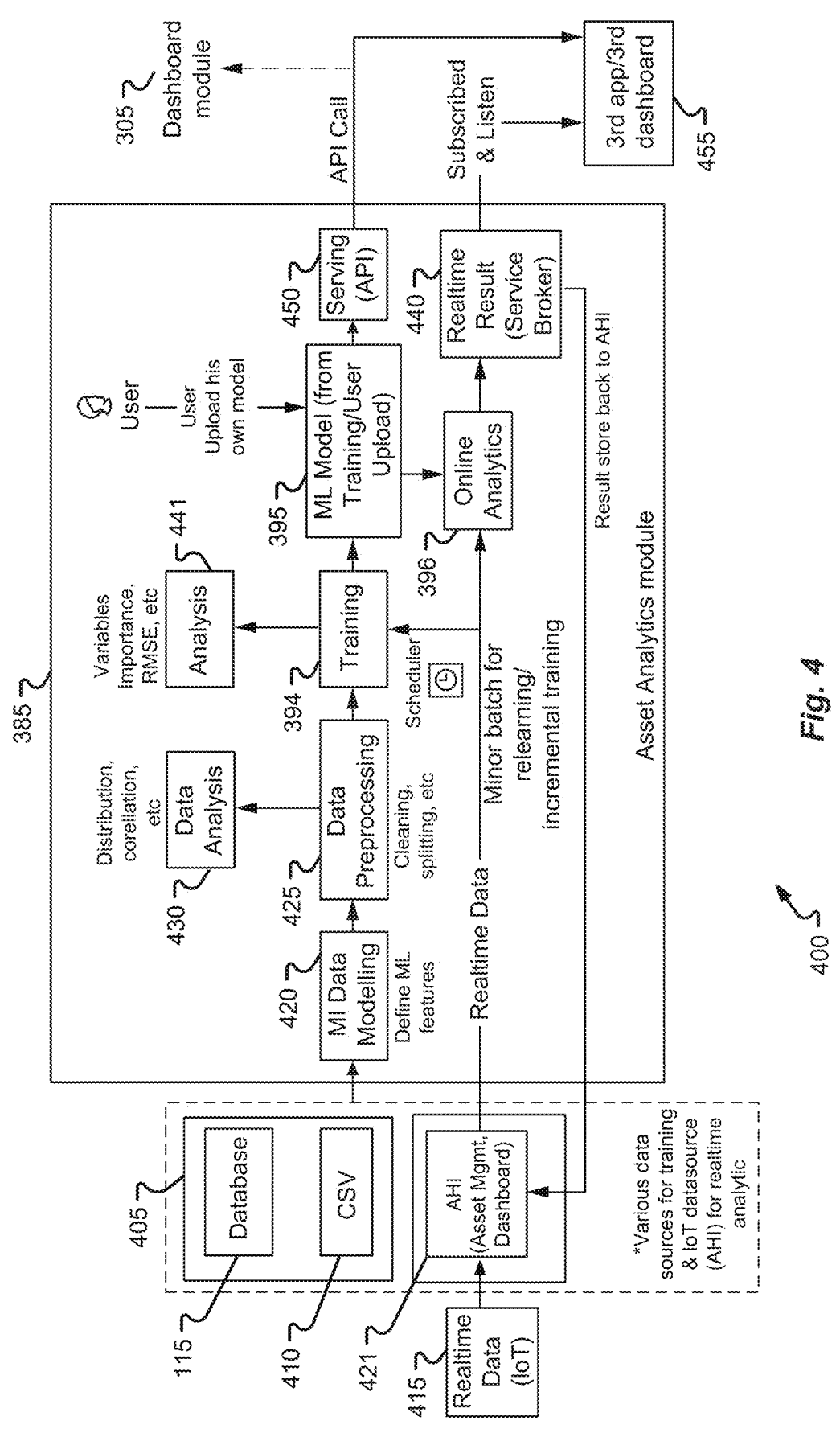
FIG. 4 illustrates an example block diagram that supports asset analytics and simulation in accordance with aspects of the present disclosure.
Figure 5A:
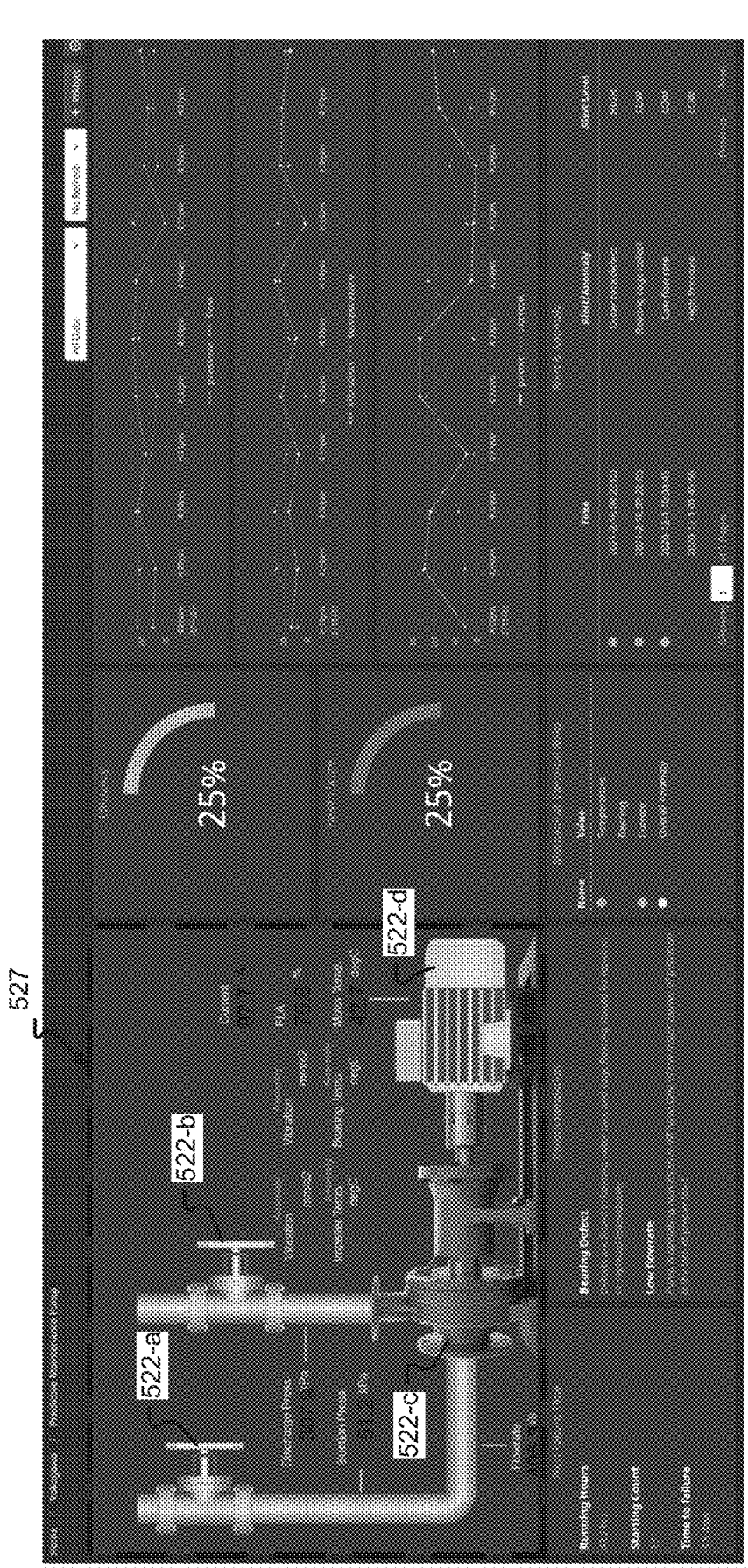
FIG. 5A illustrates an example of dashboard information in accordance with aspects of the present disclosure.
Figure 5B:
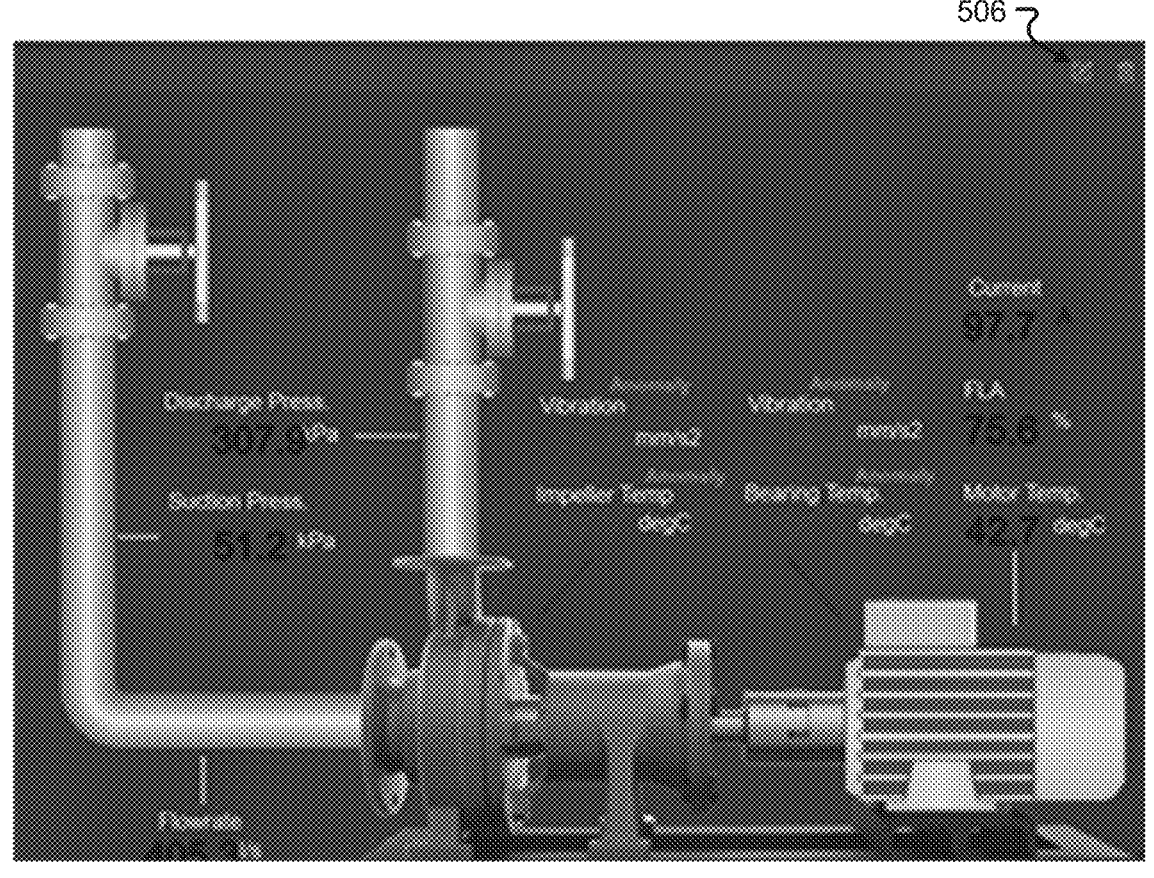

The system 100 may support displaying any combination of operational parameters (e.g., temperature, pressure, flow rate, humidity, vibration, full load current rating, power, carbon dioxide level, etc.) and corresponding target operational ranges described herein. In some aspects, the system 100 may support displaying textual descriptions of the operational parameters and numerical values corresponding to the operational parameters. Example aspects of displaying the textual descriptions and numerical values are illustrated at FIGS. 4, 5A, and 5B.

In some aspects, the system 100 may support displaying pixels associated with the multi-dimensional representation 127 in accordance with the values of the operational parameters. For example, the server 110 may map the operational parameters to the multi-dimensional representation 127. Mapping the operational parameters may include segmenting the multi-dimensional representation 127 into pixels. In an example, mapping the operational parameters may include associating (e.g., mapping) candidate values of the operational parameters to candidate pixel values of the pixels. For example, the server 110 may associate (e.g., map) the candidate values to candidate colors, brightness, and/or contrast of the pixels. Accordingly, for example, in displaying the multi-dimensional representation 127, the communication device 105-*a* may display pixels thereof based on the mapping.

In an example, if the temperature of the device 122-*d* (e.g., motor) is in a target operational range (e.g., a target temperature range), the communication device 105-*a* may display the multi-dimensional representation 127 of the device 122-*d* in green. In another example, if the temperature of the device 122-*d* is below the target operational range, the communication device 105-*a* may display the multi-dimensional representation 127 of the device 122-*d* in blue. In another example, if the temperature of the device 122-*d* is below the target operational range and below a further threshold value, the communication device 105-*a* may display the multi-dimensional representation 127 of the device 122-*d* in grey. If the temperature of the device 122-*d* is above the target operational range, the communication device 105-*a* may display the multi-dimensional representation 127 of the device 122-*d* in orange. In another example, if the temperature of the device 122-*d* is above the target operational range and exceeds a further threshold value, the communication device 105-*a* may display the multi-dimensional representation 127 of the device 122-*d* in red.

The system 100 may support generating status indicators and outputting notifications based on the operational parameters of the asset 123 (e.g., devices 122 included in the asset 123). For example, the server 110 may compare the values of the operational parameters to threshold criteria (e.g., target operational ranges, target threshold values, etc.). In an example, the communication device 105-*a* may display a status indicator based on a result of the comparison. For example, the status indicator may include an indication (e.g., text, color, a graphical icon, etc.) of whether a defect is present at the asset 123 or a device 122 thereof. In some aspects, the status indicator may include an indication (e.g., text, color, a graphical icon, etc.) of whether the asset 123 or devices 122 thereof is operating within a target operational range.

In an example, the server 110 may transmit an electronic communication to the communication device 105-*a*, and the electronic communication may include an indication of whether a defect is present at the asset 123 or devices 122. In some aspects, the communication device 105-*a* may output a notification if a defect is present. In some other aspects, the communication device 105-*a* may output different types of notifications based on defect type. Examples of the notifications include an audible alert, a visual alert, and a haptic alert.

The system 100 may support predictions of failure events associated with the application 144. For example, the server 110 may provide real-time and/or historical values of the operational parameters to the machine learning engine 141. In response to processing the values, the machine learning engine 141 may generate an output including predicted occurrences of a failure event associated with the asset 123 (or any device 122 included therein). In some aspects, the output may include temporal information associated with the failure event (e.g., time to failure).

The communication device 105-a may display, at the user interface 145 (e.g., dashboard 128-a) the temporal information and/or a recommended action associated with the failure event. Example aspects of displaying predicted occurrences, temporal information, and recommended actions associated with a failure event are illustrated at FIG. 5A.

The server 110 may perform any of the operations described herein (e.g., comparing the values of the operational parameters to threshold criteria, generating status indicators, outputting notifications, transmitting electronic communications, displaying information, etc.) periodically, semi-periodically, and/or based on trigger criteria. Other example aspects of the system 100 according to the present disclosure are later described herein with respect to the following figures.

FIG. 2 illustrates an example of a system 200 that supports asset monitoring in accordance with aspects of the present disclosure. The system 200 may implement example aspects of the system 100 described with reference to FIG. 1.

The system 200 may include a device 205, devices 222 (e.g., device 222-a through device 222-e), devices 224 (e.g., device 224-a through device 224-e), device management platforms 228 (e.g., device management platform 228-a, device management platform 228-b), and cloud infrastructures 232 (e.g., cloud infrastructure 232-a through cloud infrastructure 232-c). The device 205, devices 222, devices 224, device management platforms 228, and cloud infrastructures 232 may include examples of aspects of like elements described herein with reference to reference to FIG. 1

The device 205 may implement aspects of a communication device 105 or a server 110 described herein. In some cases, the device 205 may be referred to as a computing resource. The device 205 may perform any or all of the operations described in the present disclosure.

The device 205 may include a device data repository 235, a device data modeling/grouping module 240, an asset formation and configuration module 245, a graphics conversion module 250, an associating module 255, an asset status determination module 260, an alert/event management module 265, and a display module 270. The device data repository 235 may be implemented at a memory (e.g., memory 140, memory 165) and/or a database (e.g., database 115) described with reference to FIG. 1. Each of the modules (e.g., device data modeling/grouping module 240, asset formation and configuration module 245, etc.) of the device 205 may be implemented by a processor (e.g., processor 130, processor 150) and executable instructions stored on a memory (e.g., memory 140, memory 165) described with reference to FIG. 1.

The device data modeling/grouping module 240 may support example aspects of assigning one or more of the devices 222 as an asset (e.g., asset 123 described with reference to FIG. 1). For example, for a device 222 (e.g., device 222-a) assigned as the asset, the device data modeling/grouping module 240 may access device data of the device 222 from the device data repository 235.

The asset formation and configuration module 245 may convert the device data of the device 222 (or multiple devices 222) into at least one type of data structure representative of the asset.

The graphics conversion module 250 may support example aspects of converting multi-dimensional representations as described herein. In an example, the conversion process may include transforming data of a multi-dimensional representation 226 into data according to a display format supported by the system 200. For example, the graphics conversion module 250 may automatically generate a multi-dimensional representation 227 of an asset (e.g., asset 123 described with reference to FIG. 1) based on the multi-dimensional representation 226. The multi-dimensional representation 226 and multi-dimensional representation 227 may include aspects of the multi-dimensional representation 126 and the multi-dimensional representation 127 described with reference to FIG. 1.

The associating module 255 may support example aspects of binding information of an asset (e.g., devices 122 and/or devices 124 described with reference to FIG. 1, devices 222 and/or devices 224 described with reference to FIG. 2) to corresponding graphical representations displayed at the device 205. The information may include, for example, measurement data, status information, and performance data described herein. The associating module 255 may map one or more operational parameters associated with the asset to the multi-dimensional representation 227. The associating module 255 may associate any combination of devices 222 (e.g., device 222-a through device 222-e) to the asset.

The asset status determination module 260 may access values of operational parameters associated with the asset. The asset status determination module 260 may access the values from the devices 224, via a device management platform 228 or a cloud infrastructure 232. Based on the values, the asset status determination module 260 may predict statuses (e.g., faults, failure events, etc.) associated with the devices 222 as described herein.

The alert/event management module 265 may support example aspects of generating status indicators and outputting notifications based on the operational parameters of the asset. In an example, the status indicators may include an indication of whether a defect is present at the asset. In some aspects, the alert/event management module 265 may generate an alert if a defect is present. The alert/event management module 265 may generate and output temporal information and/or a recommended action associated with a defect (e.g., a failure event) as described herein.

Via the display module 270, the device 205 may display a notification (e.g., a visual alert) if a defect is present as described herein. In some aspects, via the display module 270, the device 205 may display a dashboard (e.g., dashboard 128-a described with reference to FIG. 1).

Figure 3A:
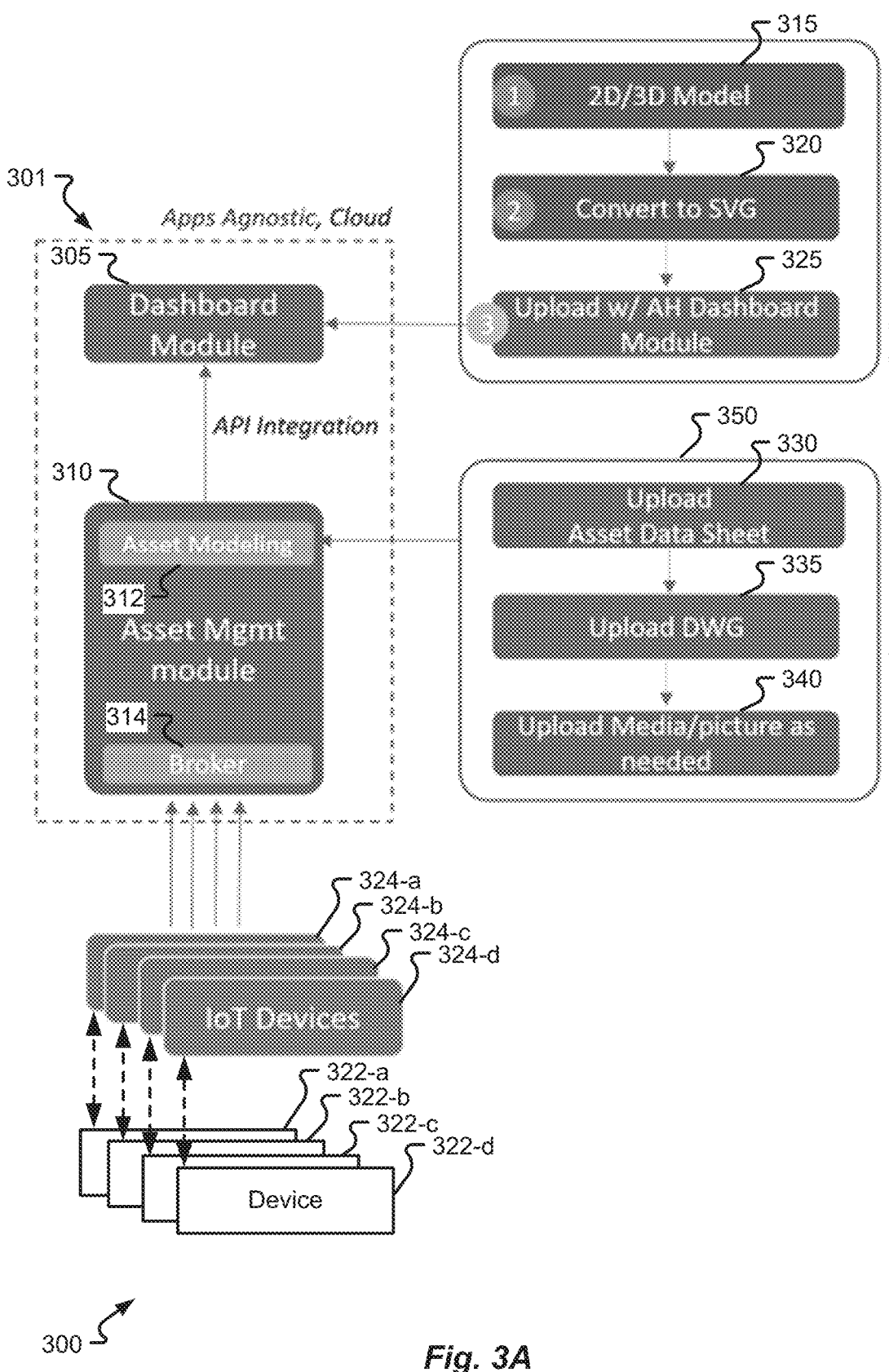
FIGS. 3A and 3B illustrate example block diagrams that support asset monitoring in accordance with aspects of the present disclosure.
Figure 3B:
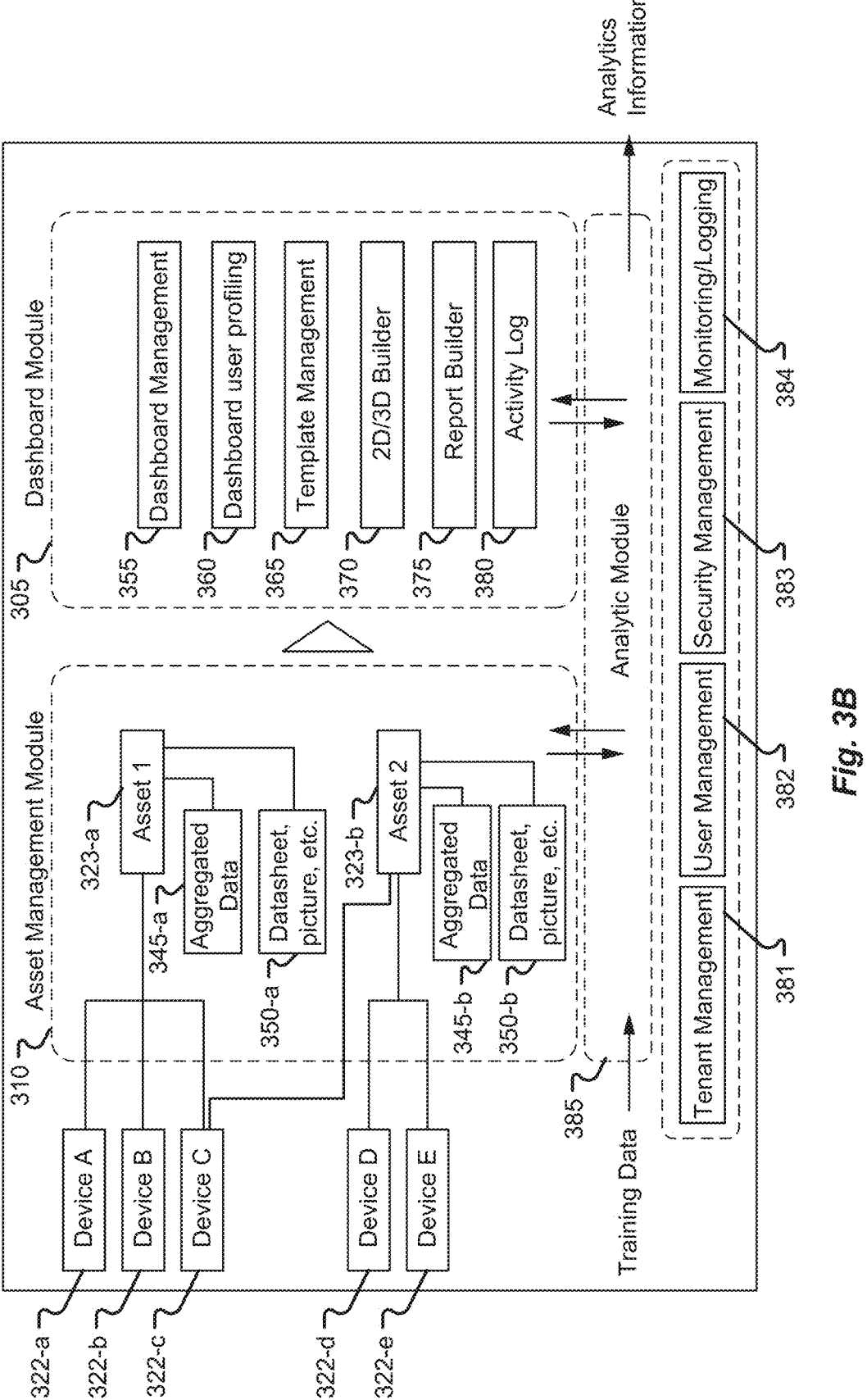
Figure 3C:
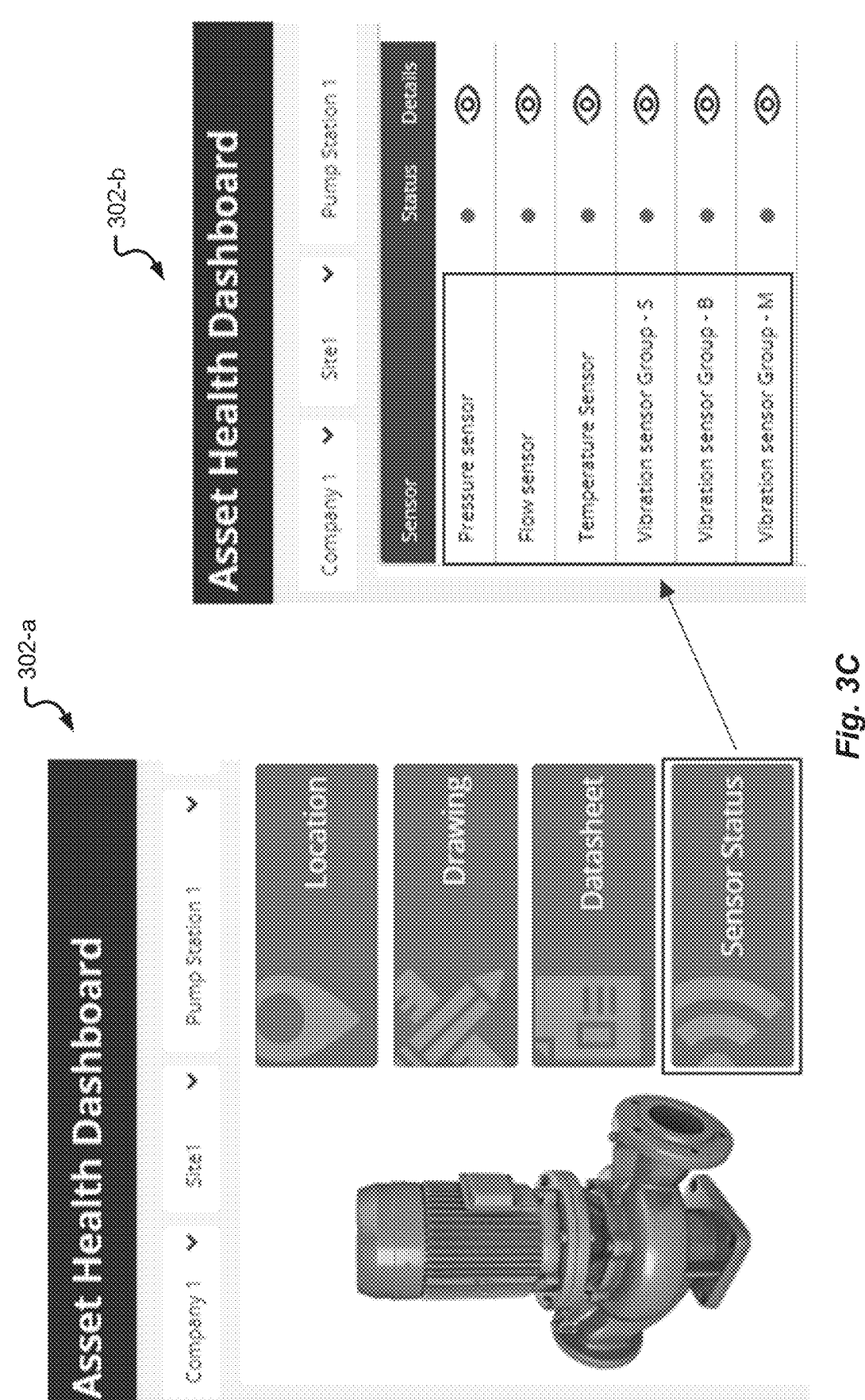
FIG. 3C illustrates an example asset health dashboard that supports asset monitoring in accordance with aspects of the present disclosure.
Figure 3D:
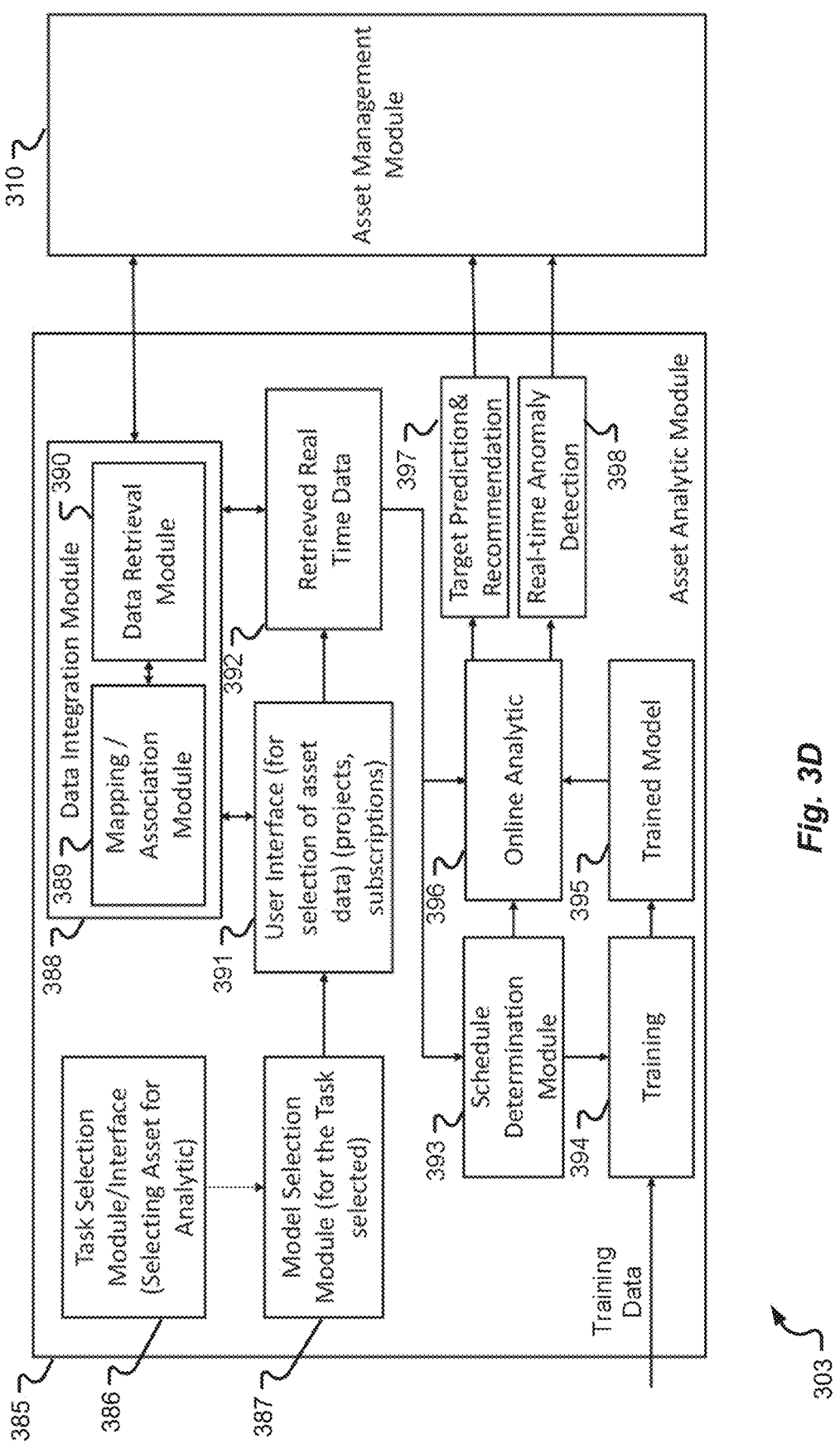
FIG. 3D illustrates an example block diagram that supports asset analytics and simulation in accordance with aspects of the present disclosure.

FIG. 3A illustrates an example block diagram 300 supportive of asset monitoring in accordance with aspects of the present disclosure. FIG. 3B illustrates an example block diagram supportive of asset monitoring in accordance with aspects of the present disclosure. FIG. 3C illustrates examples 302 of an asset health dashboard supportive of asset monitoring in accordance with aspects of the present disclosure. FIG. 3D illustrates an example block diagram supportive of asset simulation and analytics in accordance with aspects of the present disclosure.

FIGS. 3A through 3D may include aspects of like elements described herein. For example, aspects of FIGS. 3A through 3D may be implemented by server 110 or communication device 105 described with reference to FIG. 1.

Aspects of FIGS. 3A through 3C may be implemented by an asset health application 301 in association with asset monitoring. The asset health application 301 may include example aspects of application 144-b described with reference to FIG. 1. Aspects of FIG. 3D may be implemented by an asset analytics application 303 that supports asset analytics and simulation. The asset analytics application 303 may include example aspects of application 144-b described with reference to FIG. 1.

Devices 324 (e.g. IoT devices) may provide measurement data corresponding to devices 322 associated with the asset.

The asset health application 301 may include a dashboard module 305, an asset management module 310, an analytics module 385 (also referred to herein as an asset health analytic module, asset analytics module, or analytic module), a tenant management module 381, a user management module 382, a security management module 383, and a monitoring/logging module 384. The asset analytics application may include the asset management module 310 and the analytics module 385. In some aspects, the asset health application 301 and the asset analytics application may be integrated in the same application. In some other aspects, the asset health application 301 and the asset analytics application may be different applications.

The asset health application 301 and each of the modules (e.g., dashboard module 305, asset management module 310, etc.) may be implemented at a communication device 105 or server 110 described with reference to FIG. 1. For example, the asset health application 301 and each of the modules may be implemented by a processor (e.g., processor 130, processor 150) and executable instructions stored on a memory (e.g., memory 140, memory 165) described with reference to FIG. 1.

The asset analytics application 303 and each of the modules (e.g., asset management module 310, analytics module 385, etc.) associated with the asset analytics application may be implemented at a communication device 105 or server 110 described with reference to FIG. 1. For example, the asset analytics application 303 and each of the modules may be implemented by a processor (e.g., processor 130, processor 150) and executable instructions stored on a memory (e.g., memory 140, memory 165) described with reference to FIG. 1.

Referring to FIG. 3A, the asset management module 310 may access values of operational parameters associated with the asset. For example, the asset management module 310 may access and/or aggregate real-time values of the operational parameters from the devices 324 via a broker 314 (e.g., a device management platform 228 or a cloud infrastructure 232 described with reference to FIG. 2). Additionally, or alternatively, the asset management module 310 may access historical data or batch data from a data file (e.g., a data table, an excel file, etc.). The data file may be stored at a memory (e.g., memory 140, memory 165) or database (e.g., database 115) described with reference to FIG. 1.

The asset management module 310 is application agnostic. For example, the asset management module 310 may be compatible with any device management platform or cloud infrastructure. The asset management module 310 may include an asset modeling module 312. The asset modeling module 312 may support example aspects of assigning one or more of the devices (e.g., devices 122) as an asset.

The asset management module 310 may support user inputs that define which of the devices 322 to group as the asset. The asset management module 310 may support user inputs such as 'dragging and dropping' graphical representations of devices for grouping the devices as an asset. The asset management module 310 may support aspects of uploading device data 350 respective to each device 322, such as data sheets (e.g., at 330), electronic technical drawings (e.g., at 335), or media/images (e.g., at 340) of each device 322. In some aspects, the asset management module 310 may upload the device data 350 to an asset library described herein.

Referring to FIGS. 3A and 3B, at 315, the server 110 may receive a first multi-dimensional representation (e.g., a 2D or 3D model/representation, a CAD drawing, a technical drawing, etc.) of an asset 323. The asset 323 may include one or more devices 322. In an example, the first multi-dimensional representation may be provided by a first entity (e.g., a customer), for example, via communication device 105-b described with reference to FIG. 1.

At 320, the server 110 may generate a second multi-dimensional representation (e.g., a scalable vector graphics (SVG) file) of the asset 323 based on the first multi-dimensional representation. The server 110 may convert the first multi-dimensional representation to the second multi-dimensional representation using tools separate from (e.g., external to) the asset health application. Example aspects of the tools implementing the conversion are later described with reference to FIGS. 5C and 5D.

At 325, the server 110 may upload the second multi-dimensional representation for use by the asset health application 301. In an example, the asset health application 301 may display the second multi-dimensional representation via the dashboard module 305.

The dashboard module 305 may bind the second multi-dimensional representation to the values of the operational parameters associated with the asset 323. For example, the dashboard module 305 may bind the data provided from devices 324 to the asset 323. The dashboard module 305 may support example aspects of displaying generated multi-dimensional representations as described herein. The dashboard module 305 may support any quantity of asset libraries.

Referring to FIG. 3B, the dashboard module 305 may include a dashboard management module 355, a dashboard user profiling module 360, a template management module 365, a 2D/3D builder module 370, a report builder module 375, and an activity log module 380 supportive of features described herein.

The tenant management module 381 may support a multi tenancy scheme that supports data security in association with working on multiple projects and with multiple customers. Aspects of the present disclosure support automatic deployment of the asset management module 310 through the tenant management module 381.

The user management module 382 may provide use access security and/or permissions to the asset management module 310.

In an example, the asset management module 310 has grouped device 322-a through device 322-c to asset 323-a, and aggregated data 345-a and device data 350-a correspond to asset 323-a (e.g., device 322-a through device 322-c). In another example, the asset management module 310 has grouped device 322-d and device 322-e to asset 323-b, and aggregated data 345-b and device data 350-b correspond to asset 323-b (e.g., device 322-d and device 322-e).

An example implementation of generating multi-dimensional representations and asset management is described herein. The asset management module 310 includes a device management feature supportive of converting data (e.g., JSON data) representative of an asset 323 to a structural format associated with an asset library.

In an example, data associated with a device 322 of an asset 323 may include JSON data as follows:

```
{
    "id": "ID-001",
    "uid": "da329caf-f87f-4e77-9f3d-qwer1234",
    "temp": 1700,
    "status": "running",
    "timestamp": 1633761315
}
```

The asset management module 310 may execute one or more scripts which convert the data to a structural format (e.g., a table format). An example structural format is below:

| Key | Type | Data Type |
|---|---|---|
| ID | Metric | Text |
| UID | timestamp | timestamp |
| Temp | Metric | Int |
| Status | Metric | Text |
| timestamp | Device_id | Text |

Aspects of the present disclosure support multiple tables/ data structures for each of the devices 322. In an example, device 322-a may have a data structure A. In another example, device 322-b may have data structure A and a data structure B. In some aspects, the device management feature may support batching and aggregation of data into a data file (e.g., a delimited text file, a comma separated values (CSV) file, etc.).

The asset management module 310 may support user inputs associated with grouping multiple devices 322 as an asset 323. The asset management module 310 may support user inputs (e.g., text inputs, expressions, formulas, etc.) for aggregating values of the operational parameters, for example, in association with generating aggregated data 345. In some aspects, the asset management module 310 may support user inputs (e.g., text inputs, expressions, formulas, etc.) for converting values of the operational parameters. For example, the asset management module 310 may support user inputs for converting a temperature from Fahrenheit to Celsius.

Using an API, the asset management module 310 may provide the values of the operational parameters to the dashboard module 305. In some aspects, the asset management module 310 and dashboard module 305 may support 'drag and drop' user inputs. Aspects of the present disclosure support auto updating of data in the dashboard module 305 based on the refresh rate defined in the dashboard module 305. Aspects of the present disclosure support pushing the data to the dashboard module 305 and/or pulling the data from the asset management module 310.

An example implementation of operational parameters (e.g., key operational parameters) and a target operational range is described herein.

The asset management module 310 may include an alarm management module (not illustrated). The alarm management module may include example aspects of alert/event management module 265 described with reference to FIG. 2. The alarm management module may support multiple thresholds in association with outputting an alert. Features for setting the thresholds may be integrated with the dashboard module 305 via an API. In an example, the thresholds may be configurable via a dashboard 128-a described with reference to FIG. 1.

In an example, for a device 322, the alarm management module may support the following alarm settings in association with an operational parameter (e.g., temperature):

```
High Condition 1: 80 degrees Celsius
High Condition 2: 90 degrees Celsius
Low Condition 1: 30 degrees Celsius
Low Condition 2: 20 degrees Celsius
```

In some aspects, the analytics module 385 may support training and retraining of machine learning models based on data (e.g., aggregated data 345) provided by the asset management module 310 or data (e.g., training data associated with an asset) provided by other data sources. The data provided by the asset management module 310 may include historical data associated with one or more devices 322 (e.g. historical measurement readings associated with the equipment/devices, maintenance data, etc.), real time data associated with one or more devices 322, or a combination thereof. In some cases, the data provided by other data sources may include historical data associated with one or more devices 322. In some aspects, the historical data may be associated with a process or an asset.

The analytics module 385 may provide analytics information that may include, for example, simulation results generated using the machine learning models. In some cases, the analytics information may include recommended actions associated with the one or more devices 322. Example aspects of the analytics information (e.g., simulation results, recommended actions, etc.) are later described herein.

Referring to FIG. 3C, example 302-a of the asset health dashboard illustrates features associated with viewing data associated with an asset. For example, the asset health dashboard may support features for viewing location information (e.g., coordinates, installation location, facility, etc.), drawing information, asset data sheets, and sensor status associated with the asset. At example 302-b, in response to a user input selecting the sensor status, the asset health application may display status information of sensor devices (e.g., devices 324 described with reference to FIGS. 3A and 3B) associated with the asset.

Referring to the block diagram of FIG. 3D, the analytics module 385 may include a task selection module 386, a model selection module 387, a data integration module 388, a user interface 391, a schedule determination module 393, a training module 394, and an online analytic module 396.

The data integration module 388 may access real-time values of the operational parameters associated with the devices 322. In some aspects, the data integration module 388 may access historical data or batch data associated with the devices 322 from a data file (e.g., a data table, an excel file, etc.). In some examples, the data file may be stored on a memory (e.g., memory 140, database 115, etc.).

In some examples, a data retrieval module 390 may access and provide real time data 392 (retrieved real time data) in response to a user selection of an asset (e.g., one or more devices 324) via the user interface 391 and based on mapping information provided by a mapping module 389 (also referred to herein as an association module). In some cases, the data retrieval module 390 may retrieve the real time data 392 from the asset management module 310.

The user interface 391 may include a drag and drop programming interface, which displays and links to organized projects and subscriptions. The user interface 391 may support the selection of an asset and the selection of target data for retrieval (e.g., a target value of an operational parameter(s) associated with the asset, etc.). The user interface 391 may support inputting asset data for anomaly detection. The mapping module 389 may support mapping or connection of the selected asset with the associated real time data 392. Aspects of the asset management module 310 and analytics module 385 provide data transfer having increased consistency and accuracy due to the integration and features of the data integration module 388 and the user interface 391.

According to example aspects of the present disclosure, the online analytic module 396 may provide analytics information through simulating asset status and asset operations. In some aspects, the online analytic module 396 may provide the analytics information based on asset parameters and user inputs provided via the user interface 391. In some examples, the target prediction and recommendation module 397 may provide predictions of the simulated asset status/asset operations and recommendations associated with the target asset/selected asset. In an example, the target prediction and recommendation module 397 may provide the predictions associated with the target asset/selected asset via the user interface 391 or another graphical user interface.

In some aspects, the analytics module 385 may prompt users to initiate a simulation in response to one or more trigger criteria. Examples of the trigger criteria are later described herein.

The analytics module 385 may provide users accurate and useful recommendations relating to target asset operation based on simulation results. In some aspects, in providing the predictions associated with the target asset/selected asset, the analytics module 385 may support focusing on risks (and minimizing the risks) in a closed-loop scenario. In some examples, the model selection module 387 may provide features of best model selection. For example, for a task or asset selected via the task selection module 386, the model selection module 387 may identify and select a model that has a highest prediction accuracy among available models for the selected task or asset.

The analytics module 385 may support adaptive modeling. For example, instead of using a fixed period of data (e.g., 1 year, etc.) in association with modeling an asset (e.g., one or more devices 322), the analytics module 385 may apply incremental learning to provide continuous updating to the models and ensure model accuracy. Example aspects of incremental learning implemented by the analytics module 385 may include periodic correlation of outputs provided by the models and data sampling.

The analytics module 385 may include an anomaly detection module 398. For example, based on a schedule set by the schedule determination module 393, the anomaly detection module 398 may compare outputs generated by a model (e.g., simulated values of operational parameters of an asset) to real time values (e.g., included in real time data 392) associated with the asset, for example, to identify an unexpected result. The anomaly detection module 398 may receive the outputs and real time values from the online analytic module 396.

In response to a difference between the simulated values and real time values exceeding a threshold difference value, the analytics module 385 may retrain the trained model 395. For example, the analytics module 385 may trigger an immediate retraining of the trained model 395 or schedule the trained model 395 for retraining. When scheduling the trained model 395 for retraining, the schedule is determined by the schedule determination module 393. In some other aspects, the anomaly detection module 398 may output an indication of the difference.

Compared to other prediction models, the example aspects described herein provide models having improved anomaly detection and algorithm accuracy due the scheduled incremental training. For example, the incremental training may include consistently adjusting prediction models and prediction algorithms in association with achieving a target prediction accuracy.

Example use cases supported by asset analytics and simulation described herein may include a use case for a chiller (e.g., simulation for optimizing energy consumption, providing a recommended water supply temperature based on the simulation, closed loop change of the water supply temperature, etc.) and a use case for a pump (e.g., a centrifugal pump, etc.). Example aspects of the use cases are later described herein.

FIG. 4 illustrates an example block diagram 400 that supports asset analytics and simulation in accordance with aspects of the present disclosure. Further example aspects of features provided by the asset management module 310 and the analytics module 385 are described with reference to FIG. 3A, FIG. 3B, FIG. 3D, and FIG. 4.

As illustrated in the example of FIG. 4, the analytics module 385 may access historical data 405 and real time data 415 associated with a device (e.g., a device 322, a chiller, a pump, etc.) from one or more data sources. For example, the analytics module 385 may access historical data 405 from a database 115 or a data file 410 (e.g., .csv file). In some aspects, the analytics module 385 may access a pretrained model via a training module 394 or receive a pretrained model uploaded by a user via dashboard module 305.

The analytics module 385 may access real time data 415 from an asset health integration (AHI) 421 (e.g., dashboard module 305, asset management module 310, etc.). In some aspects, the AHI 421 may support retrieving the real time data 415 from an IoT data source (e.g., a device 324, an IoT device, etc.).

The analytics module 385 may include a modeling module 420 that supports machine learning data modeling. For example, the modeling module 420 may support defining machine learning features of a machine learning model.

The analytics module 385 may include a data preprocessing module 425 that supports data preprocessing (e.g., data cleaning, data splitting, etc.).

The analytics module 385 may include a data analysis module 430 that supports data analysis (e.g., analysis of data distribution, analysis of data correlation, etc.) of historical data 405, real time data 415, and data (e.g., predictions, simulation results, etc.) generated by a machine learning model described herein.

The analytics module 385 may support model retraining (e.g., relearning, incremental training etc.) described herein using one or more batches of the real time data 415. In some examples, the real time data is obtained continuously, periodically or in batch fetching from the devices 322. In some aspects, the analytics module 385 may retrain a model based on a schedule (e.g., as set by the schedule determination module 393, as set by a user, etc.).

The analytics module 385 may include an analysis module 441 that provides an indication of the impact or importance of variables. In some aspects, for an operational parameter associated with a device 322 (e.g., chiller, pump, etc.), the analysis module 441 may provide a root-mean-square error (RMSE) indicating differences between values predicted by a machine learning model and measured values (e.g., historical values, real time values, etc.). An example of variable importance with respect to power (kW) usage of a chiller is later illustrated and described with reference to FIG. 12A.

In some other aspects, the analytics module 385 may support retraining of a pretrained model. The retraining may include incremental training as described herein. In an example, the machine learning model 395 may be a pretrained model that is uploaded by a user via dashboard module 305.

The analytics module 385 may support requests and responses with the dashboard module 305 or another dashboard (e.g., dashboard 455, a third-party dashboard application). For example, the serving API 450 may output API calls for services to dashboard module 305 or the dashboard 455.

The online analytic module 396 may provide real time results 440. In an example, the real time results 440 may include analytics information (e.g., predictions associated with a target asset described herein) and detected anomalies described herein with reference to FIG. 3D.

Aspects of the present disclosure support data subscription and listening. For example, via the dashboard module 305 and/or the dashboard 455, aspects of the systems described herein support asset monitoring, asset analytics, and asset simulation.

FIG. 5A illustrates an example of dashboard information 500 described with reference to FIG. 1. Dashboard information 500 may include examples of aspects of dashboard information 129 described with reference to FIG. 1.

The dashboard information 500 includes multi-dimensional representations of devices 522 and values of operational parameters (e.g., temperature, pressure, etc.) corresponding to the devices 522. The devices 522 may include examples of aspects of devices 122 described with reference to FIG. 1. In an example, the dashboard information 500 includes a multi-dimensional representation 527 of an asset including the devices 522.

The dashboard information 500 may include predicted performance data described herein. The predicted performance data may include predicted faults or failure events associated with the devices and temporal information (e.g., 'Next Failure Time') associated with the predicted faults, causal information associated with the predicted faults. In some aspects, the dashboard information 500 may include recommended actions ('Recommendation') for addressing existing faults and/or predicted faults. In some examples, the dashboard information 500 may include an efficiency rating, a health score, and a list of risks (e.g., mechanical and/or electrical) associated with the asset.

The dashboard information 500 may include any combination of graphs associated with operational parameters (e.g., pressure, flow, vibration, temperature, power, current, etc.) described herein. In some cases, the graphs may include historical and/or real-time values of the operational parameters. In some aspects, the dashboard information 500 may include indications of alerts and/or anomalies associated with the asset (or devices 522 associated with the asset).

Figure 5C:
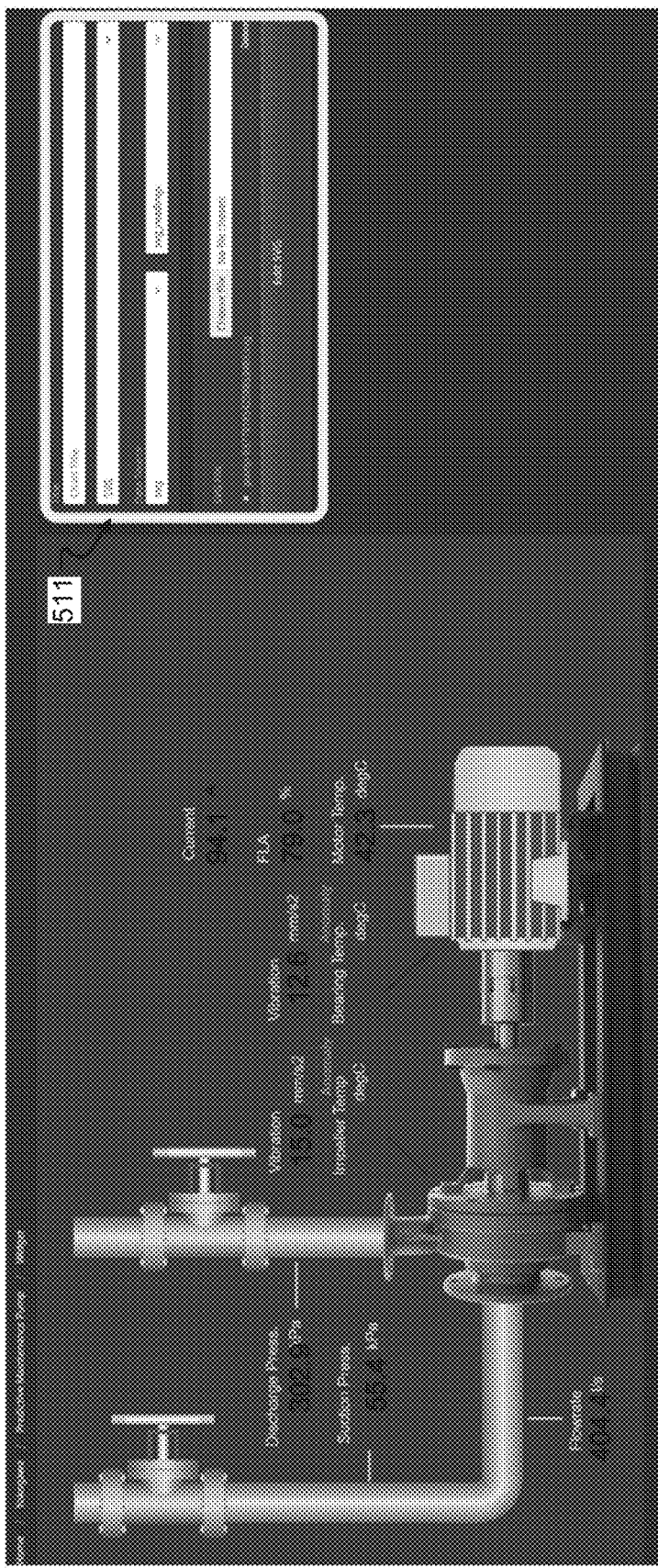

FIGS. 5B and 5C illustrate aspects of the present disclosure supportive of configuring or editing the multi-dimensional representation 527. For example, based on a user input selecting the multi-dimensional representation 527 at FIG. 5A, the communication device 105 may display view 505 illustrated at FIG. 5B. Based on a user input selecting icon 506, the communication device 105 may display view 510 illustrated at FIG. 5C. The view 510 may include a user interface 511 for configuring or editing the multi-dimensional representation 527.

FIG. 5D illustrates example views 520, 525, and 530 supportive of aspects described herein of user configuration of the asset (and the multi-dimensional representation 527 thereof).

Example aspects of editing the multi-dimensional representation 527 (e.g., using an editor application) are described herein. Aspects of the present disclosure support the creation of customized properties for the multi-dimensional representations 527 (e.g., SVG files). Example customized properties including tags, range, and shape, which are created specifically associated with industrial assets. For each customized property, aspects of the present disclosure include creating a library for configuring the property of multi-dimensional representations 527 (e.g., SVG files), and animating the property in a graphical user interface (e.g., at a dashboard). In some aspects, configuring the property may include defining a range associated with the property.

Aspects of the present disclosure support editing of time-series data of the asset (e.g., instead of static data). In some examples, aspects of the present disclosure support online and/or offline implementations of the editor application.

Figure 5E:
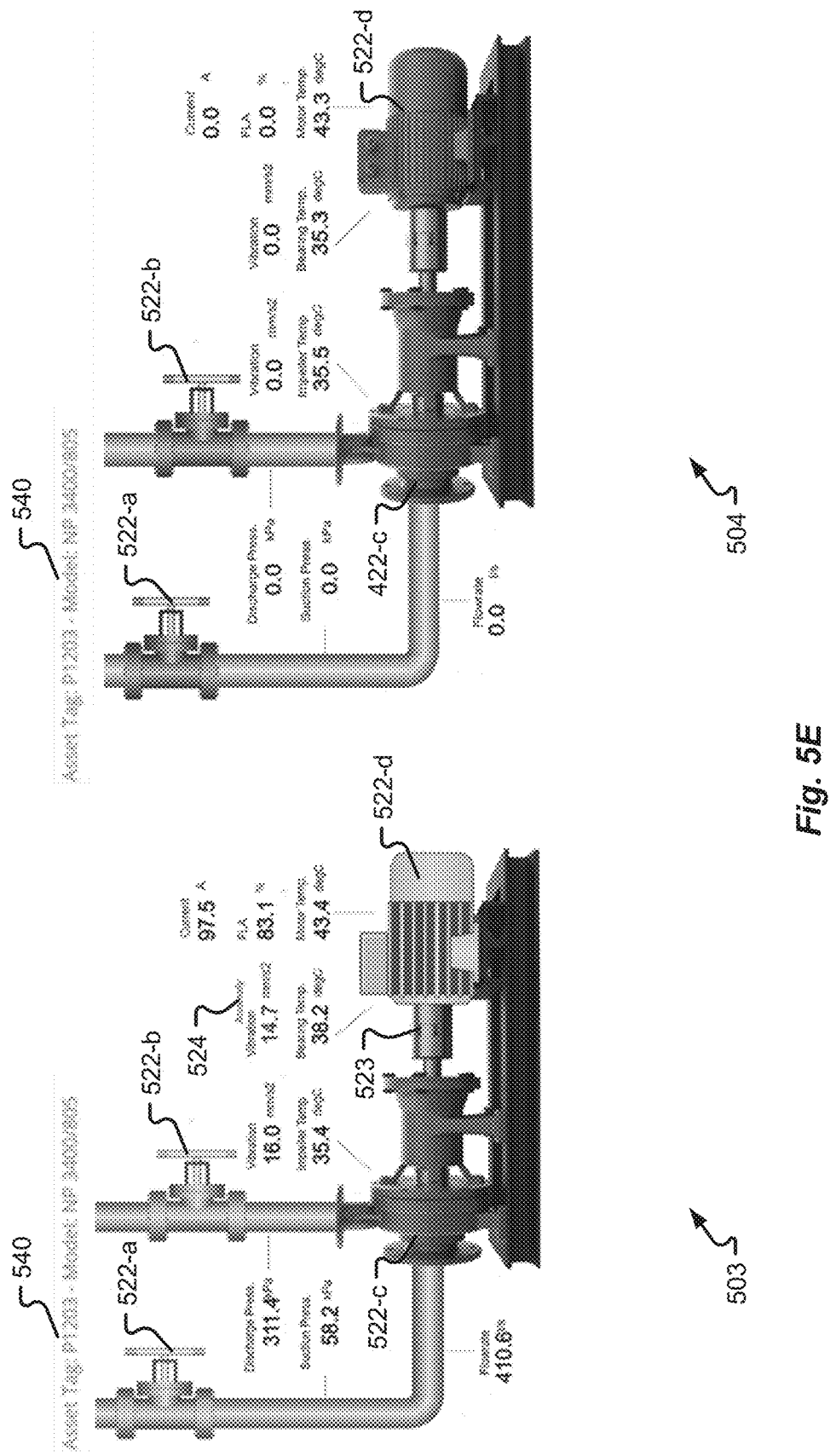
FIG. 5E illustrates examples of dashboard information in accordance with aspects of the present disclosure.

FIG. 5E illustrates examples of dashboard information 503 and 504. Dashboard information 503 and 504 may include examples of aspects of the dashboard information 129 described with reference to FIG. 1. The dashboard information 503 and 504 includes multi-dimensional representations of devices 522 (e.g., device 522-*a* through device 522-*d*) and values of operational parameters (e.g., temperature, pressure, etc.) corresponding to the devices 522. The dashboard information 503 and 504 may include a tag 540 corresponding to an asset. The asset may include device 522-*a* (e.g., a valve), device 522-*b* (e.g., a valve), device 522-*c* (e.g., a centrifugal pump), and device 522-*d* (e.g., a motor). Devices 522 include example aspects of devices 122 described with reference to FIG. 1.

With respect to the multi-dimensional representations of the devices 522, the communication device 105-*a* may set the colors, brightness, and/or contrast thereof (e.g., set pixel values) according to values of corresponding operational parameters. In an example, if the suction pressure of the device 522-*a* (e.g., valve) is in a target operational range, the communication device 105-*a* may display the multi-dimensional representation of the device 522-*a* in green. In another example, if the suction pressure of the device 522-*a* (e.g., valve) is 0.0 kPa in association with a closed state, the communication device 105-*a* may display the multi-dimensional representation of the device 522-*a* in dark blue or grey. In an example, the communication device 105-*a* may display a value of an operational parameter (e.g., vibration) corresponding to an anomaly in a color (e.g., red) indicating that the value is outside a target operational range. In some examples, the communication device 105-*a* may display a graphical indicator 523 (e.g., in red) to indicate a location of the anomaly and/or display a textual indicator 524 (e.g., in orange) to indicate the anomaly.

Figure 6:
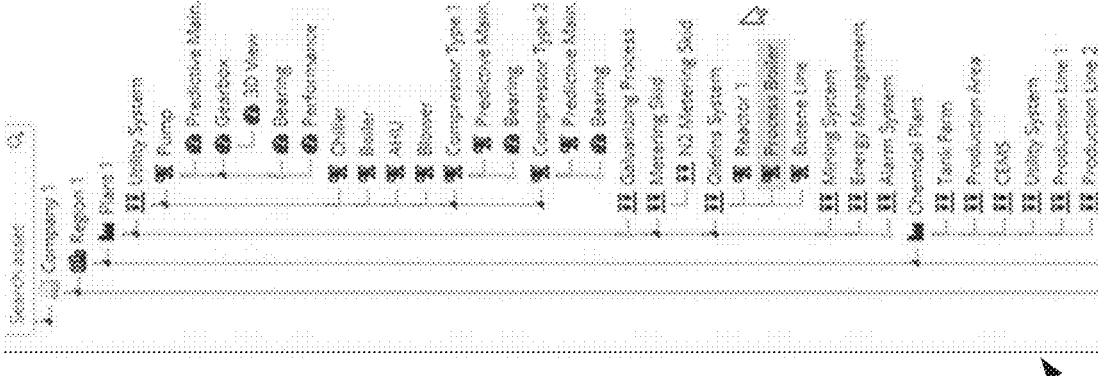
FIG. 6 illustrates an example of a process flow in accordance with aspects of the present disclosure.

FIG. 6 illustrates an example of dashboard information 600 associated with a process boiler in accordance with aspects of the present disclosure. Dashboard information 600 may include examples of aspects of like elements described herein (e.g., dashboard information 129 described with reference to FIG. 1, dashboard information 500 described with reference to FIG. 5, etc.). The dashboard information 600 may include operational parameters, performance data, and predicted performance data of devices 622 (e.g., device 622-*a* through device 622-*e*) included in an industrial environment (e.g., a processing facility, a processing plant) as described herein.

The dashboard information 600 includes multi-dimensional representations of the devices 622 (e.g. process boiler, associated components/devices of the process boiler, etc.) and values of operational parameters (e.g., chemical makeup, temperature, water supply volume, water return volume, etc.) associated with the devices 622.

Figure 7A:
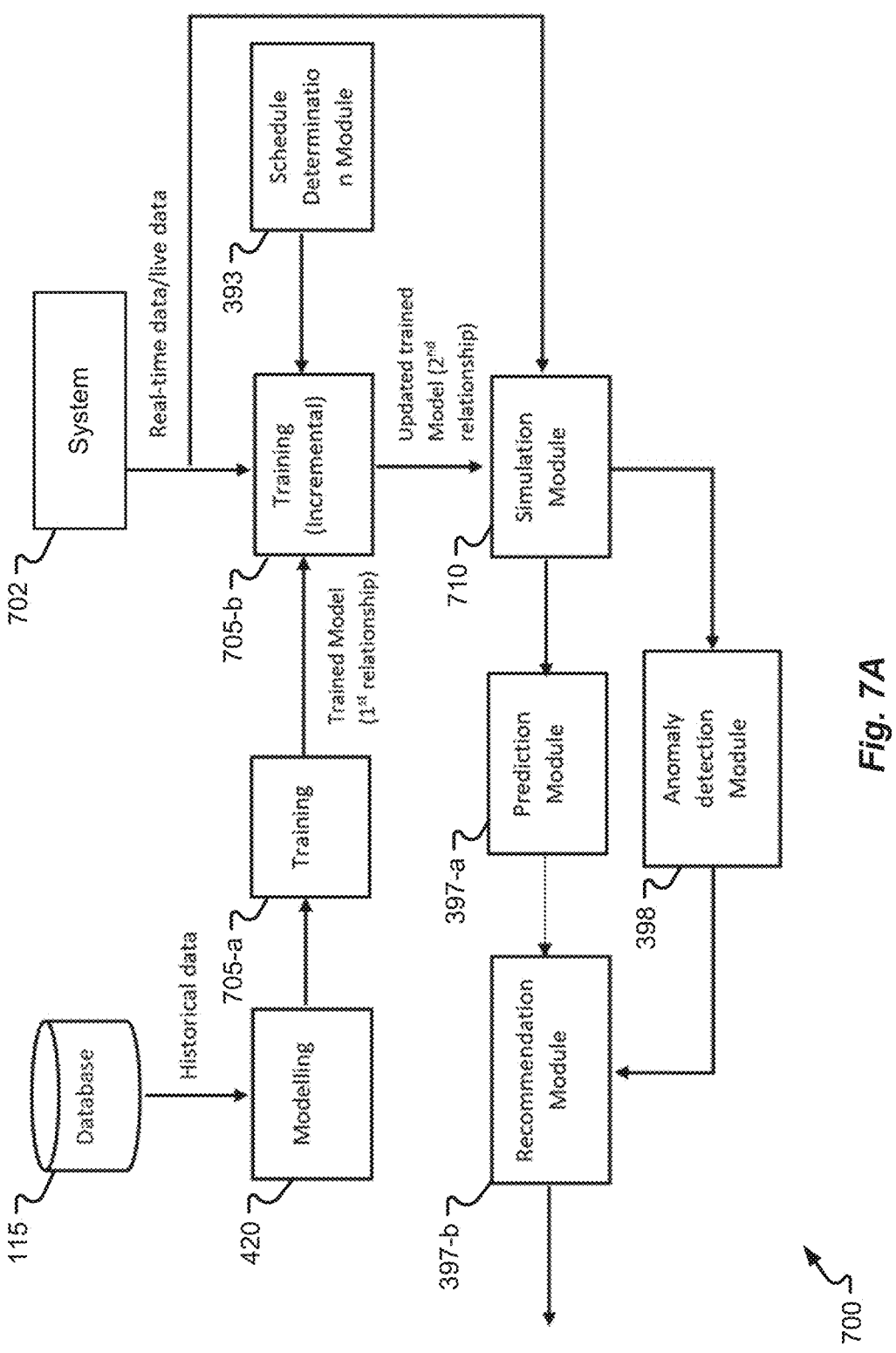
FIG. 7A illustrates an example system that supports asset analytics and simulation in accordance with aspects of the present disclosure.

FIG. 7A illustrates an example system 700 that supports asset analytics and simulation in accordance with aspects of the present disclosure. FIG. 7A may include aspects of like elements described herein. For example, aspects of FIG. 7A may be implemented by server 110 or communication device 105 described with reference to FIG. 1.

The system 700 includes a database 115, a modeling module 420, a training stage 705-*a*, a training stage 705-*b*, a schedule determination module 393, a prediction module 397-*a*, a recommendation module 397-*b*, and an anomaly detection module 398, aspects of which already described herein are omitted for brevity.

In an example, the training stage 705-*a* and training stage 705-*b* may be implemented by training module 394 described with reference to FIG. 3D and FIG. 4. For example, the training stage 705-*a* may generate and train a model based on historical data, and the training stage 705-*b* may retrain (e.g., incrementally train, train based on a schedule, train in response to other criteria, etc.) the model based on real time data or live data from devices 322.

The system 700 includes a simulation module 710. The simulation module 710 may include like aspects of the online analytic module 396 described with reference to FIG. 3D. In some examples, the simulation module 710 may simulate operations of an asset using a trained model (e.g., as provided by 705-*a*). In some other examples, the simulation module 710 may simulate operations of the asset using a retrained model (e.g., as provided by 705-*b*). Example implementations and use cases are described herein with reference to FIGS. 7A through 7E.

Figure 7B:
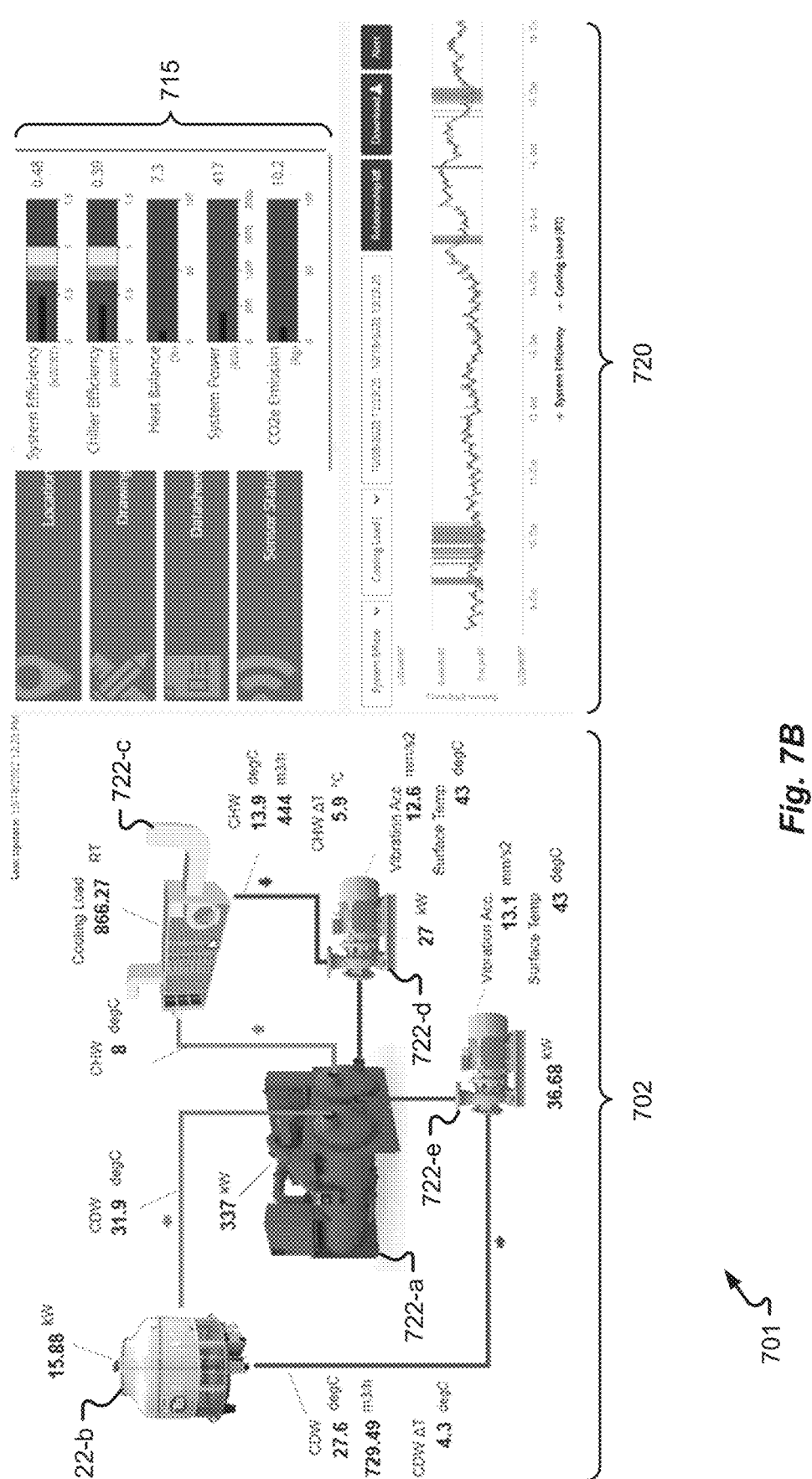
FIG. 7B illustrates an example of dashboard information supportive of asset analytics and simulation in accordance with aspects of the present disclosure.

FIG. 7B illustrates an example of dashboard information 701 supportive of asset analytics and simulation in accordance with aspects of the present disclosure. Dashboard information 701 may include examples of aspects of like elements described herein (e.g., dashboard information 129 described with reference to FIG. 1, dashboard information 500 described with reference to FIG. 5, dashboard information 600 described with reference to FIG. 6, etc.) and may be provided via a user interface (e.g., dashboard 128, user interface 391, etc.) described herein.

Referring to FIG. 7B, an asset may be a chiller system 702 including devices 722. Devices 722 include example aspects of like elements (e.g., devices 122, devices 322) described herein. In an example, device 722-*a* may be a chiller capable of providing chilled water (CHW) or condensed water (CDW) to device 722-*b* through device 722-*e* for cooling.

In some aspects, the dashboard information 701 may include location information, drawing information, datasheet information, and sensor status information. In an example, the dashboard information 701 may include system performance data 715 (e.g., system efficiency, chiller efficiency, heat balance, system power, CO2e emission, etc.).

Aspects of the present disclosure support displaying a graph 720, via the dashboard information 701, for plotting the system performance data 715 (e.g., system efficiency, etc.) with respect to an operational parameter (e.g., cooling load). In an example, the system performance data 715 and operational parameter may be selectable via the graph 720. In another example, aspects of the present disclosure support downloading of the graph 720 (and data represented in the graph 720). Other examples support providing an alert based on the system performance data 715 (e.g., when system efficiency is below a predetermined threshold).

Figure 7C:
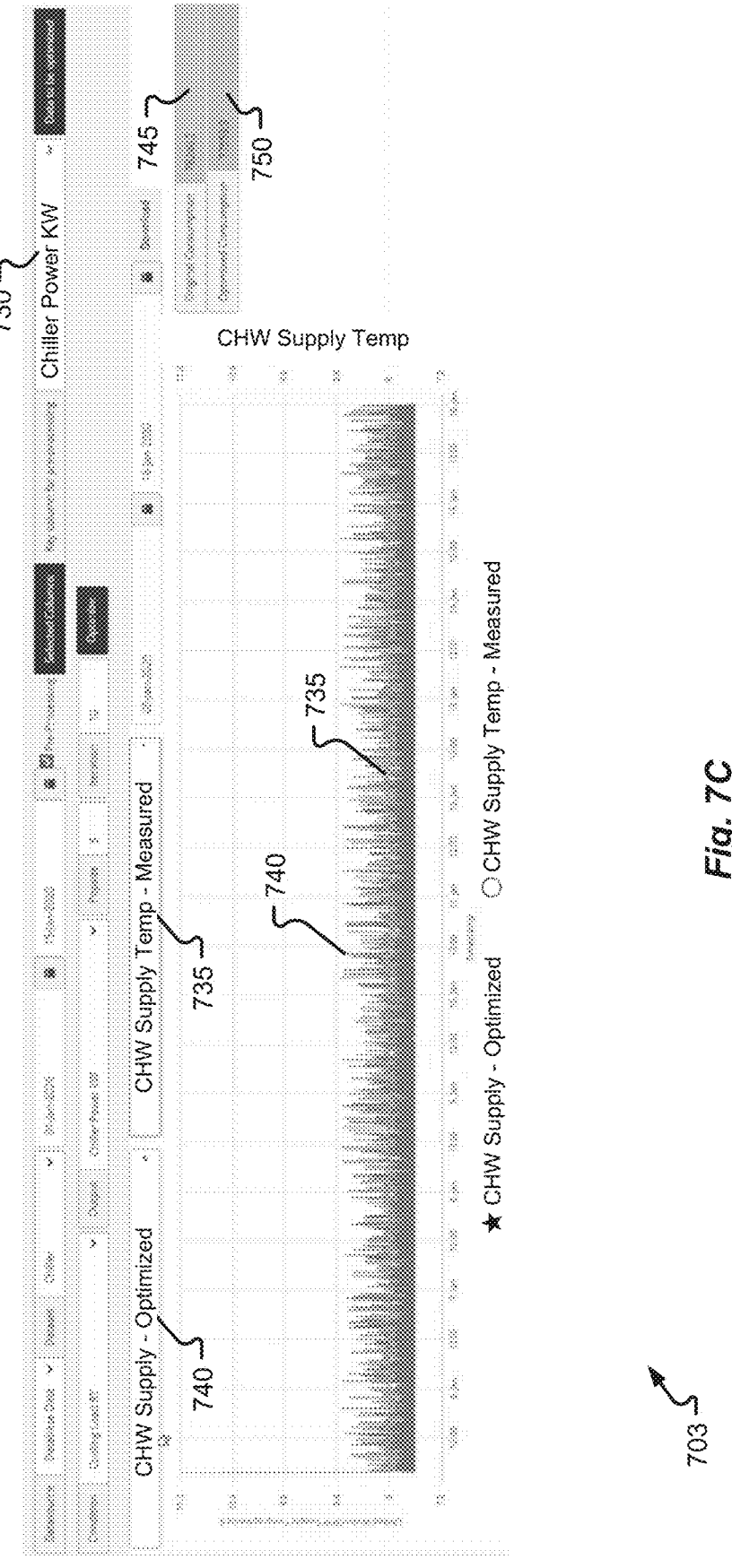
FIG. 7C illustrates an example dashboard in association with a chiller use case.

FIG. 7C illustrates an example dashboard 703 in association with a chiller use case. Aspects described herein with reference to FIG. 7C support data/model selection for simulation. Referring to FIG. 7C, aspects of the present disclosure support selection of an operational parameter (e.g., temperature for chilled water (CHW) supply) in association with achieving a target operational parameter 730 (e.g., power consumption which is to be optimized). In some aspects, aspects of the present disclosure support selection of the operational parameter and the target operational parameter 730 by a user or by the system 700 (e.g., autonomously, semi-autonomously, etc.).

In an example, for the operational parameter and target operational parameter 730, the system 700 may plot measured data 735 for the target operational parameter 730 (e.g., measured temperature of chilled water (CHW) supply) and simulated data 740 for the target operational parameter 730 (e.g., recommended or optimized temperature for the chilled water (CHW) supply). The measured data 735 may include historical and/or real time data described herein.

The system 700 may display an original value 745 (e.g., original power consumption) associated with the target operational parameter 730 and a predicted/simulated value 750 (e.g., a recommended value for optimized power consumption) associated with the target operational parameter 730. In the example of FIG. 7C, the system 700 recommends one or more temperatures crossing a time period (e.g. 5 Jan. 2020 to 16 Jan. 2020 as shown in the x-axis) for the chilled water (CHW) supply which are predicted to reduce chiller power from approximately 78.24 kW to approximately 77.6 kW. In other words, the present disclosure supports optimizing the power consumption of a system (e.g. a chiller) for users in a selected period.

Figure 7D:
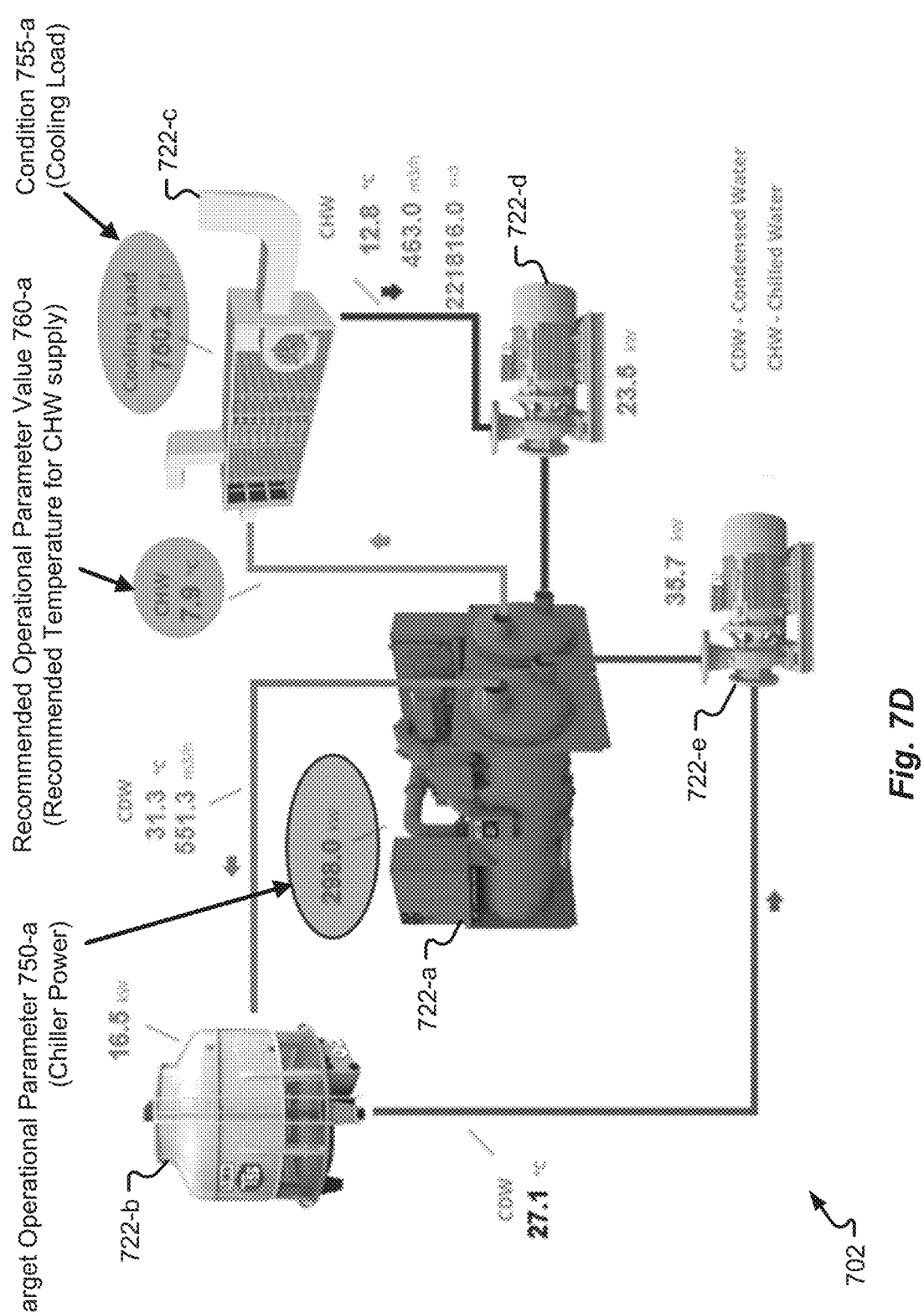
FIG. 7D illustrates an example implementation described with reference to the chiller system.

Referring to FIG. 7D, an example implementation is described with reference to the chiller system 702.

The system 700 (e.g., of FIG. 7A) may set a target operational parameter 750-*a* (e.g., chiller power) and condition 755-*a* (e.g., cooling load) for the chiller system 702. The system 700 may simulate a combination of operational parameters (e.g., condensed water supply temp/return temp, chilled water supply temp/return temp, chiller power, cooling power, chiller water pump power, chilled water return flow/volume, etc.) associated with the chiller system 702. Based on the simulation results, the system 700 may determine a correlation between the operational parameters.

Based on the correlation, the system 700 may provide a recommended operational parameter value 760-*a* (e.g., recommended temperature of 7.9 degrees Celsius for the chilled water (CHW) supply) and a predicted value of the target operational parameter 750-*a* (e.g., 298.0 KW) that would be achieved based on the recommended operational parameter value 760-*a*.

Figure 7E:
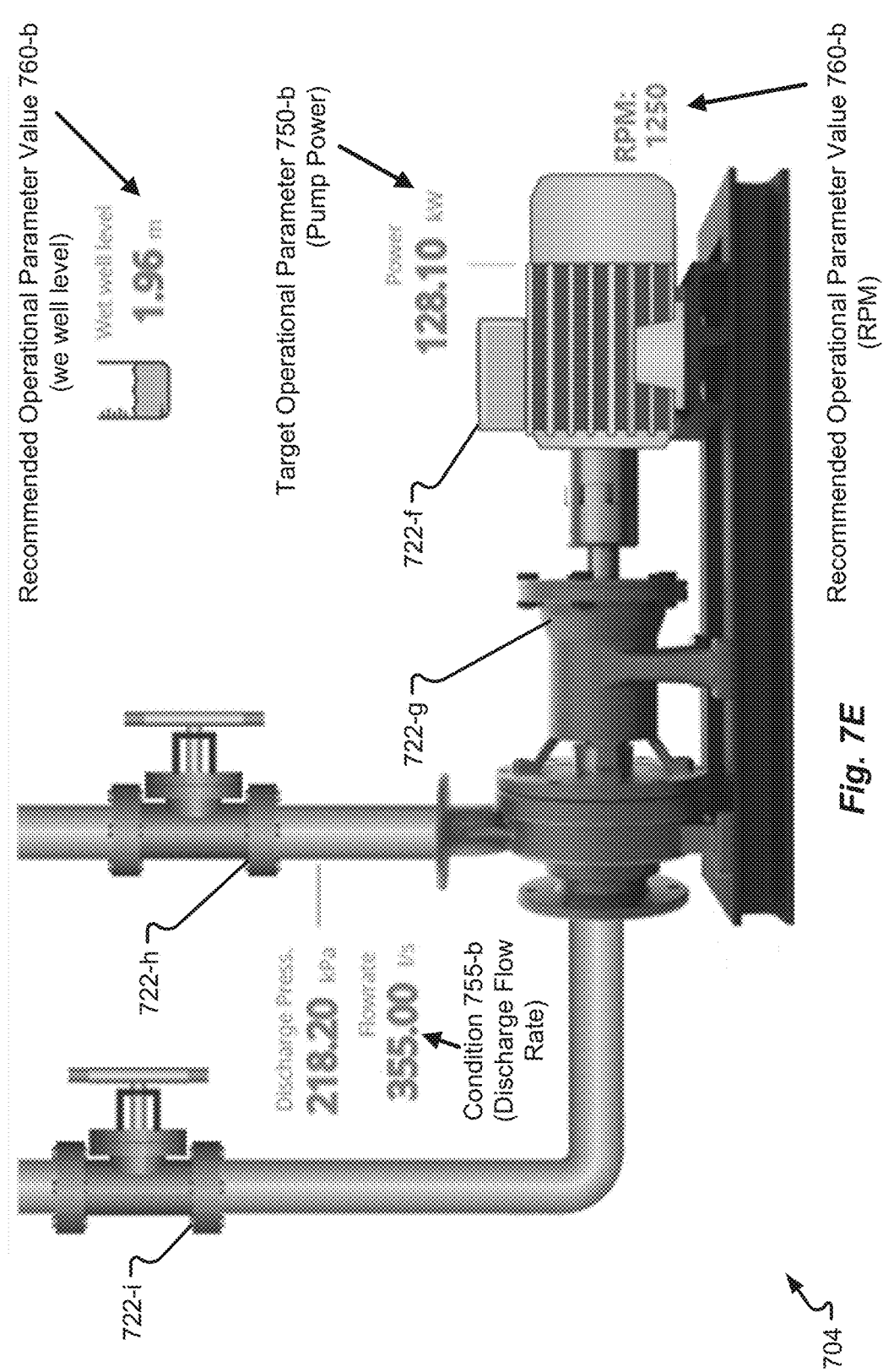
FIG. 7E illustrates an example implementation described with reference to a pump system.

Referring to FIG. 7E, an example implementation is described with reference to a pump system 704 including devices 722 (e.g., device 722-*f* through device 722-*i*). Devices 722 include example aspects of like elements (e.g., devices 122, devices 322) described herein. In an example, device 722-*f* may be a pump.

The system 700 (e.g., of FIG. 7A) may set a target operational parameter 750-*b* (e.g., pump power) and condition 755-*b* (e.g., discharge flow rate of 355.00 litres/second) for the pump system 704. The system 700 may simulate a combination of operational parameters (e.g., discharge pressure, discharge flow, wet well level, pump power, etc.) associated with the pump system 704. Based on the simulation results, the system 700 may determine a correlation between the operational parameters of the pump system 704.

Based on the correlation, the system 700 may provide a recommended operational parameter value 760-*b* (e.g., wet well level of 1.96 meters, RPM/rotational speed of 1250, etc.) and a predicted value of the target operational parameter 750-*b* (e.g., 128.10 kW) that would be achieved based on the recommended operational parameter value 760-*b*.

Figure 8A:
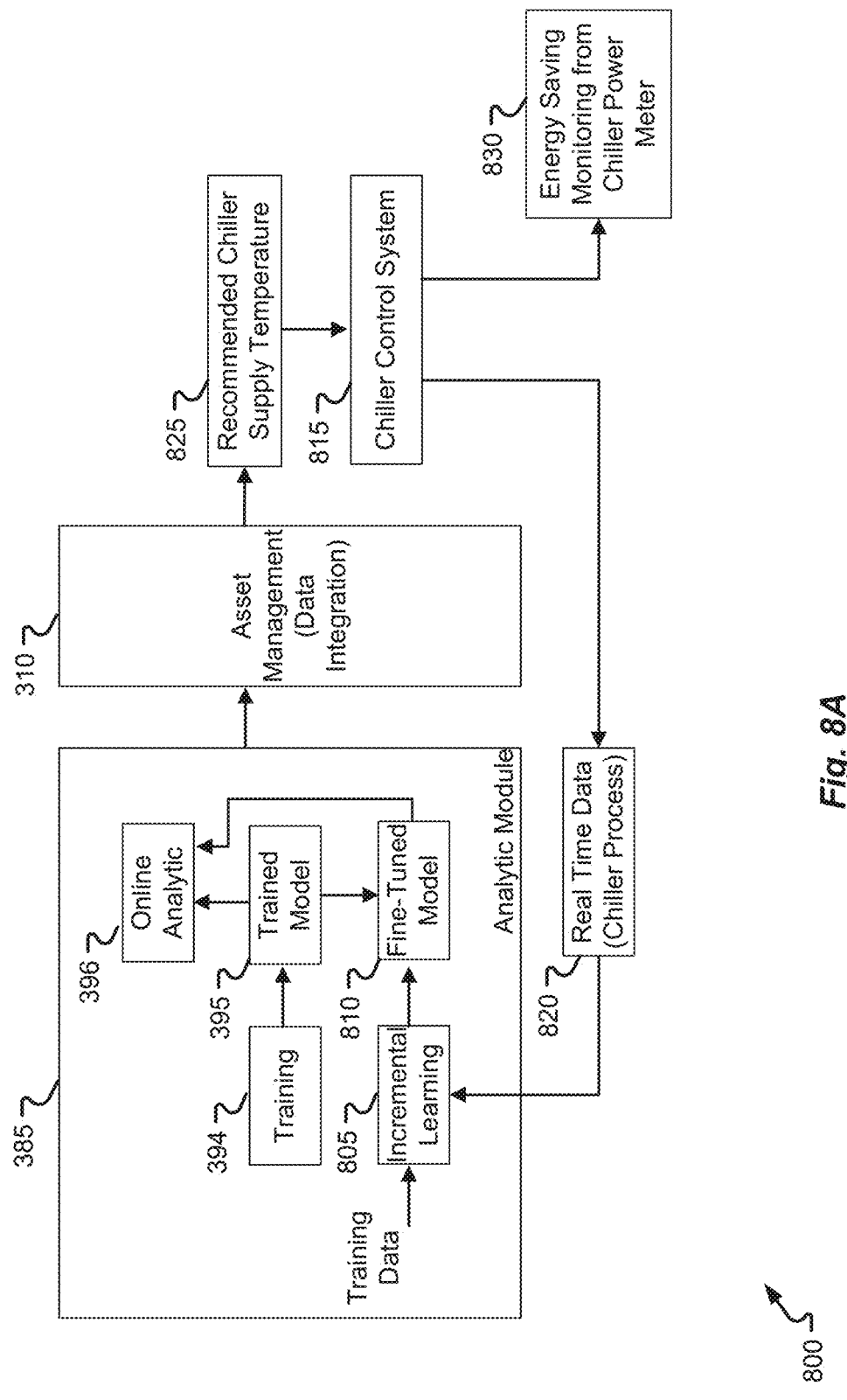
FIG. 8A illustrates an example block diagram in accordance with aspects of the present disclosure.

FIG. 8A illustrates an example block diagram 800 in accordance with aspects of the present disclosure. FIG. 8A includes the asset management module 310 and analytics module 385 of FIG. 3D. Portions of the analytics module 385 are omitted for brevity, and repeated descriptions with reference to FIG. 3D are omitted for brevity. Referring to FIG. 8A, the analytics module 385 may further include an incremental learning module 805 that supports incremental learning (e.g., retraining) of the trained model 395 in association with generating a fine-tuned model 810.

An example implementation with reference to training and retraining a model is described with reference to FIG. 8A and a chiller control system 815. In an example, the chiller control system 815 may refer to the chiller system 702 described with reference to dashboard information 701 of FIG. 7B and FIG. 7D.

The training module 394 may receive training data associated with the chiller control system 815. In an example, the training data may include historical data associated with the chiller control system 815. The historical data may include, for example, operational parameters (e.g., chiller power, chilled water supply and return temperature, chilled water flow, etc.) associated with the chiller control system 815 and a temporal period. In some aspects, the historical data may include timestamps associated with the operational parameters. The trained model 395 may generate a trained model for the chiller control system 815 based on the training data.

The incremental learning module 805 may retrain the trained model 395 based on real time data 820 provided by the chiller control system 815. The real time data 820 may include real time measurement values of the operational parameters (e.g., chiller power, chilled water supply and return temperature, chilled water flow, etc.) associated with the chiller control system 815. Using the real time data 820, the incremental learning module 805 may maintain or update any correlations between the operational parameters. For example, based on the correlations, the incremental learning module 805 may identify and/or update the operational parameter/variable which is most influential on the target operational parameter.

The incremental learning module 805 may generate the fine-tuned model 810 based on the incremental learning. The fine-tuned model 810 may include the correlations as updated by the incremental learning module 805. In an example, the analytics module 385 may output recommendations (e.g., recommended chiller supply temperature 825) that are predicted using the fine-tuned model 810.

In some aspects, the incremental learning of the trained model 395 may be based on a schedule set by the schedule determination module 393. In some aspects, the incremental learning of the trained model 395 may be based on alternative and/or additional criteria (e.g., prediction accuracy of the trained model 395 in comparison to an accuracy threshold, differences between the training data associated with the historical data and the training data associated with the real-time data in comparison to a predetermined difference threshold, etc.).

An energy monitoring module 830 may provide energy monitoring associated with the chiller control system 815. For example, the energy monitoring module 830 may calculate and provide an indication of energy saved in response to implementing the recommendations (e.g., recommended chiller supply temperature 825) at the chiller control system 815.

Figure 8B:
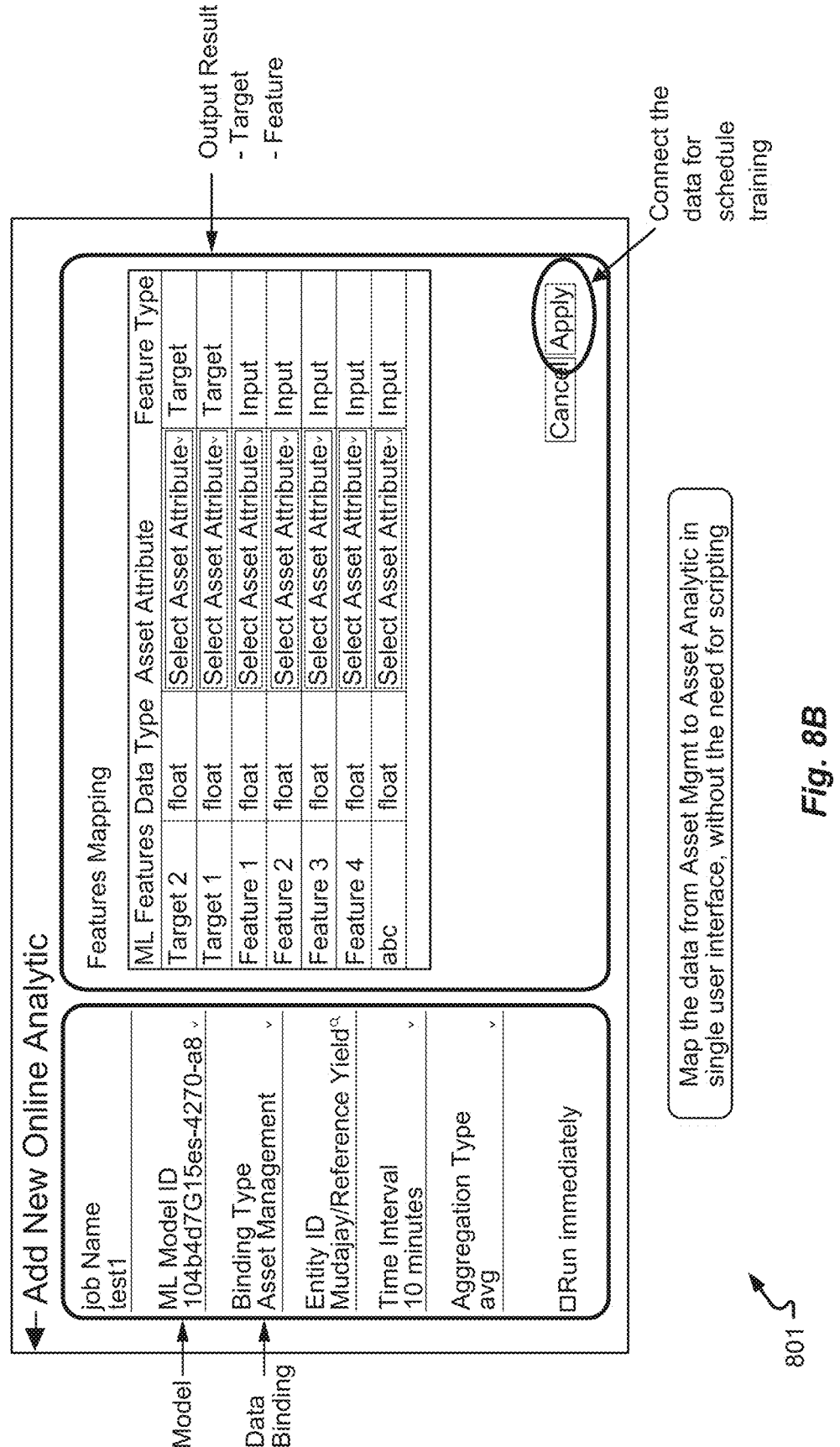
FIG. 8B illustrates an example of a user interface 801 in accordance with aspects of the present disclosure.

FIG. 8B illustrates an example of a user interface 801 in accordance with aspects of the present disclosure. In some examples, the user interface 801 may be implemented via the dashboard module 305 or user interface 391 described with reference to FIGS. 3A and 3D.

The user interface 801 provides a single user interface that supports mapping data from asset management module 310 to the analytics module 385, without the need for scripting/coding. By contrast, some other prior art analytic tools or software applications work "offline," without being connected with real time data. Such approaches may rely on uploading a model manually by scripting, and further, running analytics using the model may include manually connecting the model with data to be analyzed.

Accordingly, for example, the techniques described herein and the user interface 801 provide users the ability to link a machine learning model and real time data associated with devices/an asset, without the scripting or coding. In some other aspects, the user interface 801 supports user controlled management of training scheduling. For example, via the user interface 801, the user may enable incremental training described herein.

Aspects of the incremental training techniques described herein may provide increased model accuracy compared to other model training techniques. For example, other model training techniques include manually initiating training periodically (e.g., every 6 months or every year). The techniques described herein include automatic/scheduled incremental training of a model, without training a model an entire dataset. In some aspects, through incremental training, the model is updated to reflect any changes in process data characteristics. In some other aspects, implementing automatic/scheduled incremental training described herein may optimize CPU consumption and reduce training time/improve training efficiency (e.g., through incremental training sets), thereby reducing overhead costs.

Figure 9A:
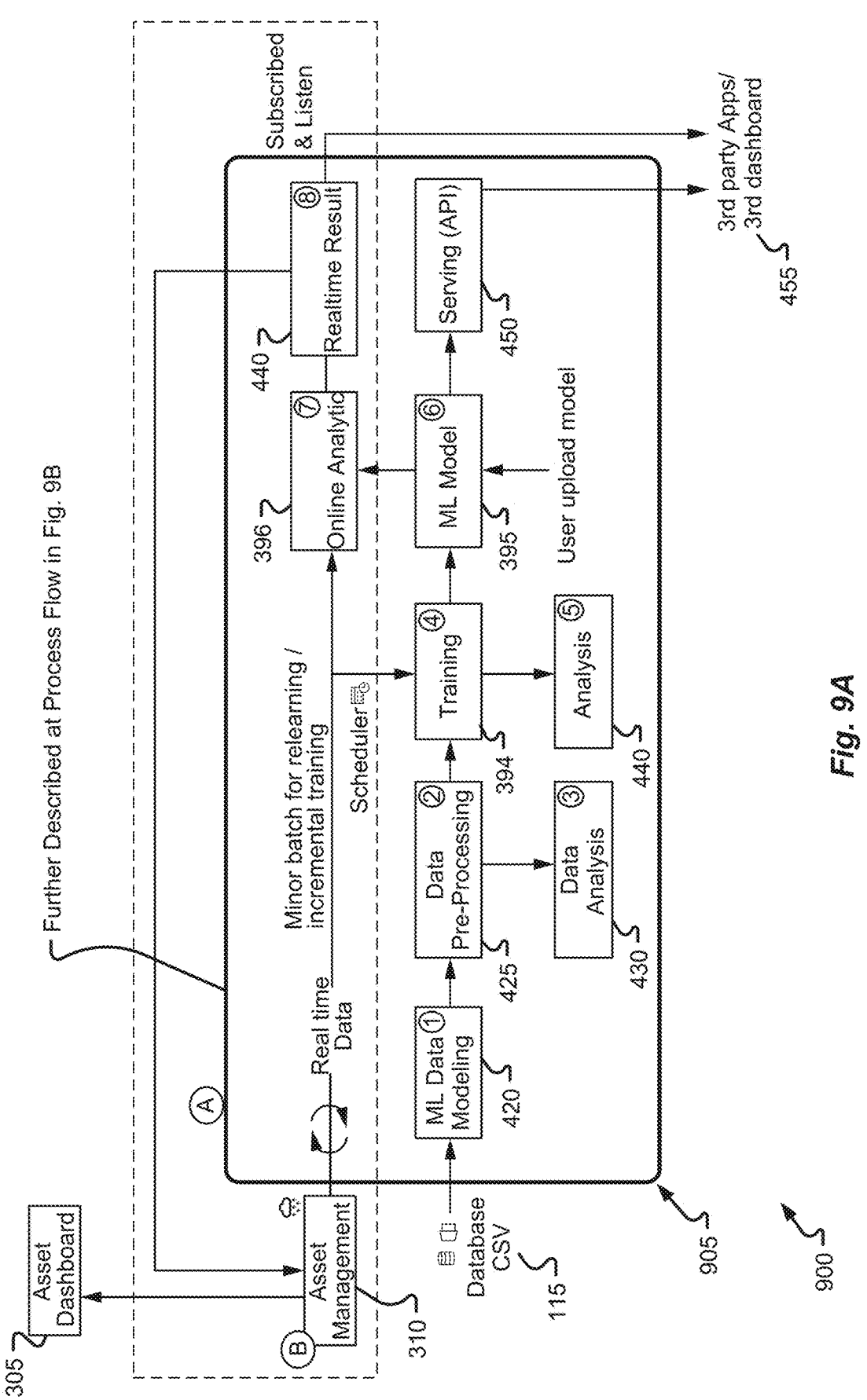
FIG. 9A illustrates an example block diagram that supports asset analytics and simulation in accordance with aspects of the present disclosure.

FIG. 9A illustrates an example block diagram 900 that supports asset analytics and simulation in accordance with aspects of the present disclosure. FIG. 9A includes aspects of like elements described herein. For example, aspects of FIG. 9A may be implemented by server 110 or communication device 105 described with reference to FIG. 1. The elements illustrated in FIG. 9A are the same or similar to elements described with reference to the asset management module 310 and the analytics module 385 as described with reference to FIG. 3A, FIG. 3B, FIG. 3D, and FIG. 4, and repeated descriptions thereof are omitted for brevity.

Referring to FIG. 9A, according to some other techniques, analytic tools ("A") and real time data platforms ("B") (e.g., IoT platforms) are implemented by different tools or by different companies. Accordingly, for example, the lack of integration between the analytic tools "A" and the platforms "B" result in a lack of compatibility or understanding between the analytic tools and the platforms. In some cases, engineering costs are incurred at both the analytic tools "A"

and the platforms "B" in order to support communication (e.g. data transfer, data integration) between the analytic tools and the platforms.

For example, in some other approaches, communication between analytic tools "A" and platforms "B" implemented as separate systems may involve scripting/coding by a user or manual linking. Aspects of the present disclosure provide an integrated approach which may achieve incremental training without multiple engineers. In an example, aspects of the present disclosure support incremental training by a relatively inexperienced user (e.g., avoiding reliance on an IT engineer for scripting, an IoT engineer for connecting with the data, a data scientist for designing the training workflow, etc.). Accordingly, for example, aspects of the present disclosure may be implemented by users that are relatively inexperienced with scripting/coding for information exchange between "A" and "B," have relatively little IT domain knowledge, have relatively little data platform knowledge, and/or have relatively little data scientist domain knowledge. In some other aspects, the techniques described herein may be implemented without close coordination between a member associated with analytic tools "A" with a member associated with a platform "B".

In some other cases, such approaches fail to implement closed loop bi-directional iteration between analytic tool "A" (e.g., platform 905, as implemented by an analytics module 385 of the present disclosure) and asset management "B" (e.g., as implemented by an asset management module 310 of the present disclosure) to process information/data. Such other approaches fail to support continuous and scheduled processing of information/data. For example, in other approaches, a platform (e.g., at "B") may involve uploading a machine learning model that has been manually generated by analytic tools (e.g., at "A") or by linking via API. Accordingly, for such other approaches, the training process in analytic tools (e.g., at "A") may involve collecting the data from platforms (e.g., at "B") periodically (e.g., every 3 months, every 6 months, every defined period, etc.) for training the data.

According to example aspects of the present disclosure, the integration illustrated at least at FIG. 9A supports the exchange of data between analytic tools ("A") (e.g., implemented by an analytics module 385 described herein) and real time data platforms ("B") (e.g., implemented by an asset management module 310 described herein).

For an inexperienced user, the integration reduces the amount of time for the user to secure the information exchange between analytic tools ("A") and real time data platforms ("B"). In an example, using systems and techniques described herein, an inexperienced user may secure the information exchange in a few hours, compared to days or weeks as in other approaches. The integration illustrated at least at FIG. 9A supports increased consistency and accuracy in association with the transfer of data/information between "A" and "B."

Figure 9B:
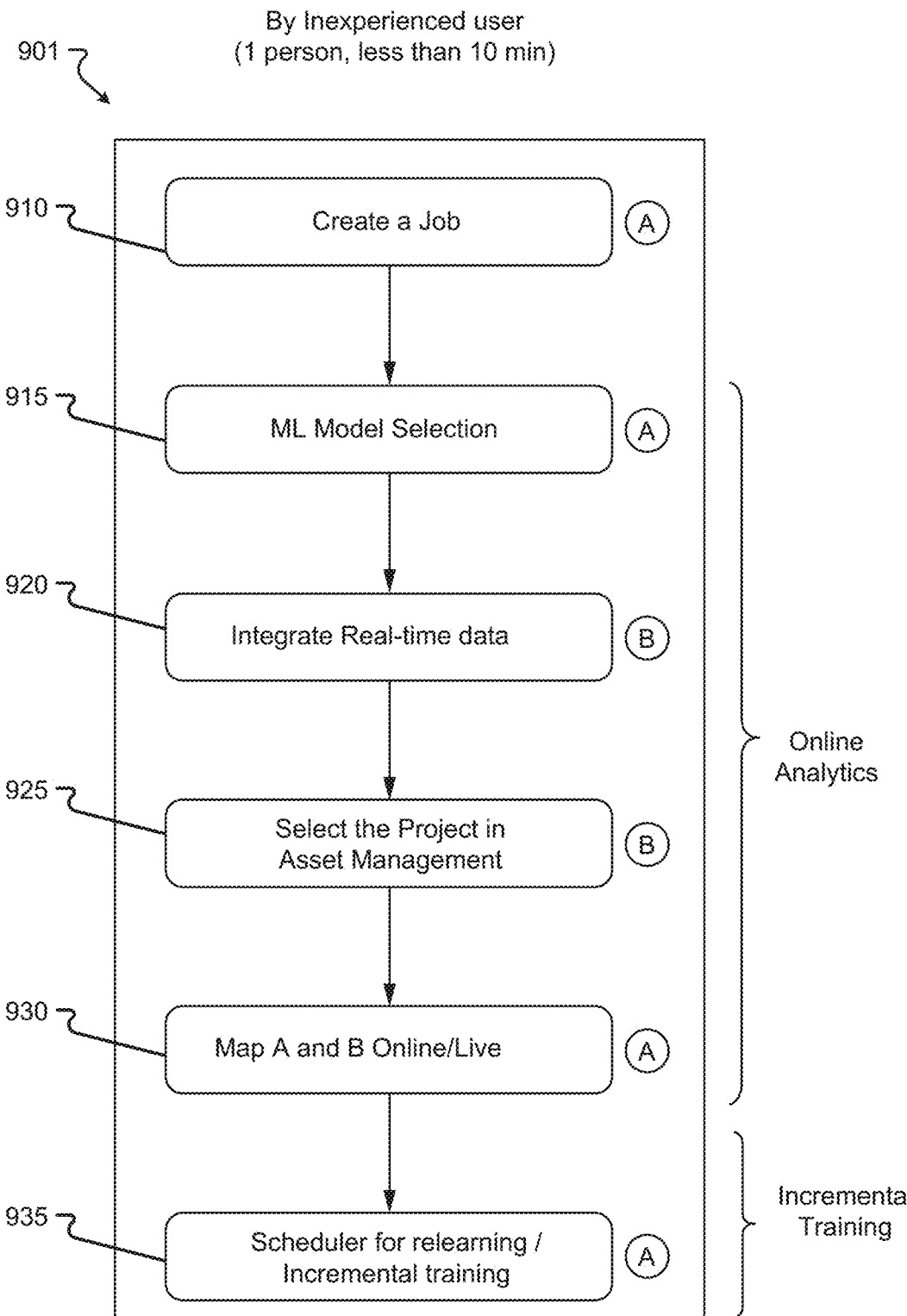
FIG. 9B illustrates an example process flow that supports simulation and analytics of assets in accordance with aspects of the present disclosure.

FIG. 9B illustrates an example process flow 901 that supports simulation and analytics of assets in accordance with aspects of the present disclosure. In some examples, process flow 901 may implement aspects of the system 100 described with reference to FIG. 1. The process flow 901 may be implemented by dashboard module 305, asset management module 310, analytics module 385, and online analytic module 396 described herein. In some aspects, the process flow 901 may be implemented in response to a user input via a user interface 391 described herein. As described herein, the features of the process flow 901 may be implemented without scripting or coding by the user.

In the following description of the process flow 901, the operations may be performed in a different order than the order shown, or the operations may be performed in different orders or at different times. Certain operations may also be left out of the process flow 901, or other operations may be added to the process flow 901.

It is to be understood that any device of the system 100 may perform the operations shown. For example, the process flow 901 may be implemented by a server 110 and/or a communication device 105 described with reference to FIG. 1.

At 910, the process flow 901 may include creating a job/task (e.g., monitoring performance of an asset, simulating operation of an asset, etc.). In an example, the creation of the job/task at 910 may be performed in response to a user input indicating asset features (e.g., device(s) associated with the asset, data type, etc.) and machine learning features (e.g., target operational parameter(s) for optimization, etc.). For example, 910 may include creating a job in response to a user input associated with selecting which data/info to run. In some aspects, a job/task at 910 may include naming the task for a particular machine learning task.

At 915, the process flow 901 may include the selection of a machine learning model In an example, the selected machine learning model is a machine learning built based on historical data by offline machine learning analysis as described herein. For example, in response to the job/task creation (data selection associated with the asset) described with reference to 910, a "best" machine learning model/an "adaptive" machine learning model is determined. In an example, the machine learning model may be created from user uploaded data, created based on real time data from asset management module 310, or retrieved from a database 115 (e.g., in response to a database query).

At 920, the process flow 901 may include integrating the real-time data online (e.g., live). For example, in response to the model selected at 915, the process flow 901 may include proceeding with the connection with the real time data platform "B" of FIG. 9A for data acquisition. In an example, the real time data may be provided by asset management module 310.

At 925, the process flow 901 may include selecting the project where the online analytics is applied.

At 930, the process flow 901 may include connecting (mapping) the analytic tools ("A") and real time data platforms ("B"). For example, at 930, the process flow 901 may include establishing a connection between the project in asset management module 310 and the analytics module 385 autonomously or semi-autonomously (e.g., in combination with a user input). For example, 930 may include initiating data retrieval by the analytics module 385 (e.g., by the data integration module 388 (which includes a mapping module 389) and data retrieval module 390 described with reference to FIG. 3D). In some aspects, 930 may include analytics implemented by the online analytic module 396 described with reference to FIG. 3D.

At 935, the process flow 901 may include relearning (e.g., incremental training). For example, 935 may be implemented at training module 394 and training stage 705-$b$ described with reference to FIG. 3D and FIG. 7A.

In some example implementations, aspects of the present disclosure support completion of 910 through 935 of the process flow 901 by a single user in less than 10 minutes.

In an example, an inexperienced user (1 person, less than 10 min) can perform flow 901 using the tool.

FIG. 10 illustrates an example process flow 1000 that supports asset analytics and simulation in accordance with aspects of the present disclosure. In some examples, process flow 1000 may implement aspects of the system 100 described with reference to FIG. 1. The process flow 1000 may be implemented by asset management module 310 and analytics module 385 described herein with reference to FIGS. 3B and 3D. In some aspects, the process flow 1000 may be implemented in response to one or more user inputs via a user interface 391 described herein. As described herein, the features of the process flow 1000 may be implemented without scripting or coding by the user.

In the following description of the process flow 1000, the operations may be performed in a different order than the order shown, or the operations may be performed in different orders or at different times. Certain operations may also be left out of the process flow 1000, or other operations may be added to the process flow 1000.

It is to be understood that any device of the system 100 may perform the operations shown. For example, the process flow 1000 may be implemented by a server 110 and/or a communication device 105 described with reference to FIG. 1.

At 1005 of the process flow 1000, the asset management module 310 may receive device data (e.g., device information/parameters) associated with one or more devices 322.

At 1010 of the process flow 1000, the asset management module 310 may group a set of devices 322 (e.g., device 322-*a* through device 322-*c*) in association with an asset. In an example, the asset management module 310 may group the set of devices 322 in response to a user input.

In some aspects, the asset management module 310 is a single source of truth for all data associated with the asset. In some aspects, the asset management module 310 supports modeling of the data such that the data is easier for a user to read and understand. In some aspects, the data is modeled in a format that supports reuse in analytics (e.g., at analytics module 385) and dashboarding (e.g., at dashboard module 305). For example, the data is modeled in a format that supports user reading and manipulation of the data without coding or scripting experience. In some aspects, the dashboard module 305 may present the data and models and support drag and drop interaction.

At 1015 of the process flow 1000, the analytics module 385 may retrieve the data from the asset management module 310 and organize the data. In some aspects, the analytics module 385 may retrieve the data in response to a user input (e.g., a mouse click, a keyboard input, text inputs, etc.). For example, the analytics module 385 may support user inputs (e.g., mouse clicks, drag and drop, text inputs, etc.) that are free from coding or scripting.

At 1020 of the process flow 1000, the analytics module 385 may receive a user input indicating information to be analyzed (e.g. a target operational parameter to be optimized) using online analytics described herein. For example, the user may select the information of the asset by checking or clicking respective boxes in a user interface. The boxes may be associated with corresponding information (e.g., size, XYZ velocity, XYZ acceleration, Y velocity, uptime, temperature, etc.) of the asset.

At 1025 of the process flow 1000, the analytics module 385 may run a scheduler for incremental training. The scheduler may include aspects of the schedule determination module 393 described with reference to FIGS. 3D and 7A. In some aspects, the analytics module 385 run the scheduler in response to a user input (e.g., a mouse click, a keyboard input, text inputs, etc.).

FIG. 11 illustrates an example process flow 1100 that supports relearning and incremental training in accordance with aspects of the present disclosure. The process flow 1100 may be implemented by analytics module 385 and asset management module 310 described with reference to FIG. 9A. In an example, the process flow 1100 may be implemented at 1025 of the process flow 1000.

At 1105, the process flow 1100 may include connecting the real time data (e.g., provided by asset management module 310 of "B") and the analytic tools (e.g., platform 905, as implemented by an analytics module 385 of the present disclosure).

At 1110, the process flow 1100 may include configuring one or more trigger criteria for relearning and incremental training. In an example, the trigger criteria may include a temporal variable (e.g., relearn or retrain every X days, every Y weeks, etc.). In some aspects, the analytics module 385 may support user configuration of the trigger criteria via an interface of the scheduler function (e.g., via a user interface 391 described herein). In some aspects, the process flow 1100 may support additional or alternative trigger criteria for relearning and incremental training. For example, the trigger criteria may include a target prediction accuracy of the trained model 395.

At 1115, the process flow 1100 may include performing relearning (e.g., incremental training) in response to the trigger criteria being met. For example, the process flow 1100 may include retraining the model in response to identifying that the temporal variable is met and/or identifying that the target prediction accuracy falls below an accuracy threshold.

Accordingly, for example, aspects of the present disclosure support continuous connection of the data from the asset management module 310 (at "B") to the analytics module 385 (at "A") and automatic enhancement of a trained existing model. Enhancement of the trained model may include retraining the trained model (e.g., using incremental data), periodic correlation of outputs provided by the models, and data sampling.

Figure 12A:
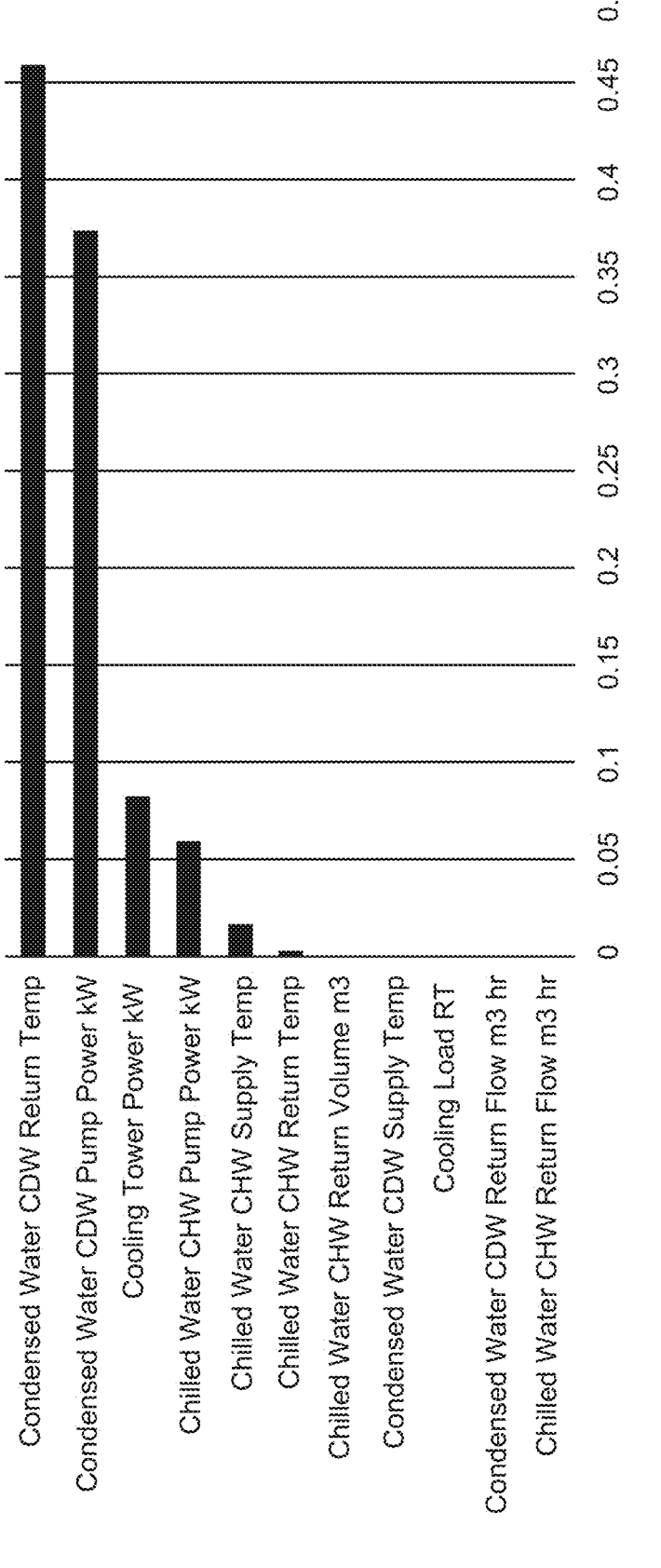
FIG. 12A illustrates an example graph of variable importance of operational parameters of a chiller with respect to a target operational parameter (e.g., power (kW) usage).

FIG. 12A illustrates an example graph 1200 of variable importance of operational parameters of a chiller with respect to a target operational parameter (e.g., power (kW) usage/consumption). The example operational parameters illustrated in the example graph 1200 are examples, and operational parameters supported by aspects of the present disclosure are not limited thereto. In the example graph 1200, condensed water (CDW) return temperature is the operational parameter having the greatest influence on chiller power (KW) usage/consumption.

Aspects of the present disclosure include a simulation module (e.g., simulation module 710 of FIG. 7A), a prediction module (e.g., target prediction and recommendation module 397 of FIG. 3D, prediction module 397-*a* of FIG. 7A), and a recommendation module (e.g., target prediction and recommendation module 397 of FIG. 3D, recommendation module 397-*b* of FIG. 7A) that may support a larger quantity of parameters and a larger variation of parameters. The simulation module and prediction module may take into consideration the variable importance and correlation relationship, between any combination of operational parameters (e.g., any two operational parameters).

Figure 12B:
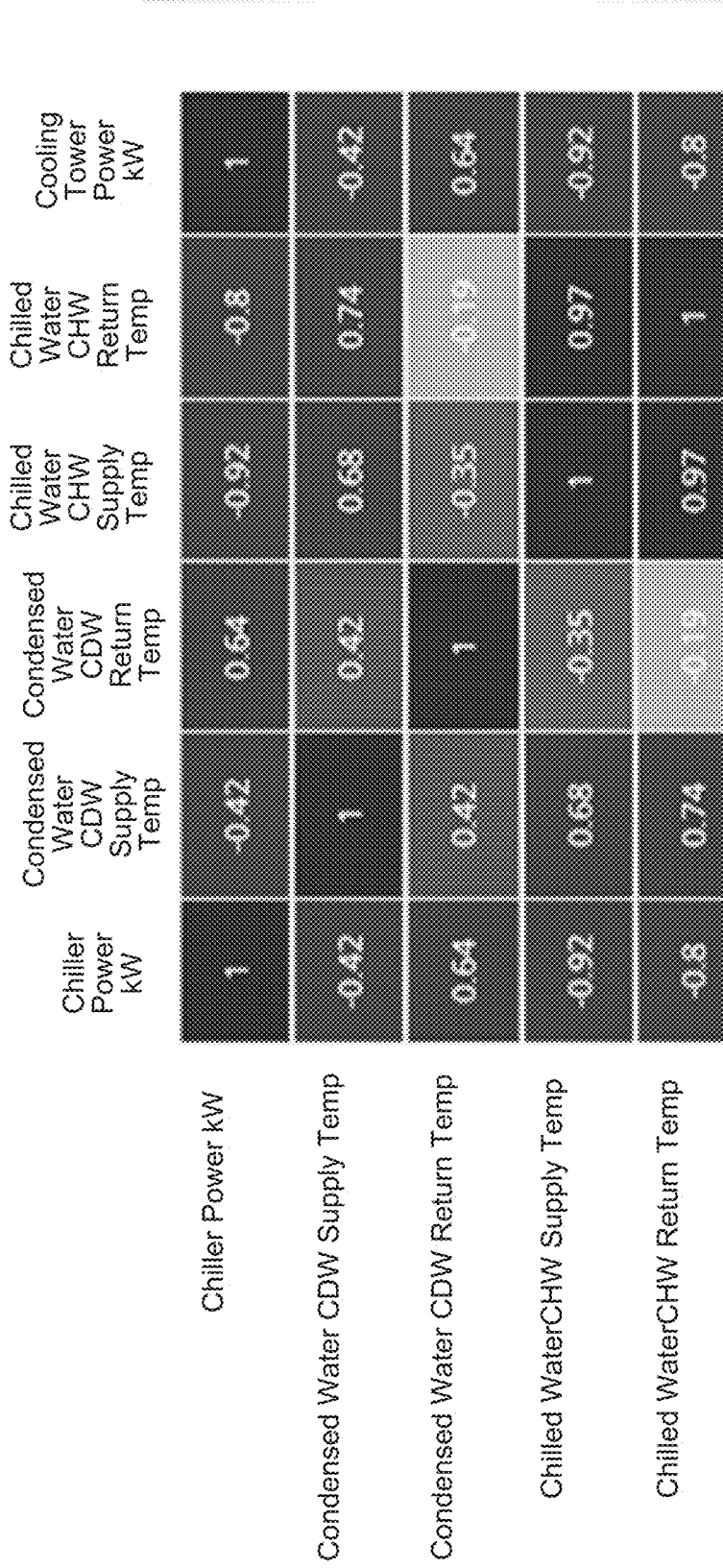
FIG. 12B illustrates an example of a correlation matrix in accordance with aspects of the present disclosure.

FIG. 12B illustrates an example of a correlation matrix 1201 generated by the simulation module and/or prediction module. In an example, the simulation module and/or prediction module may identify, from the correlation matrix 1201, the influence/impact of an operational parameter to other operational parameters. For example, referring to the correlation matrix 1201, condensed water (CDW) return temperature has a variable importance of 0.64 for chiller power (kW) (and thereby the largest impact on chiller power (kW)).

Accordingly, for example, in response to a change in value of condensed water (CDW) return temperature, the prediction module and/or recommendation module may identify that the change in condensed water (CDW) return temperature will have the relatively largest impact among other operational parameters (e.g., condensed water (CDW) supply temperature, chilled water (CHW) return tempera- ture, etc.) on chiller power (kW). In some aspects, the simulation and prediction modules can be processed at the same time to predict power consumption iteratively with all factors mentioned herein.

The recommendation module may output the optimal controllable parameters (e.g., chilled water (CHW) supply temperature in a chiller system, motor speed (RPM) in a pump system, etc.) that may contribute to improving asset efficiency and power consumption savings for satisfying target criteria requirements (e.g., cooling load for a chiller system, flow for a pump system).

Accordingly, for example, aspects of the graph 1200 and the correlation matrix 1201 enable a user to directly map the impact between an input/output operational parameter and a target operational parameter and modify the operational parameters, without coding or programming experience.

It is to be understood that example aspects of the present disclosure described with reference support any combina- tion of identifiers, colors, text, and graphical illustrations for distinguishing between values in the correlation matrix 1201. For example, aspects of the present disclosure support using a first color (e.g., red) and gradients thereof for values less than zero (e.g., −0.01 through −1.0) and a second color (e.g., blue) and gradients thereof for values above zero (e.g., +0.01 through +1.0).

In another example, aspects of the present disclosure support using differing symbols (e.g., triangles, squares, etc.) and densities thereof for distinguishing between values in the correlation matrix 1201. For example, a first symbol (e.g., squares) and densities thereof may be used for values less than zero (e.g., −0.01 through −1.0), and a second symbol (e.g., triangles) and densities thereof may be used for values above zero (e.g., +0.01 through +1.0).

FIG. 13 illustrates an example of a process flow 1300 that supports asset monitoring in accordance with aspects of the present disclosure. In some examples, process flow 1300 may implement aspects of the system 100 described with reference to FIG. 1.

In the following description of the process flow 1300, the operations may be performed in a different order than the order shown, or the operations may be performed in different orders or at different times. Certain operations may also be left out of the process flow 1300, or other operations may be added to the process flow 1300.

It is to be understood that any device of the system 100 may perform the operations shown. For example, the pro- cess flow 1300 may be implemented by a server 110 and/or a communication device 105 described with reference to FIG. 1.

At 1305, the process flow 1300 includes receiving, at the system 100, a first multi-dimensional representation (e.g., multi-dimensional representation 126) of an asset (e.g., asset 123) associated with at least one industrial process.

At 1310, the process flow 1300 includes generating (e.g., automatically generating) a second multi-dimensional rep- resentation (e.g., multi-dimensional representation 127) of the asset based on the first multi-dimensional representation.

In an example, 1310 includes generating the second multi- dimensional representation according to a format of the asset monitoring system.

In some aspects, generating the second multi-dimensional representation at 1310 includes mapping one or more opera- tional parameters associated with the asset to the second multi-dimensional representation. In an example, mapping the one or more operational parameters associated with the asset to the second multi-dimensional representation includes: segmenting the second multi-dimensional repre- sentation into a plurality of pixels; associating the values of the one or more operational parameters to candidate pixel values of the plurality of pixels; and displaying the second multi-dimensional representation includes displaying the plurality of pixels based on the mapping.

In some other aspects, generating the second multi-di- mensional representation at 1310 includes associating at least one of a plurality of devices to the asset.

In an example, the first multi-dimensional representation includes a three-dimensional graphical representation of the asset, and the second multi-dimensional representation includes a two-dimensional vector graphic representation of the asset. In some aspects, generating the second multi- dimensional representation includes converting the first multi-dimensional representation into the second multi-di- mensional representation. In an example, the second multi- dimensional representation is configurable via the graphical user interface.

At 1315, the process flow 1300 includes generating a set of properties corresponding to the second multi-dimensional representation. In some aspects, the set of properties are configurable via the graphical user interface. In an example, the set of properties include at least one of tag, range, and shape.

At 1320, the process flow 1300 includes processing one or more characteristics associated with the asset.

At 1325, the process flow 1300 includes selecting one or more operational parameters associated with the asset, threshold criteria associated with the one or more opera- tional parameters, or both based on a result of the process- ing.

At 1330, the process flow 1300 includes accessing values of the one or more operational parameters associated with the asset from a device platform application (e.g., an appli- cation associated with a device management platform 228 described with reference to FIG. 2) or a cloud infrastructure (e.g., a cloud infrastructure 232 described with reference to FIG. 2).

In an example, the values include real-time measurements or historical measurements associated with the asset. In an example, the one or more operational parameters include at least one of temperature, pressure, flow rate, humidity, vibration, full load current rating, power, and carbon dioxide level.

At 1335, the process flow 1300 includes comparing the values of the one or more operational parameters to thresh- old criteria. In an example, based on a result of the com- parison, the process flow 1300 includes at least one of: generating a status indicator and outputting a notification, the notification including at least one of an audible alert, a visual alert, and a haptic alert.

At 1340, the process flow 1300 includes displaying, at a graphical user interface of the asset monitoring system, the second multi-dimensional representation and status infor- mation associated with the asset. In some aspects, the status information includes the values of the one or more operational parameters associated with the asset. In some aspects, the status information includes the status indicator generated at 1335.

In some aspects, the process flow 1300 includes aggregating values of two or more operational parameters. In an example, the status information includes the aggregated values of the two or more operational parameters.

In some aspects, the process flow 1300 includes displaying at least one of the second multi-dimensional representation, the status information, and the status indicator according to a first color based on the values of the one or more operational parameters satisfying the threshold criteria; and displaying at least one of the second multi-dimensional representation, the status information, and the status indicator according to a second color based on the values of the one or more operational parameters failing to satisfy the threshold criteria.

At 1345, the process flow 1300 includes predicting, based on the values of the one or more operational parameters, a failure event associated with the asset.

At 1350, the process flow 1300 may include displaying, at the graphical user interface, at least one of: temporal information associated with the failure event; and a recommended action associated with the failure event.

The process flow 1300 may support user inputs associated with configuring the asset. For example, the process flow 1300 may include receiving, via the graphical user interface, a user input associated with grouping a plurality of devices (e.g., devices 122 described with reference to FIG. 1). In an example, the process flow 1300 includes assigning the plurality of devices to the asset based on the user input. In some aspects, the process flow 1300 includes grouping the plurality of devices in response to the user input. In some examples, grouping the plurality of devices includes: accessing device data of the plurality of devices; and converting the device data into at least one type of data structure representative of the asset.

The process flow 1300 includes configuring the asset based on a user input. In some aspects, configuring the asset includes at least one of: modifying a hierarchy associated with the asset or the at least one of the plurality of devices; deleting the asset from an asset library; adding the asset to the asset library; configuring an identifier associated with the asset; generating and applying a model associated with the asset, where the model includes one or more algorithms associated with aggregating the one or more operational parameters; and configuring the model associated with the asset.

The process flow 1300 may support autonomous and/or semi-autonomous implementation of any operation of the process flow 1300. Any of the steps, functions, and operations discussed herein can be performed continuously and automatically.

Figure 14:
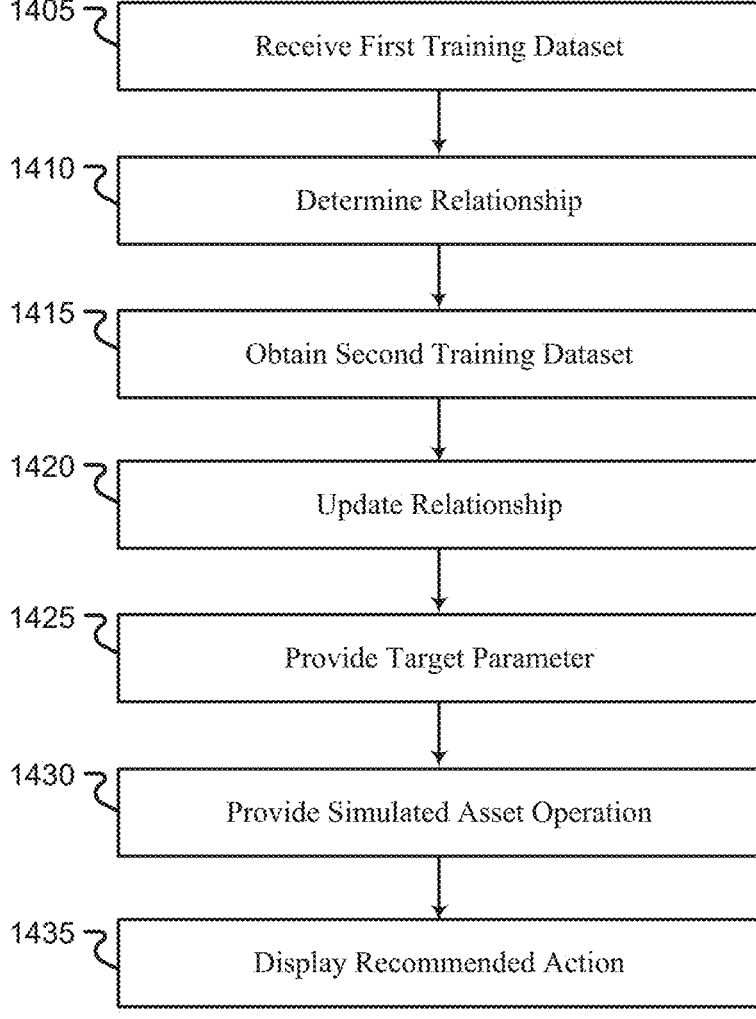
FIG. 14 illustrates an example of a process flow that supports simulation and analytics of assets in accordance with aspects of the present disclosure.

FIG. 14 illustrates an example of a process flow 1400 that supports simulation and analytics of assets in accordance with aspects of the present disclosure. In some examples, process flow 1400 may implement aspects of the system 100 described with reference to FIG. 1.

In the following description of the process flow 1400, the operations may be performed in a different order than the order shown, or the operations may be performed in different orders or at different times. Certain operations may also be left out of the process flow 1400, or other operations may be added to the process flow 1400.

It is to be understood that any device of the system 100 may perform the operations shown. For example, the process flow 1400 may be implemented by a server 110 and/or a communication device 105 described with reference to FIG. 1.

The process flow 1400 may support a method of providing analytics for an asset.

At 1405, the process flow 1400 may include receiving a first training dataset comprising historical data, wherein the historical data is associated with operation of the asset.

At 1410, the process flow 1400 may include determining a relationship (e.g., a variable importance described herein, a correlation matrix 1201 described herein, etc.) based on the first training dataset.

At 1415, the process flow 1400 may include obtaining a second training dataset comprising real time data associated with operation of the asset.

At 1420, the process flow 1400 may include updating the relationship to obtain an updated relationship automatically, wherein the updated relationship is based on the first training dataset and the second training dataset, and the updated relationship is determined based on incremental training.

At 1425, the process flow 1400 may include providing a target parameter associated with operation of the asset. In some aspects, the target parameter includes a target operational parameter associated with an asset (e.g. chiller power associated with a chiller system).

At 1430, the process flow 1400 may include providing simulated asset operation in a graphical user interface based on the updated relationship and the target parameter.

At 1435, the process flow 1400 may include displaying a recommended action based on the simulated asset operation.

In some aspects, the relationship comprises a plurality of correlations among a plurality of inputs and outputs associated with the operation of the asset, and further comprises variable importance of each one of the plurality of inputs and outputs, wherein the variable importance represents the influence of the each one of the plurality of inputs and outputs to the relationship.

In some aspects, the target parameter is associated with energy consumption of the asset.

In some aspects, the target parameter comprises cooling load and discharge flow.

In some aspects, obtaining the second training dataset comprises obtaining real time data associated with the asset. In some aspects, obtaining the real time data comprises: initializing connection between the asset in the graphical user interface and an asset management platform comprising the real time data; and retrieving the real time data from the asset management platform based on a mapping list.

In some aspects, the mapping list comprises associations between the asset in the graphical user interface and an asset management platform comprising the real time data.

In some aspects, obtaining the second training dataset comprises obtaining real time data associated with the asset. In some aspects, obtaining the real time data comprises: calculating a predetermined period for obtaining the real time data; and retrieving the real time data based on the predetermined period.

In some aspects, calculating the predetermined period comprises: calculating differences between the first training dataset and the second training dataset within an interval; determining an amount of the differences within the interval; and calculating the predetermined period based on the amount of the differences.

In some aspects, updating the relationship to obtain an updated relationship comprises automatically updating the relationship based on the predetermined period and the amount of the differences.

In some aspects, updating the relationship comprises: updating the plurality of correlations among the plurality of inputs and outputs associated with the operation of the asset; and updating the variable importance of each one of the plurality of inputs and outputs.

In some aspects, providing the recommended action comprises providing at least a value of a parameter associated with the operation of the asset.

In some aspects, providing the recommended action comprises providing a graph in the graphical user interface indicating a prediction associated with the asset.

In some aspects, the process flow 1400 may include: predicting a failure event associated with the asset based on the updated relationship and the second training dataset; and displaying temporal information associated with the asset in the graphical user interface.

In some aspects, the process flow 1400 may include automatically controlling the operation of the asset in response to receiving the recommended action.

In some aspects, controlling the operation comprises changing a value of a parameter associated with the asset.

In some aspects, the asset comprises one of: a chiller, a pump, a boiler, a blower, or a compressor.

In some aspects, the asset is a chiller and the historical data comprises data associated with at least one of: chiller power, chilled water supply temperature, chilled water return temperature, or chilled water flow.

In some aspects, the asset is a pump and the historical data comprises data associated with at least one of: discharge pressure, discharge flow, wet well level, or pump power.

FIG. 15A illustrates an example of a process flow 1500 that supports simulation and analytics of assets in accordance with aspects of the present disclosure. In some examples, process flow 1500 may implement aspects of the system 100 described with reference to FIG. 1.

In the following description of the process flow 1500, the operations may be performed in a different order than the order shown, or the operations may be performed in different orders or at different times. Certain operations may also be left out of the process flow 1500, or other operations may be added to the process flow 1500.

It is to be understood that any device of the system 100 may perform the operations shown. For example, the process flow 1500 may be implemented by a server 110 and/or a communication device 105 described with reference to FIG. 1.

At 1505, the process flow 1500 may include identifying a target value of the one or more first operational parameters associated with an asset, wherein the asset is associated with at least one industrial process.

In some aspects, the one or more first operational parameters are associated with energy consumption of the asset.

In some aspects, the one or more first operational parameters include at least one of: a cooling load associated with the asset; and a discharge flow rate associated with the asset.

In some aspects, the asset includes a chiller, a pump, a boiler, a blower, or a compressor.

At 1510, the process flow 1500 may include providing the target value of the one or more first operational parameters to a machine learning model.

At 1515, the process flow 1500 may include receiving, in response to the machine learning model processing the target value of the one or more first operational parameters, a second target value of one or more second operational parameters associated with the asset.

In an example, the target value identified at 1505 may be a target performance value (e.g., energy consumption value)

of the asset, and the second target value received at 1515 may be an operational parameter (e.g., a chilled water supply temperature) recommended by the machine learning model for achieving the target performance value of the asset.

In some aspects, the machine learning model provides the second target value of the one or more second operational parameters based on a correlation between a plurality of operational parameters of the asset, wherein the plurality of operational parameters include the one or more first operational parameters and the one or more second operational parameters.

In some aspects, the correlation between the plurality of operational parameters of the asset includes: a first correlation between the one or more first operational parameters and the one or more second operational parameters; and a second correlation between one or more third operational parameters associated with the asset and the one or more second operational parameters.

In some aspects, the correlation is based on: a first weighted impact of the one or more first operational parameters with respect to the correlation; and a second weighted impact of the one or more second operational parameters with respect to the correlation, wherein the first weighted impact is different from the second weighted impact.

At 1520, the process flow 1500 may include simulating one or more operations of the asset using the second target value of the one or more second operational parameters.

At 1525, the process flow 1500 may include providing, via a user interface, one or more recommended actions in response to a result associated with simulating the one or more operations.

In some aspects, providing the one or more recommended actions includes providing, via the user interface, the target value of the one or more second operational parameters.

In some aspects, providing the one or more recommended actions includes displaying, via the user interface, a graph indicating one or more predictions associated with the asset.

At 1527, the process flow 1500 may include automatically or semi-automatically controlling the one or more operations of the asset in response to receiving the one or more recommended actions, wherein automatically or semi-automatically controlling the one or more operations of the asset includes using the second target value of the one or more second operational parameters.

FIG. 15B illustrates an example of a process flow 1501 that supports simulation and analytics of assets in accordance with aspects of the present disclosure. In some examples, process flow 1501 may implement aspects of the system 100 described with reference to FIG. 1.

In the following description of the process flow 1501, the operations may be performed in a different order than the order shown, or the operations may be performed in different orders or at different times. Certain operations may also be left out of the process flow 1501, or other operations may be added to the process flow 1501.

It is to be understood that any device of the system 100 may perform the operations shown. For example, the process flow 1501 may be implemented by a server 110 and/or a communication device 105 described with reference to FIG. 1.

Aspects of the process flow 1501 support prediction using the machine learning model. Aspects of the process flow 1501 support training and updating of the machine learning model using historical data and/or real time data associated with the asset. For example, aspects of the process flow 1501 may be implemented in combination with any features described herein with reference to the process flow 1500.

For example, aspects of process flow 1501 may be implemented prior to, after, or in combination with any features of the process flow 1500.

At 1530, the process flow 1501 may include training the machine learning model based on a training dataset that includes historical data associated with at least one industrial process, the asset, or both, wherein training the machine learning model includes determining a correlation between one or more first operational parameters associated with the asset and one or more second operational parameters associated with the asset.

In some aspects: the asset includes a chiller; and the historical data is associated with at least one of: power consumption, water supply temperature, water return temperature, and water flow associated with the chiller.

In some aspects: the asset includes a pump; and the historical data is associated with at least one of: power consumption, discharge pressure, discharge flow, and wet well level associated with the pump.

At 1535, the process flow 1501 may include comparing a first training dataset including historical data associated with the asset and a second training dataset including real time data associated with the asset.

At 1540, the process flow 1501 may include setting a temporal interval associated with obtaining real time data associated with the asset, wherein setting the temporal interval is in response to comparing (at 1535) the first training dataset including historical data associated with the asset and the second training dataset including the real time data associated with the asset.

At 1545, the process flow 1500 may include comparing a prediction accuracy of the machine learning model with respect to detecting one or more anomalies associated with the asset and a target prediction accuracy.

At 1555, the process flow 1501 may include obtaining the real time data. In an example, the process flow 1501 at 1550 may include obtaining the real time data based on the temporal interval (as set at 1540). Additionally, or alternatively, the process flow 1501 at 1555 may include obtaining the real time data associated with the asset in response to the comparing (at 1545) the prediction accuracy of the machine learning model with respect to detecting one or more anomalies associated with the asset and the target prediction accuracy.

At 1560, the process flow 1501 may include updating the machine learning model based on a training dataset that includes the real time data associated with the asset, wherein updating the machine learning model includes updating a correlation between the one or more first operational parameters and the one or more second operational parameters.

At 1565, the process flow 1501 may include predicting an event associated with the asset based on the real time data and based on updating the correlation.

At 1570, the process flow 1501 may include displaying temporal information associated with the event and the asset via the user interface.

Aspects of the process flows 1500 and process flow 1501 described herein may be implemented by a system including: a graphical user interface; a processor; and a memory storing data thereon that, when processed by the processor, cause the processor to perform aspects of the process flows 1500 and process flow 1501.

Figure 16:
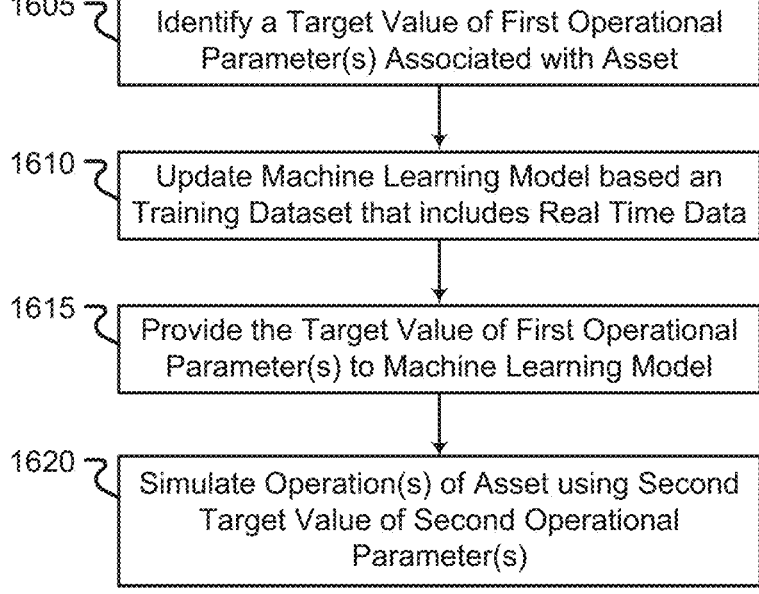
FIG. 16 illustrates an example of a process flow that supports simulation and analytics of assets in accordance with aspects of the present disclosure.

FIG. 16 illustrates an example of a process flow 1600 that supports simulation and analytics of assets in accordance with aspects of the present disclosure. In some examples, process flow 1600 may implement aspects of the system 100 described with reference to FIG. 1.

In the following description of the process flow 1600, the operations may be performed in a different order than the order shown, or the operations may be performed in different orders or at different times. Certain operations may also be left out of the process flow 1600, or other operations may be added to the process flow 1600.

It is to be understood that any device of the system 100 may perform the operations shown. For example, the process flow 1600 may be implemented by a server 110 and/or a communication device 105 described with reference to FIG. 1.

In some aspects, the process flow 1600 may be implemented by an asset health management system including: asset management circuitry that is to aggregate real time data associated with an asset, wherein the asset is associated with at least one industrial process; and analytics circuitry.

At 1605 of the process flow 1600, the analytics circuitry may identify a target value of one or more first operational parameters associated with the asset.

At 1610 of the process flow 1600, the analytics circuitry may update a machine learning model based on a training dataset that includes at least a portion of the real time data, wherein updating the machine learning model includes updating a correlation between the one or more first operational parameters associated with the asset and one or more second operational parameters associated with the asset.

At 1615 of the process flow 1600, the analytics circuitry may provide the target value of the one or more first operational parameters to the machine learning model, wherein the machine learning model provides a second target value of the one or more second operational parameters in response to processing the target value of the one or more first operational parameters.

At 1620 of the process flow 1600, the analytics circuitry may simulate one or more operations of the asset using the second target value of the one or more second operational parameters, wherein the asset management circuitry provides, via dashboard management circuitry, one or more recommended actions in response to a result associated with simulating the one or more operations.

In some aspects of the process flow 1600, the dashboard management circuitry may establish a connection with the asset management circuitry in response to receiving a request for the real time data associated with the asset.

In some aspects of the process flow 1600, the asset management circuitry may retrieve the real time data in response to the establishment of the connection, wherein retrieving the real time data is based on a mapping between a representation of the asset at a dashboard interface and a representation of the asset at the asset management circuitry.

The exemplary systems and methods of this disclosure have been described in relation to examples of a server 110, a communication device 105, devices 122, and devices 124. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a communications network and/or the Internet, or within a dedicated secure, unsecured and/or encrypted system. Thus, it should be appreciated, that the components of the system can be combined into one or more devices, such as a server, communication device, or collocated on a particular node/element(s) of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. Furthermore, it should be appreciated that the various communications links, including communications channel(s), connecting the elements can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the one or more embodiment(s). Additionally, the exact sequence of events need not occur as set forth in the disclosed embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable. As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, Visual C++, and JSON (JavaScript Object Notation).

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

A number of variations and modifications of the disclosure can be used. It would be possible to provide for some features of the disclosure without providing others.

In yet another embodiment, the systems, methods and protocols described herein can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various communication methods, protocols and techniques according to the aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, A8X, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer, workstation or mobile device platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

In yet another embodiment, the disclosed methods may be partially implemented in software that can be stored on a storage medium, executed on programmed general-purpose computer with the cooperation of a controller and memory, a special purpose computer, mobile device, smartphone, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, as a plug-in, a system component, or the like. The system can also be implemented by physically incorporating the system and/or method into a software and/or hardware system, such as the hardware and software systems of an image processor.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The terms "determine," "calculate," "compute," and variations thereof, as used herein, are used interchangeably and include any type of methodology, process, mathematical operation or technique.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

All references mentioned in the document submitted herewith are herein incorporated by reference in their entirety.

What is claimed is:

1. A method, comprising:
identifying a target value of one or more first operational parameters associated with an asset, wherein the asset is associated with at least one industrial process;
receiving a first data set comprising historical data associated with the asset and a second data set comprising real time data associated with the asset;
comparing the first data set and the second data set;
periodically collecting real time data from the asset at predetermined intervals of time based on the comparing of the first data set and the second data set;
providing the target value of the one or more first operational parameters and the periodically collected real time data to a machine learning model;
incrementally retraining the machine learning model using the periodically collected real time data;
receiving, in response to the machine learning model processing the target value of the one or more first operational parameters, a second target value of one or more second operational parameters associated with the asset;
simulating one or more operations of the asset using the second target value of the one or more second operational parameters; and
providing, via a user interface, one or more recommended actions in response to a result associated with simulating the one or more operations.

2. The method of claim 1, wherein the machine learning model provides the second target value of the one or more second operational parameters based on a correlation between a plurality of operational parameters of the asset, wherein the plurality of operational parameters comprise the one or more first operational parameters and the one or more second operational parameters.

3. The method of claim 2, wherein the correlation between the plurality of operational parameters of the asset comprises:
a first correlation between the one or more first operational parameters and the one or more second operational parameters; and
a second correlation between one or more third operational parameters associated with the asset and the one or more second operational parameters.

4. The method of claim 2, wherein the correlation is based on:
a first weighted impact of the one or more first operational parameters with respect to the correlation; and
a second weighted impact of the one or more second operational parameters with respect to the correlation, wherein the first weighted impact is different from the second weighted impact.

5. The method of claim 1, further comprising:
training the machine learning model based on a training dataset that comprises second historical data associated with the at least one industrial process, the asset, or both, wherein training the machine learning model comprises determining a correlation between the one or more first operational parameters and the one or more second operational parameters.

6. The method of claim 5, wherein:
the asset comprises a chiller; and
the second historical data is associated with at least one of: power consumption, water supply temperature, water return temperature, and water flow associated with the chiller.

7. The method of claim 5, wherein:
the asset comprises a pump; and
the second historical data is associated with at least one of: power consumption, discharge pressure, discharge flow, and wet well level associated with the pump.

8. The method of claim 1,
wherein incrementally retraining the machine learning model comprises updating a correlation between the one or more first operational parameters and the one or more second operational parameters.

9. The method of claim 8, further comprising:
predicting an event associated with the asset based on the periodically collected real time data and based on updating the correlation; and
displaying temporal information associated with the event and the asset via the user interface.

10. The method of claim 1, wherein the one or more first operational parameters are associated with energy consumption of the asset.

11. The method of claim 1, wherein the one or more first operational parameters comprise at least one of:
a cooling load associated with the asset; and
a discharge flow rate associated with the asset.

12. The method of claim 1, further comprising:
obtaining second real time data associated with the asset in response to comparing a prediction accuracy of the machine learning model with respect to detecting one or more anomalies associated with the asset and a target prediction accuracy.

13. The method of claim 1, wherein providing the one or more recommended actions comprises displaying, via the user interface, a graph indicating one or more predictions associated with the asset.

14. The method of claim 1, further comprising:

automatically or semi-automatically controlling the one or more operations of the asset in response to receiving the one or more recommended actions, wherein automatically or semi-automatically controlling the one or more operations of the asset comprises using the second target value of the one or more second operational parameters.

15. The method of claim 1, wherein the machine learning model comprises a prediction model, and wherein incrementally retraining the machine learning model using the periodically collected real time data includes consistently adjusting the prediction model in association with achieving a target prediction accuracy.

16. The method of claim 1, wherein incrementally retraining the machine learning model using the periodically collected real time data comprises configuring one or more trigger criteria that include a temporal variable in association with the retraining, and wherein the machine learning model is incrementally retrained based on a schedule set by a schedule determination module.

17. The method of claim 1, wherein periodically collecting the real time data from the asset comprises collecting the real time data from a data platform, and wherein the data platform is integrated with a module comprising the machine learning model to reduce a time for secure information exchange between the data platform and the module.

18. A system, comprising:

a graphical user interface;

a processor; and a memory storing data thereon that, when processed by the processor, cause the processor to:

identify a target value of one or more first operational parameters associated with an asset, wherein the asset is associated with at least one industrial process;

receive a first data set comprising historical data associated with the asset and a second data set comprising real time data associated with the asset;

compare the first data set and the second data set;

periodically collect real time data from the asset at predetermined intervals of time based on the comparing of the first data set and the second data set;

provide the target value of the one or more first operational parameters and the periodically collected real time data to a machine learning model, wherein the machine learning model is incrementally retrained using the periodically collected real time data;

receive, in response to the machine learning model processing the target value of the one or more first operational parameters, a second target value of one or more second operational parameters associated with the asset;

simulate one or more operations of the asset using the second target value of the one or more second operational parameters; and provide, via a user interface, one or more recommended actions in response to a result associated with simulating the one or more operations.

19. An asset health management system, comprising:

asset management circuitry that is to aggregate real time data associated with an asset, wherein the asset is associated with at least one industrial process; and analytics circuitry that is to:

identify a target value of one or more first operational parameters associated with the asset;

receive a first data set comprising historical data associated with the asset and a second data set comprising real time data associated with the asset;

compare the first data set and the second data set;

periodically collect real time data from the asset at predetermined intervals of time based on the comparing of the first data set and the second data set;

update a machine learning model based on a training dataset that comprises at least a portion of the periodically collected real time data, wherein updating the machine learning model comprises updating a correlation between the one or more first operational parameters associated with the asset and one or more second operational parameters associated with the asset;

provide the target value of the one or more first operational parameters to the machine learning model, wherein the machine learning model provides a second target value of the one or more second operational parameters in response to processing the target value of the one or more first operational parameters; and simulate one or more operations of the asset using the second target value of the one or more second operational parameters, wherein the asset management circuitry provides, via dashboard management circuitry, one or more recommended actions in response to a result associated with simulating the one or more operations.

20. The asset health management system of claim 19, wherein:

the dashboard management circuitry establishes a connection with the asset management circuitry in response to receiving a request for the periodically collected real time data associated with the asset; and the asset management circuitry retrieves the periodically collected real time data in response to the establishment of the connection, wherein retrieving the periodically collected real time data is based on a mapping between a representation of the asset at a dashboard interface and a representation of the asset at the asset management circuitry.

* * * * *